United States Patent
Kim et al.

(10) Patent No.: US 9,370,022 B2
(45) Date of Patent: Jun. 14, 2016

(54) METHOD FOR INDICATING CHANNEL ACCESS TYPE IN WIRELESS COMMUNICATION SYSTEM, AND APPARATUS THEREFOR

(71) Applicant: LG Electronics Inc., Seoul (KR)

(72) Inventors: Jeongki Kim, Anyang-si (KR); Jinsam Kwak, Anyang-si (KR); Yongho Seok, Anyang-si (KR); Seunghee Han, Anyang-si (KR); Jinsoo Choi, Anyang-si (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 14/395,754

(22) PCT Filed: Apr. 19, 2013

(86) PCT No.: PCT/KR2013/003339
§ 371 (c)(1),
(2) Date: Oct. 20, 2014

(87) PCT Pub. No.: WO2013/157885
PCT Pub. Date: Oct. 24, 2013

(65) Prior Publication Data
US 2015/0085780 A1 Mar. 26, 2015

Related U.S. Application Data

(60) Provisional application No. 61/635,849, filed on Apr. 19, 2012, provisional application No. 61/654,033, filed on May 31, 2012.

(51) Int. Cl.
*H04W 74/06* (2009.01)
*H04W 52/02* (2009.01)
(Continued)

(52) U.S. Cl.
CPC .......... *H04W 74/06* (2013.01); *H04W 52/0209* (2013.01); *H04W 52/0216* (2013.01); *H04W 72/0406* (2013.01); *H04W 48/12* (2013.01); *H04W 84/12* (2013.01)

(58) Field of Classification Search
None
See application file for complete search history.

(56) References Cited

U.S. PATENT DOCUMENTS

2005/0152324 A1* 7/2005 Benveniste .................... 370/338
2005/0213534 A1* 9/2005 Benveniste .................... 370/328

(Continued)

FOREIGN PATENT DOCUMENTS

KR  10-2005-0088471 A  9/2005
KR   10-0576834 B1      4/2006

(Continued)

OTHER PUBLICATIONS

Author Unknown, IEEE P802.11 Wireless LANs Proposed Specification Framework for TGah D10.x, pp. 1-36, Sep. 19, 2012.*

(Continued)

*Primary Examiner* — Christopher Crutchfield
(74) *Attorney, Agent, or Firm* — Dentons US LLP

(57) ABSTRACT

The invention relates to a method for a station (STA) to perform channel access in a wireless communication system, comprising the steps of: receiving a beacon frame including a traffic indication map (TIM); a step of checking, if the TIM indicates to the STA that buffered traffic exists, information relating to a PS-poll transmission type; and a step of transmitting a PS-poll frame according to either a first type or second type of transmission indicated by the information relating to the PS-poll frame transmission type. The first type of transmission involves transmitting the PS-poll frame after performing contention, and the second type of transmission involves transmitting the PS-poll frame in the time interval set for the STA.

13 Claims, 38 Drawing Sheets

(51) Int. Cl.
*H04W 48/12* (2009.01)
*H04W 12/12* (2009.01)
*H04W 72/04* (2009.01)
*H04W 84/12* (2009.01)

(56) References Cited

U.S. PATENT DOCUMENTS

2007/0160003 A1   7/2007  Meier
2008/0318642 A1*  12/2008 Tanaka .......................... 455/572
2014/0334368 A1*  11/2014 Zhou et al. .................... 370/311

FOREIGN PATENT DOCUMENTS

KR   10-2006-0059072 A   6/2006
KR   10-2007-0033287 A   3/2007

OTHER PUBLICATIONS

Author Unknown, TGaH TIM Element Improvements, Oct. 19, 2015, pp. 1-14.*
International Search Report from PCT/KR2013/003339, dated Aug. 21, 2013.
Written Opinion of the ISA from PCT/KR2013/003339, dated Aug. 21, 2013.

* cited by examiner

FIG. 13
(a) 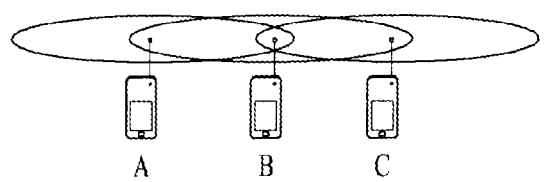
(b) 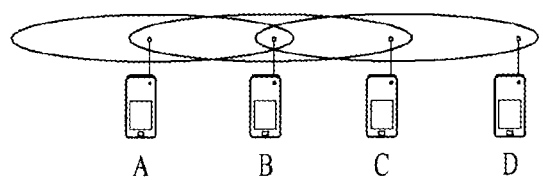
FIG. 14
(a) 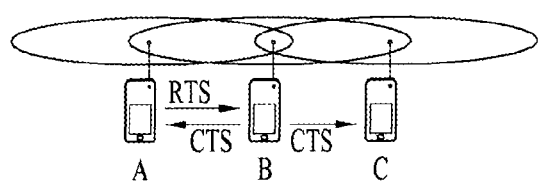
(b) 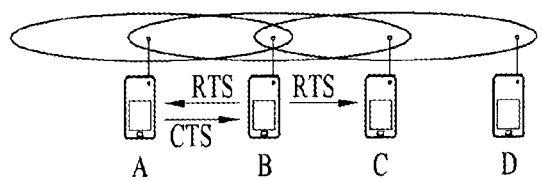

FIG. 18
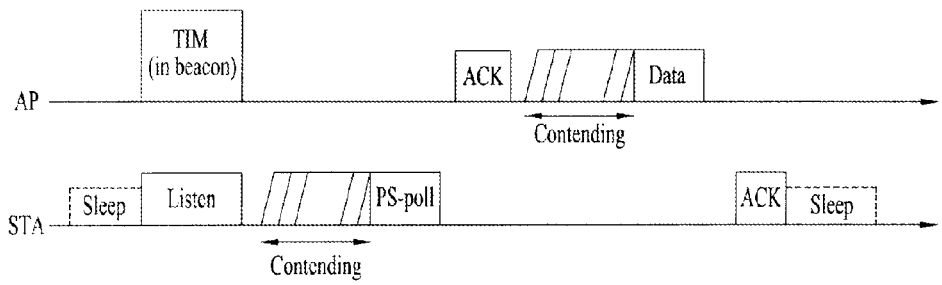
FIG. 19
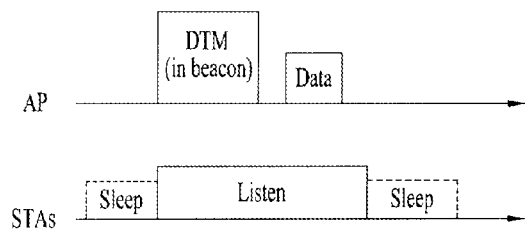
FIG. 20
| Element ID | Length | DTIM Count | DTIM Period | Bitmap Control | Partial Virtual Bitmap |
|---|---|---|---|---|---|
| Octets: 1 | 1 | 1 | 1 | 1 | 1-251 |

FIG. 21

| Element ID | Length | TSF 0 Offset | Interval/ Duration | Optional Subelements |
|---|---|---|---|---|

Octets: 1 1 8 4 variable (a)

| Frame control | AID = broadcast | BSSID | Bitmap size | ACK bitmap | Padding (For byte alignment) |
|---|---|---|---|---|---|

Otects : 2 | 2 | 6 | 2 | Variable | Variable (< 8 bits)

(b)

| Frame control | AID = broadcast | BSSID | ACK bitmap | Padding (For byte alignment) |
|---|---|---|---|---|

Otects : 2 | 2 | 6 | Variable | Variable (< 8 bits)

(c)

| Frame control | BSSID | ACK bitmap | Padding (For byte alignment) |
|---|---|---|---|

Otects : 2 | 6 | Variable | Variable (< 8 bits)

| Element ID | Length | Group ID | RAW start time | RAW duration | Poll type |
|---|---|---|---|---|---|

METHOD FOR INDICATING CHANNEL ACCESS TYPE IN WIRELESS COMMUNICATION SYSTEM, AND APPARATUS THEREFOR

This Application is a 35 U.S.C. §371 National Stage entry of International Application No. PCT/KR2013/003339, filed Apr. 19, 2013, which claims benefit of Provisional Application Nos. 61/635,849 filed Apr. 19, 2012 and 61/654,033 filed May 31, 2012, all of which are incorporated by reference in their entirety herein.

TECHNICAL FIELD

The present invention relates to a wireless communication system and, more particularly, to a method for indicating a channel access type in a wireless LAN system and an apparatus supporting the same.

BACKGROUND ART

With recent development of information communication technologies, a variety of wireless communication technologies have been developed. From among such technologies, WLAN is a technology that allows wireless access to the Internet at home, in businesses, or in specific service providing areas using a mobile terminal, such as a personal digital assistant (PDA), a laptop computer, and a portable multimedia player (PMP), based on radio frequency technology.

In order to overcome limited communication speed, which has been pointed out as a weak point of WLAN, technical standards have recently introduced a system capable of increasing the speed and reliability of a network while extending a coverage region of a wireless network. For example, IEEE 802.11n supports high throughput (HT) with a maximum data processing speed greater than or equal to 540 Mbps. In addition, Multiple Input and Multiple Output (MIMO) technology, which employs multiple antennas for both a transmitter and a receiver in order to minimize transmission errors and to optimize a data rate, has been introduced.

DISCLOSURE

Technical Problem

An object of the present invention devised to solve the problem lies in an improved channel access method in a wireless communication system, preferably, in a WLAN system and an apparatus for the same.

Another object of the present invention is to provide a method to prevent unnecessary power consumption of a terminal and delay in transmission from the terminal which are caused by the operation of contention-based channel access and an apparatus for the same.

Another object of the present invention is to efficiently indicate which of a channel access method to prevent unnecessary power consumption and delay in transmission for a terminal and the conventional contention-based channel access method should be used.

Objects of the present invention are not limited to the aforementioned objects, and other objects of the present invention which are not mentioned above will become apparent to those having ordinary skill in the art upon examination of the following description.

Technical Solution

According to a first aspect of the present invention, provided herein is a method for performing channel access by at least one station (STA) in a wireless communication system, including receiving a beacon frame containing a traffic indication map (TIM), checking, when the TIM indicates that buffered traffic for the STA is present, information related to a PS-Poll transmission type, and transmitting a PS-Poll frame according to one of a first type and a second type indicated by the information related to the PS-Poll frame transmission type, wherein the first type represents transmission of the PS-Poll frame after implementation of contention, and the second type represents transmission of the PS-Poll frame in a time interval configured for the STA.

According to a second aspect of the present invention, provided herein is a station (STA) in a wireless communication system including a transceiver for transmitting and receiving a radio frequency signal, and a processor, wherein the processor receives a beacon frame containing a traffic indication map (TIM), checks, when the TIM indicates that buffered traffic for the STA is present, information related to a PS-Poll transmission type, and transmits a PS-Poll frame according to one of a first type and a second type indicated by the information related to the PS-Poll frame transmission type, wherein the first type represents transmission of the PS-Poll frame after implementation of contention, and the second type represents transmission of the PS-Poll frame in a time interval configured for the STA.

The first and second aspects of the present invention may include elements disclosed below.

The information related to the PS-Poll transmission type may include a first bitmap configured to individually indicate PS-Poll transmission types of STAs.

The first bitmap may indicate whether each of one or more STAs corresponds to the first type or the second type, the TIM indicating that buffered traffic for the one or more STAs is present.

The first bitmap may be contained in one of the beacon frame and a TIM information element.

The information related to the PS-Poll transmission type may include a second bitmap configured to indicate PS-Poll transmission types of STAs belonging to at least one group on a group-by-group basis.

The second bitmap may indicate whether each of the at least one group corresponds to the first type or the second type, the beacon frame indicating that buffered traffic for the at least one group is present.

The second bitmap may be contained in the beacon frame.

The information related to the PS-Poll transmission type may include a first bitmap configured to indicate PS-Poll transmission types of STAs belonging to at least one group on an STA-by-STA basis, a second bitmap configured to indicate the PS-Poll transmission types of the STAs belonging to the at least one group on a group-by-group basis, and a third bitmap configured to indicate whether a paged group is related to the first bitmap or the second bitmap.

The PS-Poll transmission type of an STA belonging to a group from among the STAs may be determined through the second bitmap when a bit corresponding to the group in the third bitmap is set to 0, and may be determined through the first bitmap when the bit corresponding to the group in the third bitmap is set to 1.

A size of the second bitmap may be determined according to the number of bits set to 0 in the third bitmap When the STA transmits the PS-Poll frame according to the second type, the STA may be maintained in an awake state in the time interval configured for the STA.

The beacon frame may contain information about the time interval configured for the STA and an entire time interval for the second type.

DESCRIPTION OF DRAWINGS

The accompanying drawings, which are included to provide a further understanding of the invention, illustrate embodiments of the invention and together with the description serve to explain the features of the invention. In the drawings:

FIGS. 13a and b illustrate a hidden node and an exposed node;

FIGS. 14a and b illustrate RTS and CTS;

FIGS. 17 to 19 illustrate operations of an STA having received a TIM in detail;

FIG. 20 illustrates an exemplary format of a TIM element;

FIG. 21 illustrates an exemplary format of a U-APSD coexistence element;

FIGS. 36a, b and c illustrate an exemplary PS-Poll group ACK frame according to one embodiment of the present invention;

BEST MODE

Figure 1:
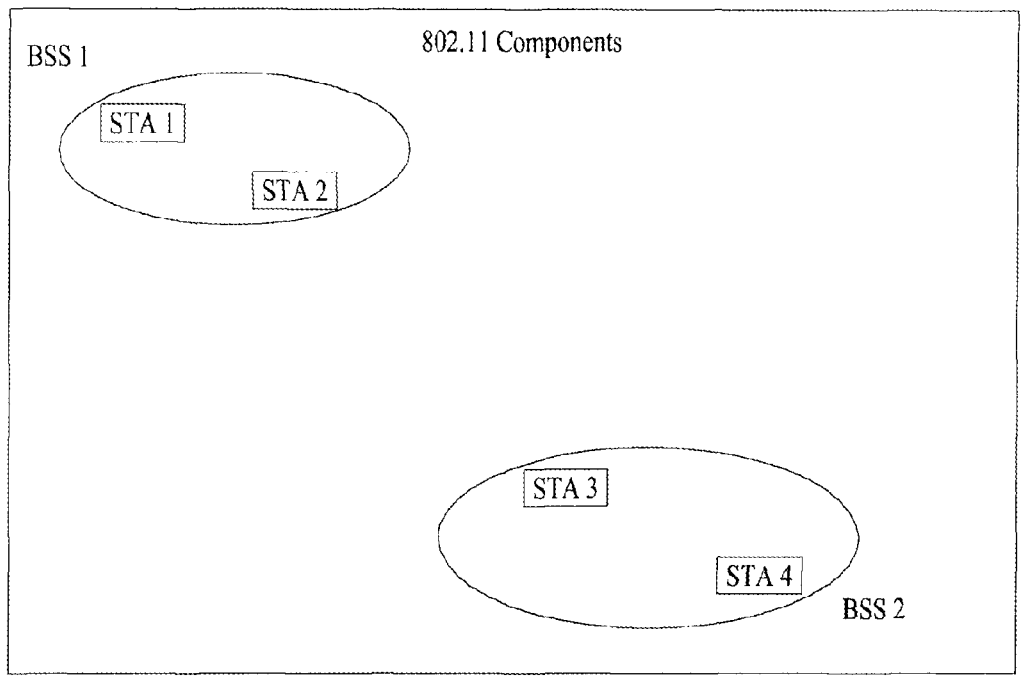
FIG. 1 is a diagram showing an exemplary structure of an IEEE 802.11 system to which the present invention is applicable.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to present only the embodiments that can be implemented according to the invention. The following detailed description includes specific details in order to provide a thorough understanding of the present invention. However, it will be apparent to those skilled in the art that the present invention may be practiced without such specific details.

In some cases, well-known structures and devices are omitted in order to avoid obscuring the concepts of the present invention and important functions of the structures and devices may be mainly illustrated in the form of block diagrams.

Specific terms are employed in the following descriptions for better understanding of the present invention. Such specific terms may take other forms within the technical scope or spirit of the present invention.

Exemplary embodiments of the present invention are supported by standard documents disclosed for at least one of an Institute of Electrical and Electronics Engineers (IEEE) 802 system, a 3rd Generation Partnership Project (3GPP) system, a 3GPP Long Term Evolution (LTE) system, an LTE-Advanced (LTE-A) system, and a 3GPP2 system, which are wireless access systems. That is, steps or parts which are not described to clearly reveal the technical spirit of the present invention in the embodiments of the present invention may be supported by the above documents. All terminology used herein may be supported by at least one of the aforementioned documents.

The following embodiments of the present invention can be applied to a variety of wireless access technologies such as, for example, CDMA (Code Division Multiple Access), FDMA (Frequency Division Multiple Access), TDMA (Time Division Multiple Access), OFDMA (Orthogonal Frequency Division Multiple Access), and SC-FDMA (Single Carrier Frequency Division Multiple Access). CDMA may be embodied through a radio technology such as UTRA (Universal Terrestrial Radio Access) or CDMA2000. TDMA may be embodied through radio technologies such as GSM (Global System for Mobile communication)/GPRS (General Packet Radio Service)/EDGE (Enhanced Data Rates for GSM Evolution). OFDMA may be embodied through radio technologies such as IEEE 802.11 (Wi-Fi), IEEE 802.16 (WiMAX), IEEE 802-20, and E-UTRA (Evolved UTRA). UTRA is a part of UMTS (Universal Mobile Telecommunications System). 3GPP (3rd Generation Partnership Project) LTE (long term evolution), which is a part of E-UMTS (Evolved UMTS) that uses E-UTRA, employs OFDMA in downlink and SC-FDMA in uplink. LTE-A (LTE-Advanced) is an evolved version of 3GPP LTE.

For clarity, the following description mainly focuses on IEEE 802.11 systems, but technical features of the present invention are not limited thereto.

Generals of the System

FIG. 1 is a diagram showing an exemplary structure of an IEEE 802.11 system to which the present invention is applicable.

The structure of the IEEE 802.11 system may include a plurality of components. A WLAN which supports transparent STA mobility for a higher layer may be provided by interaction between components. A Basic Service Set (BSS) may correspond to a basic component block in an IEEE 802.11 LAN. In FIG. 1, two BSSs (BSS1 and BSS2) are shown and each of the BSSs includes two STAs as members thereof (i.e., STA1 and STA2 are included in BSS1, and STA3 and STA4 are included in BSS2). In FIG. 1, an ellipse indicating each BSS may be understood as a coverage area in which STAs included in the BSS maintain communication. This area may be referred to as a basic service area (BSA). If an STA moves out of the BSA, the STA cannot directly communicate with the other STAs within the BSA.

In the IEEE 802.11 LAN, the most basic type of BSS is an independent BSS (IBSS). For example, the IBSS may have a minimal form consisting of only two STAs. The BSS (BSS1 or BSS2) of FIG. 1, which is the simplest form and in which other components are omitted, may correspond to a typical example of the IBSS. Such configuration is possible when STAs can directly communicate with each other. This type of LAN may be configured when the LAN is necessary, rather than being prescheduled. This network may be referred to as an ad-hoc network.

Memberships of an STA in a BSS may be dynamically changed depending on whether the STA is switched on or off and whether the STA enters or leaves the BSS area. The STA may use a synchronization process to join the BSS to be a member of the BSS. To access all services of a BSS infrastructure, the STA should be associated with the BSS. Such association may be dynamically set and may involve use of a distribution system service (DSS).

Figure 2:
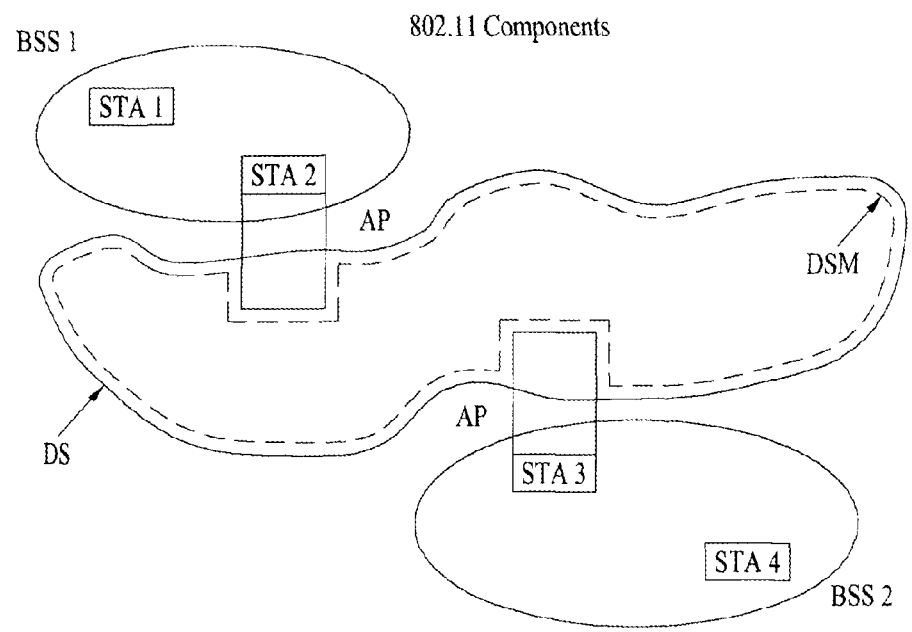
FIG. 2 is a diagram showing another exemplary structure of an IEEE 802.11 system to which the present invention is applicable.

FIG. 2 is a diagram showing another exemplary structure of an IEEE 802.11 system to which the present invention is applicable. In FIG. 2, components such as a distribution system (DS), a distribution system medium (DSM), and an access point (AP) are added to the structure of FIG. 1.

A direct STA-to-STA distance in a LAN may be limited physical layer (PHY) performance. In some cases, such distance limit may be sufficient for communication. However, in other cases, communication between STAs over a long distance may be necessary. The DS may be configured to support extended coverage.

The DS refers to a structure in which BSSs are connected to each other. Specifically, a BSS may be configured as a component of an extended form of a network including a plurality of BSSs, rather than being independently present as shown in FIG. 1.

The DS is a logical concept and may be specified by the characteristics of the DSM. In this regard, a wireless medium (WM) and the DSM are logically distinguished from each other in IEEE 802.11. Respective logical media are used for different purposes and are used by different components. According to IEEE 802.11, such media are not restricted to either the same or different media. The flexibility of the IEEE 802.11 LAN architecture (DS architecture or other network architectures) can be explained by the fact that plural media are logically different from each other. That is, the IEEE 802.11 LAN architecture can be implemented in various manners and may be independently specified by a physical property of each implementation.

The DS may support mobile devices by providing seamless integration of multiple BSSs and providing logical services necessary for handling an address to a destination.

The AP refers to an entity that enables associated STAs to access the DS through a WM and that has STA functionality. Data may move between the BSS and the DS through the AP. For example, STA2 and STA3 shown in FIG. 2 have STA functionality and provide a function of causing associated STAs (STA1 and STA4) to access the DS. Moreover, since all APs basically correspond to STAs, all APs are addressable entities. An address used by an AP for communication on the WM need not be identical to an address used by the AP for communication on the DSM.

Data transmitted from one of STAs associated with the AP to an STA address of the AP may always be received by an uncontrolled port and may be processed by an IEEE 802.1X port access entity. If the controlled port is authenticated, transmission data (or frame) may be transmitted to the DS.

Figure 3:
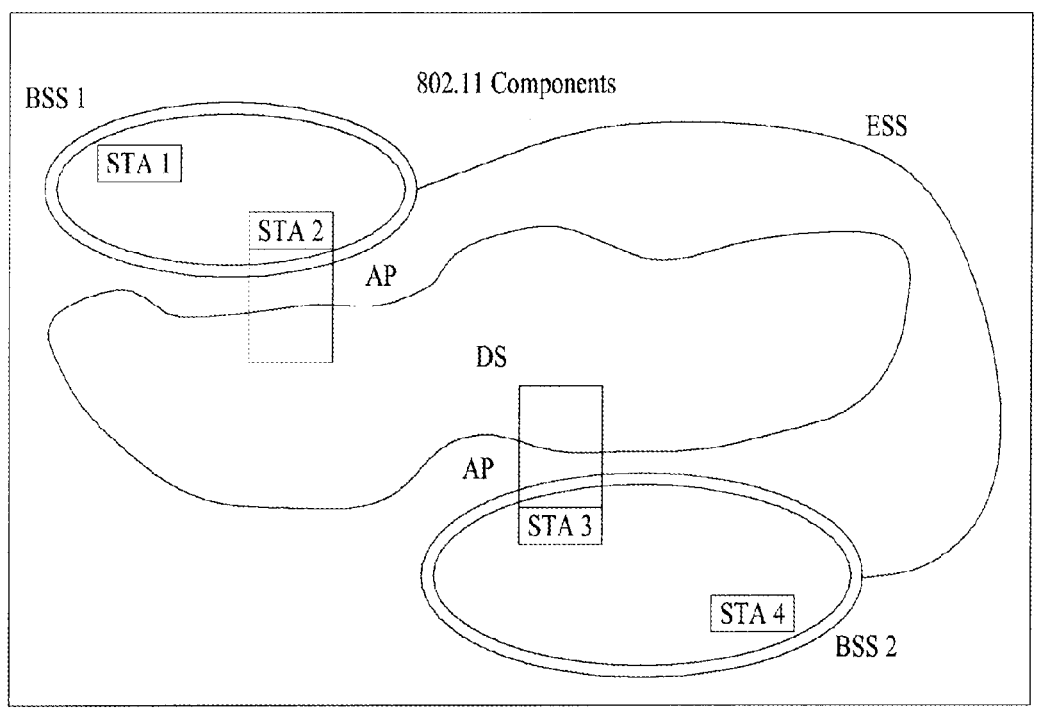
FIG. 3 is a diagram showing still another exemplary structure of an IEEE 802.11 system to which the present invention is applicable.

FIG. 3 is a diagram showing still another exemplary structure of an IEEE 802.11 system to which the present invention is applicable. In addition to the structure of FIG. 2, FIG. 3 conceptually shows an extended service set (ESS) for providing wide coverage.

A wireless network having arbitrary size and complexity may be constructed by a DS and BSSs. In the IEEE 802.11 system, this type of network is referred to as an ESS network. The ESS may correspond to a set of BSSs connected to one DS. However, the ESS does not include the DS. The ESS network is characterized in that the ESS network is viewed as an IBSS network in a logical link control (LLC) layer. STAs included in the ESS may communicate with each other and mobile STAs are movable transparently from one BSS to another BSS (within the same ESS) in LLC.

In IEEE 802.11, any relative physical locations of the BSSs in FIG. 3 are not assumed and may be arranged in the following forms. BSSs may partially overlap and this positional arrangement is generally used to provide continuous coverage. The BSSs may not be physically connected, and a distance between BSSs logically has no limit. The BSSs may be located at the same physical position and this positional arrangement may be used to provide redundancy. One (or at least one) IBSS or ESS network may be physically present in one space as one (or at least one) ESS network. This may correspond to an ESS network form in the case in which an ad-hoc network operates in a location in which an ESS network is present, in the case in which IEEE 802.11 networks of different organizations physically overlap, or in the case in which two or more different access and security policies are needed in the same location.

Figure 4:
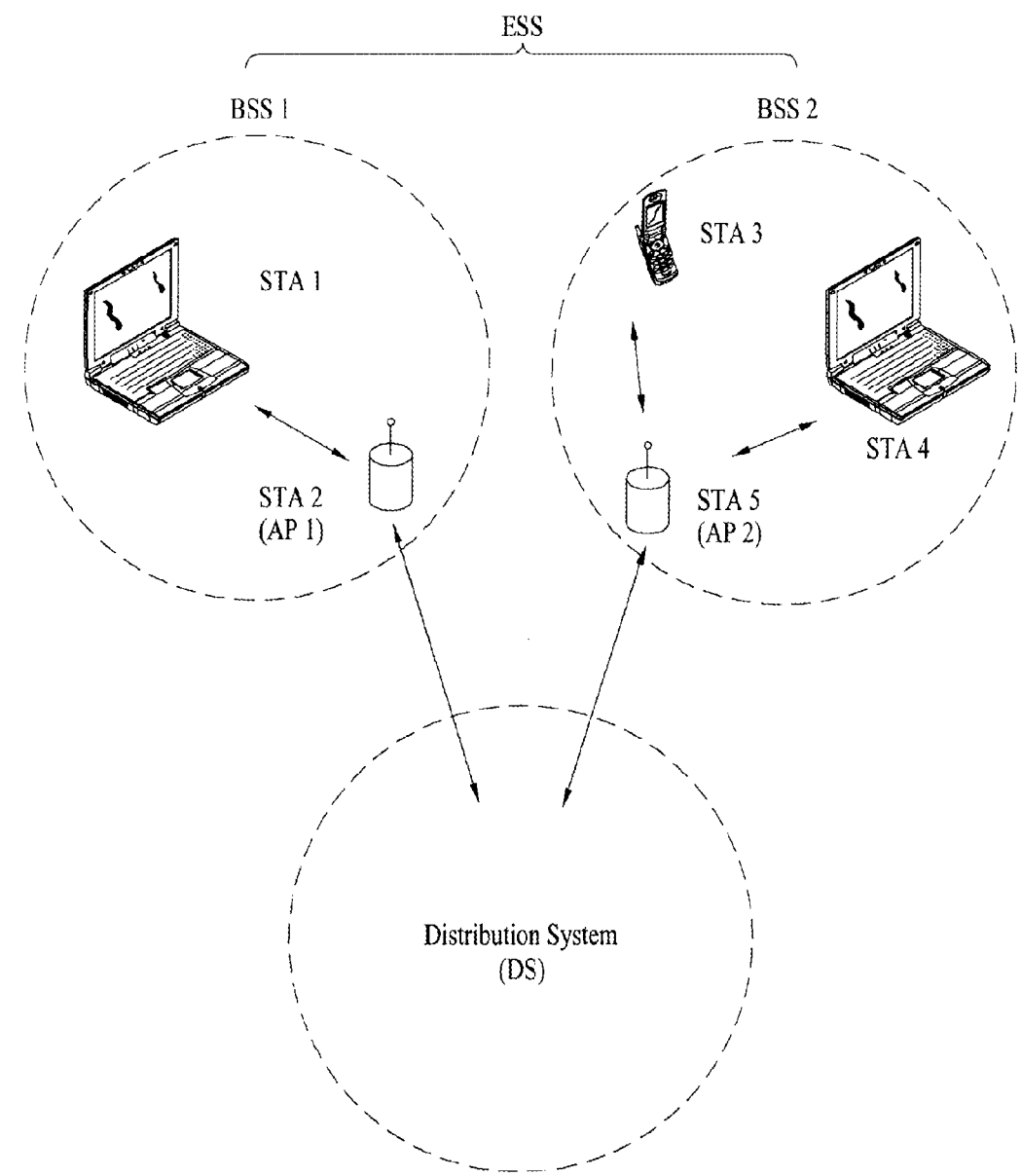
FIG. 4 is a diagram showing an exemplary structure of a WLAN system.

FIG. 4 is a diagram showing an exemplary structure of a WLAN system. In FIG. 4, an example of an infrastructure BSS including a DS is shown.

In the example of FIG. 4, BSS1 and BSS2 constitute an ESS. In the WLAN system, an STA is a device operating according to MAC/PHY regulation of IEEE 802.11. STAs include AP STAs and non-AP STAs. The non-AP STAs correspond to devices such as laptop computers or mobile phones which are generally handled directly by users. In the example of FIG. 4, STA1, STA3, and STA4 correspond to the non-AP STAs and STA2 and STA5 correspond to AP STAs.

In the following description, the non-AP STA may be called a terminal, a wireless transmit/receive unit (WTRU), user equipment (UE), a mobile station (MS), a mobile terminal, or a mobile subscriber station (MSS). The AP is a concept corresponding to a base station (BS), a Node-B, an evolved Node-B (e-NB), a base transceiver system (BTS), or a femto BS in other wireless communication fields.

Figure 5:
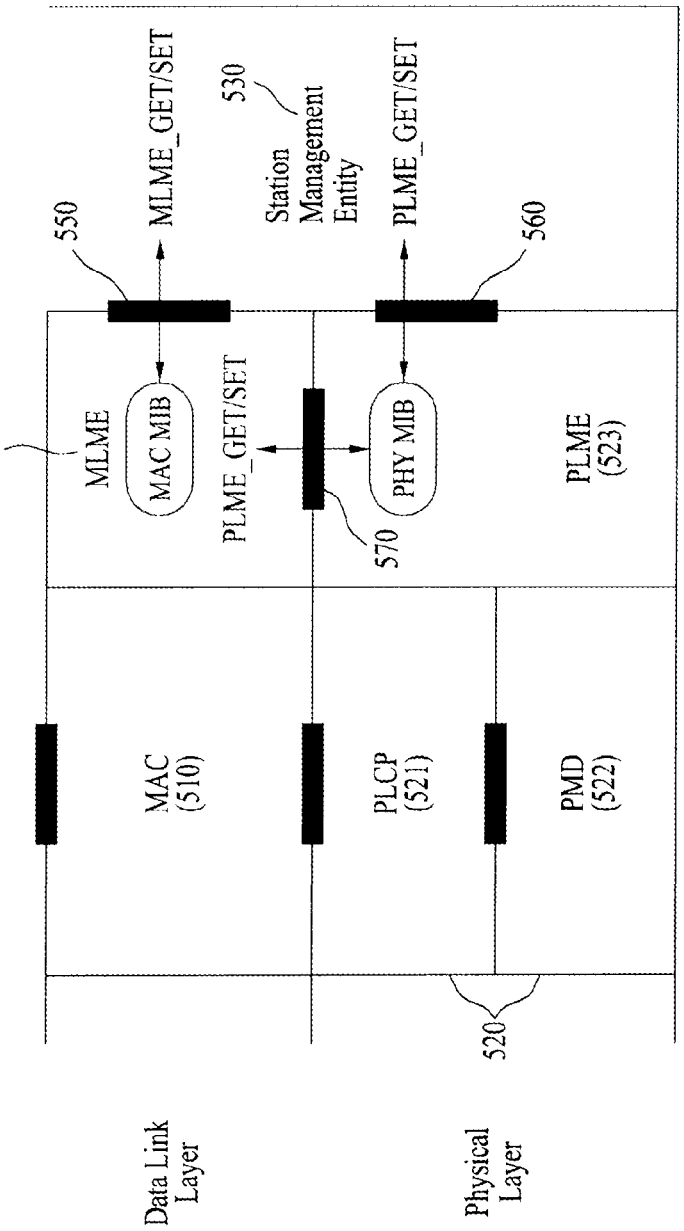
FIG. 5 shows exemplary structures of a data link layer and a physical layer of an IEEE 802.11 system to which the present invention is applicable.

FIG. 5 shows exemplary structures of a data link layer and a physical layer of an IEEE 802.11 system to which the present invention is applicable.

Referring to FIG. 5, the physical layer 520 may include a PLCP (physical layer convergence procedure) entity 521 and a PMD (physical medium dependent) entity 522. The PLCP entity serves to connect a MAC sublayer 510 to a data frame. The PMD entity 522 serves to wirelessly transmit and receive data to/from two or more STAs in the OFDM scheme.

Both the MAC sublayer 510 and physical layer 520 conceptually include management entities, which may be called a MAC sublayer management entity (MLME) 511 and a physical layer management entity (PLME) 521, respectively. These entities 511 and 521 provide layer management service interfaces through the operation of a layer management function.

In order to provide correct MAC operation, a station management entity (SME) 530 is present within each STA. The SME 530 is a layer-independent management entity that collects information about layer-dependent status from the various layer management entities or sets values of layer-specific parameters. The SME 530 may perform such functions on behalf of general system management entities and implement standard management protocols.

The various entities as above interact in various ways. FIG. 5 illustrates some examples of exchanging GET/SET primitives. An XX-GET.request primitive is used to request the value of a management information base (MIB) attribute. The XX-GET.confirm primitive returns the value of the MIB attribute if the status is "SUCCESS," otherwise returning an error indication in the status field. The XX-SET.request primitive is used to request that a designated MIB attribute be set to a given value. If this MIB attribute indicates a specific operation, it requests that a specific operation be performed. If a status is set to "SUCCESS," the XX-SET.confirm primitive indicates that the designated MIB attribute has been set to the requested value. Otherwise, the status field indicates an error. If the MIB attribute indicates a specific operation, this primitive may confirm that the operation is performed.

As shown in FIG. 5, the MLME 511 and the SME 530, and the PLME 523 and the SME 530 may exchange various primitives via an MLME_service access point (MLME_SAP) 550 and a PLME_service access point (PLME_SAP) 560, respectively. In addition, the MLME 511 and the PLME 523 may exchange a primitive via an MLME-PLME_service access point (MLME-PLME_SAP) 570.

Link Setup Process

Figure 6:
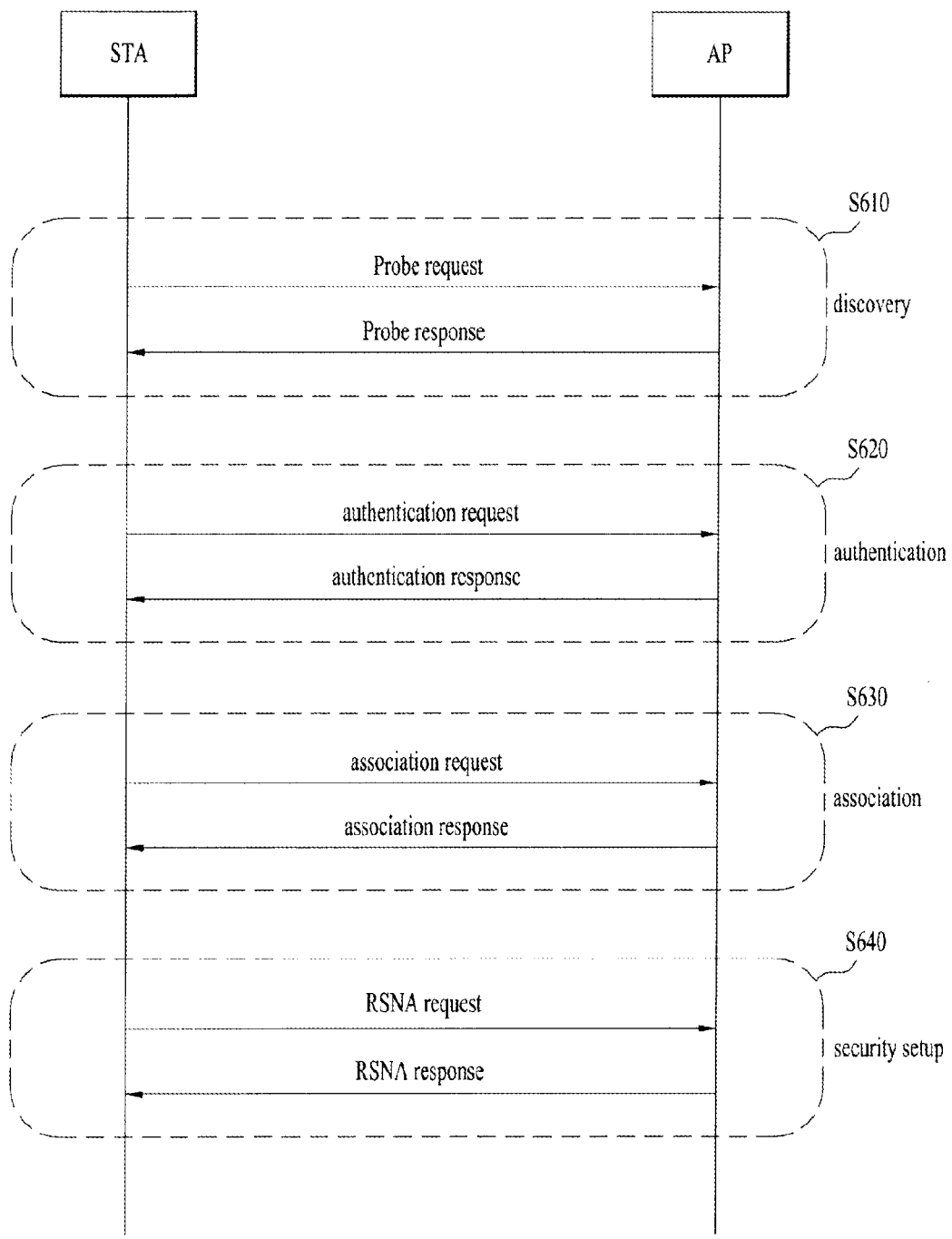
FIG. 6 illustrates a general link setup process in a WLAN system to which the present invention is applicable.

FIG. 6 illustrates a general link setup process in a WLAN system to which the present invention is applicable.

To establish link setup on the network and transmit/receive data over the network, the STA should perform network discovery and authentication, establish association, and perform an authentication procedure for security. The link setup process may also be referred to as a session initiation process or a session setup process. In addition, the discovery, authentication, association, and security setup steps in the link setup process may be collectively called an association step in a general sense.

Hereinafter, an exemplary link setup process will be described with reference to FIG. 6.

In step S610, the STA may perform the network discovery operation. The network discovery operation may include a scanning operation of the STA. That is, the STA needs to search for an available network so as to access the network. The STA needs to identify a compatible network before participating in a wireless network. Herein, the process of identifying the network contained in a specific region is referred to as scanning.

The scanning operation is classified into active scanning and passive scanning.

FIG. 6 exemplarily shows the network discovery operation including the active scanning process. In the case of the active scanning, the STA configured to perform scanning transmits a probe request frame and waits for a response to the probe request frame, in order to move between channels and search for APs present nearby. A responder transmits a probe response frame to the STA having transmitted the probe request frame, in response to the probe request frame. Herein, the responder may be the last STA that has transmitted a beacon frame in a BSS of the scanned channel. In the BSS, since the AP transmits a beacon frame, the AP serves as the responder. In the IBSS, STAs within the IBSS transmit a beacon frame in rotation, and thus the responder is fixed. For example, the STA that has transmitted the probe request frame on Channel #1 and has received the probe response frame on Channel #1 may store BSS-associated information contained in the received probe response frame and move to the next channel (for example, Channel #2) to perform scanning (i.e., transmission/reception of a probe request/response on Channel #2) in the same manner.

Although not shown in FIG. 6, the passive scanning operation may be carried out. In performing the passive scanning operation, an STA to perform scanning waits for a beacon frame by moving from one channel to another channel. The beacon frame, which is one of the management frames in IEEE 802.11, is periodically transmitted to indicate presence of a wireless network and allows the STA performing scanning to search for the wireless network and participate in the wireless network. In a BSS, the AP periodically transmits the beacon frame. In an IBSS, STAs of the IBSS transmit the beacon frame in rotation. If an STA performing scanning receives the beacon frame, the STA stores information about the BSS contained in the beacon frame, and then moves to another channel and records beacon frame information on each channel. The STA having received the beacon frame stores BSS-related information contained in the received beacon frame, moves to the next channel, and then performs scanning in the same manner as above.

In comparison between active scanning and passive scanning, active scanning is more advantageous than passive scanning in terms of delay and power consumption.

After the STA discovers the network, the STA may perform authentication in step S620. This authentication process may be referred to as first authentication, which is clearly distinguished from the security setup operation of step S640, which will be described later.

The authentication process may include transmitting, by the STA, an authentication request frame to an AP and transmitting, by the AP, an authentication response frame to the STA in response to the authentication request frame. The authentication frame used for authentication request/response may correspond to a management frame.

The authentication frame may include information about an authentication algorithm number, an authentication transaction sequence number, a status code, a challenge text, a robust security network (RSN), a finite cyclic group, etc. This information, which is an example of information that may be contained in the authentication request/response frame, may be replaced with other information, or include additional information.

The STA may transmit an authentication request frame to the AP. The AP may determine whether to authenticate the STA on the basis of the information contained in the received authentication request frame. The AP may provide an authentication result to the STA through the authentication response frame.

After the STA is successfully authenticated, the association process may be conducted in step S630. The association process may include the steps of transmitting, by the STA, an association request frame to the AP and transmitting, by the AP, an association response frame to the STA in response.

For example, the association request frame may include information related to various capabilities, a beacon listen interval, a service set identifier (SSID), supported rates, supported channels, RSN, mobility domain, supported operating classes, a traffic indication map (TIM) broadcast request, an interworking service capability, etc.

For example, the association response frame may include information related to various capabilities, a status code, an association ID (AID), supported rates, an enhanced distributed channel access (EDCA) parameter set, a received channel power indicator (RCPI), a received signal to noise indicator (RSNI), mobility domain, a timeout interval (association comeback time), an overlapping BSS scan parameter, a TIM broadcast response, a QoS map, etc.

The aforementioned information, which corresponds to some parts of information which can be contained in the association request/response frame, may be replaced with other information or include additional information.

After the STA is successfully associated with the network, the security setup process may be performed in step S640. The security setup process of step S640 may be referred to as an authentication process based on a robust security network association (RSNA) request/response. The authentication process of step S620 may be referred to as a first authentication process, and the security setup process of Step S640 may be simply referred to as an authentication process.

The security setup process of Step S640 may include, for example, a private key setup process through 4-way handshaking based on an extensible authentication protocol over LAN (EAPOL) frame. In addition, the security setup process may also be performed in another security scheme which is not defined in IEEE 802.11 standards.

Evolution of WLAN

In order to overcome a limit in WLAN communication speed, IEEE 802.11n has recently been established as a communication standard. IEEE 802.11n aims to increase network speed and reliability as well as to extend a coverage region of the wireless network. More specifically, IEEE 802.11n supports a high throughput (HT) of a maximum data processing speed greater than or equal to 540 Mbps, and is based on multiple input and multiple output (MIMO) technology in which multiple antennas are used at both a transmitter and a receiver.

With widespread use of the WLAN technology and diversification of WLAN applications, there has been a need for development a new WLAN system capable of supporting higher HT than a data processing speed supported by IEEE 802.11n. The next generation WLAN system for supporting very high throughput (VHT) is the next version (for example, IEEE 802.11ac) of the IEEE 802.11n WLAN system, and is one of IEEE 802.11 WLAN systems recently proposed to support a data processing speed greater than or equal to 1 Gbps at an MAC service access point (MAC SAP).

In order to efficiently utilize a radio frequency channel, the next generation WLAN system supports a Multi User Multiple Input Multiple Output (MU-MIMO) transmission scheme in which a plurality of STAs can simultaneously access a channel. In accordance with the MU-MIMO transmission scheme, the AP may simultaneously transmit packets to at least one MIMO-paired STA. In addition, a technology for supporting WLAN system operations in whitespace has recently been discussed. For example, a technology for introducing the WLAN system in TV whitespace (TV WS) such as a frequency band (e.g., a band between 54 MHz and 698 MHz) left idle due to transition from analog TV to digital TV has been discussed under the IEEE 802.11af standard. However, this is simply illustrative, and the whitespace may be viewed as a licensed band which is primarily usable by a licensed user. The licensed user means a user who has permission to use the licensed band, and may also be referred to as a licensed device, a primary user, an incumbent user, or the like.

For example, an AP and/or STA operating in the whitespace (WS) should provide a function of protecting the licensed user. For example, in the case in which a licensed user such as a microphone is already using a specific WS channel which is in a frequency band divided according to a regulation so as to have a specific bandwidth in the WS band, the AP and/or STA are not allowed to use the frequency band corresponding to the WS channel in order to protect the licensed user. In addition, the AP and/or STA should stop using a frequency band for transmission and/or reception of a current frame when the licensed user uses this frequency band.

Accordingly, the AP and/or STA needs to pre-check whether use of a specific frequency band within the WS band is possible, namely whether a licensed user is in the frequency band. Checking whether a licensed user is in the specific frequency band is referred to as spectrum sensing. An energy detection scheme, a signature detection scheme and the like are utilized as the spectrum sensing mechanisms. The AP and/or STA may determine that a licensed user is using the specific frequency band if the intensity of a received signal exceeds a predetermined value, or when a DTV preamble is detected.

Machine-to-machine (M2M) communication technology has been discussed as a next generation communication technology. Technical standard IEEE 802.11ah to support M2M communication in the IEEE 802.11 WLAN system is also under development. M2M communication, which represents a communication scheme involving one or more machines, may also be referred to as machine type communication (MTC) or machine-to-machine (M2M) communication. Herein, the machine may represent an entity that does not require direct manipulation from or intervention of a user. For example, not only a meter or vending machine equipped with a wireless communication module, but also user equipment such as a smartphone which is capable of performing communication by automatically accessing the network without manipulation/intervention by the user may be an example of the machines. M2M communication may include device-to-device (D2D) communication and communication between a device and an application server. As an example of communication between a device and an application server, communication between a vending machine and an application server, communication between a Point of Sale (POS) device and an application server, and communication between an electric meter, a gas meter or a water meter and an application server. M2M communication-based applications may include security, transportation and healthcare applications. Considering the characteristics of the aforementioned application examples, M2M communication needs to support occasional transmission/reception of a small amount of data at a low speed in an environment including a large number of devices.

Specifically, M2M communication needs to support a large number of STAs. While the current WLAN system assumes that one AP is associated with up to 2007 STAs, various methods to support other cases in which many more STAs (e.g., about 6000 STAs) are associated with one AP have been discussed regarding M2M communication. In addition, it is expected that there will be many applications to support/require a low transfer rate in M2M communication. In order to smoothly support many STAs, an STA in the WLAN system may recognize presence or absence of data to be transmitted thereto on the basis of a traffic indication map (TIM), and several methods to reduce the bitmap size of the TIM have been under discussion. In addition, it is expected that there will be much traffic data having a very long transmission/reception interval in M2M communication. For example, in M2M communication, a very small amount of data such as electric/gas/water metering is required to be transmitted and received at long intervals (for example, every month). Accordingly, there have been discussions about methods to efficiently support the case in which a very small number of STAs have a data frame to receive from the AP during one beacon period while the number of STAs to be associated with one AP increases in the WLAN system.

As described above, WLAN technology is rapidly evolving, and not only the aforementioned exemplary techniques but also other techniques for direct link setup, improvement of media streaming throughput, support of high-speed and/or large-scale initial session setup, and support of an extended bandwidth and operation frequency are under development.

Frame Structure

Figure 7:
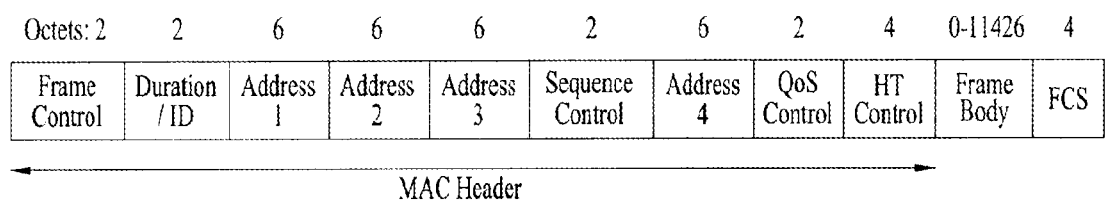
FIG. 7 exemplarily shows a MAC frame format of an IEEE 802.11 system to which the present invention is applicable.

FIG. 7 exemplarily shows a MAC frame format of an IEEE 802.11 system to which the present invention is applicable.

Referring to FIG. 7, a MAC frame format includes a MAC header (MHR), a MAC payload, and a MAC footer (MFR). The MHR includes a frame control field, a duration/ID field, an Address 1 field, an Address 2 field, an Address 3 field, a sequence control field, an Address 4 field, a quality of service (QoS) Control field, and an HT Control field. The Frame Body field, defined by the MAC payload, has data to be transmitted in a higher layer, and has a variable size. The frame check sequence (FCS) field is defined by the MAC footer and is used to search for an error of the MAC frame.

The first three fields (the frame control field, the duration/ID field and the Address 1 field), and the last field (the FCS field) constitute a minimal frame format, and are present in all frames. The other fields may be present only in a specific frame type.

Information contained in each of the aforementioned fields may comply with the definition of the IEEE 802.11 system. In addition, each of the aforementioned fields may be an example of fields which may be included in a MAC frame, and may be replaced with another field or include an additional field.

Figure 8:
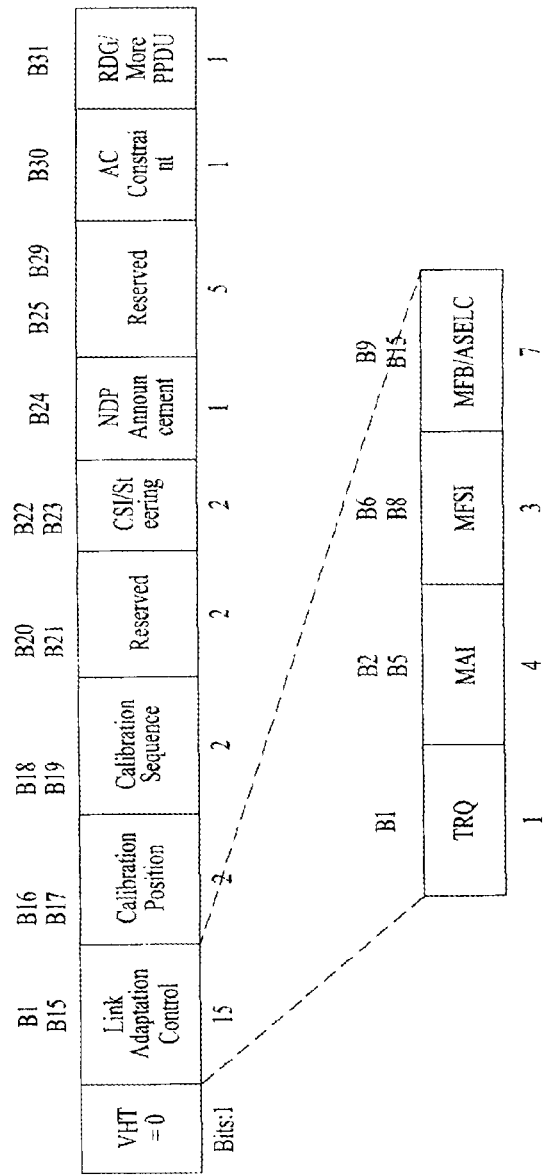
FIG. 8 exemplarily shows an HT format of an HT Control field in the MAC frame of FIG. 7.

FIG. 8 exemplarily shows an HT format of the HT Control field in the MAC frame of FIG. 7.

Referring to FIG. 8, the HT Control field may include a VHT subfield, a Link Adaptation subfield, a Calibration Position subfield, a Calibration Sequence field, a CSI (Channel State Information)/Steering subfield, an NDP (Null Data Packet) Announcement field, an AC (Access Category) Constraint subfield, and an RDG (Reverse Direction Grant)/More PPDU subfield, and a Reserved subfield.

The Link Adaptation subfield may include a TRQ (Training Request) subfield, an MAI (MCS (Modulation and Coding Scheme) Request or ASEL (Antenna Selection) Indication) subfield, an MFSI (MCS Feedback Sequence Identifier) subfield, and an MFB/ASELC (MCS Feedback and Antenna Selection Command/data) subfield.

The TRQ subfield is set to 1 when a request for transmission of a sounding PPDU is made to a responder, and is set to 0 when a request for transmission of the sounding PPDU is not made to the responder. When the MAI subfield is set to 14, it represents ASEL indication, and the MFB/ASELC subfield is interpreted as the antenna selection command/data. Otherwise, the MAI subfield represents an MCS request, and the MFB/ASELC subfield is interpreted as the MCS feedback. In the case in which the MAI subfield represents the MCS request (MRQ), the subfield is set to 0 when no MCS feedback is requested and is set to 1 when an MCS feedback is requested. The sounding PPDU, which may be used for channel estimation, represents a PPDU for transmitting a training symbol.

Each of the aforementioned subfields, which are examples of subfields that can be included in the HT Control field, may be replaced with another subfield or include an additional subfield.

Figure 9:
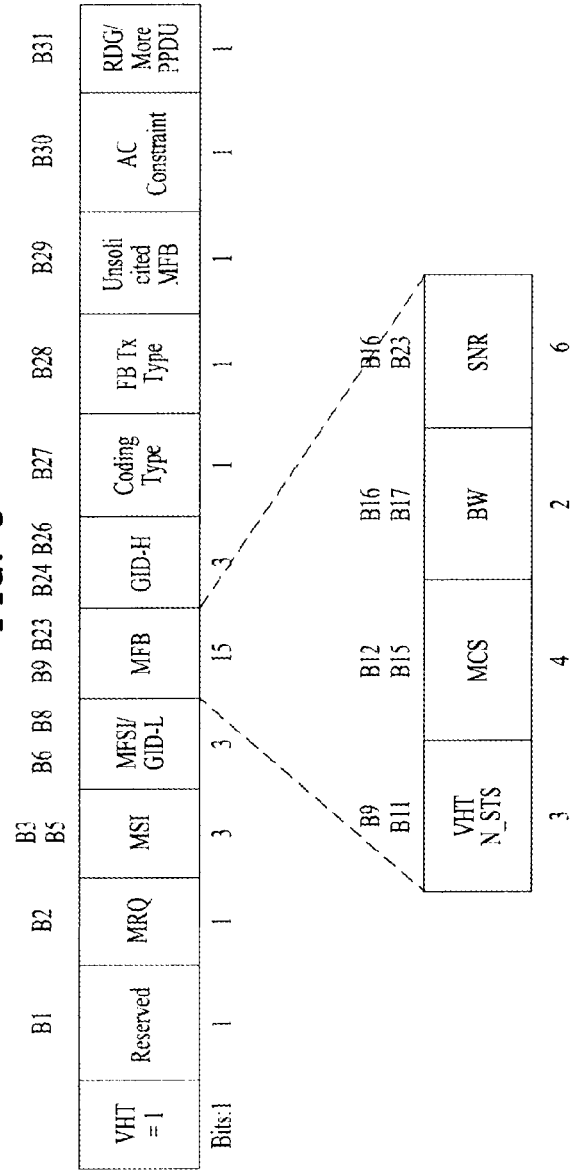
FIG. 9 exemplarily shows a VHT format of the HT Control field in the MAC frame of FIG. 7.

FIG. 9 exemplarily shows a VHT format of the HT Control field in the MAC frame of FIG. 7.

Referring to FIG. 9, the HT Control field may include a VHT subfield, an MRQ subfield, an MSI subfield, an MFSI/GID-L (MCS Feedback Sequence Indication/LSB of Group ID) subfield, an MFB subfield, a GID-H (MSB of Group ID) subfield, a Coding Type subfield, an FB Tx Type (Transmission type of MFB response) subfield, an Unsolicited MFB subfield, an AC Constraint subfield, and an RDG/More PPDU subfield. In addition, the MFB subfield may include a VHT N_STS (Number of Space Time Streams) subfield, MCS subfield, a BW (Bandwidth) subfield, and an SNR (Signal to Noise Ratio) subfield.

Table 1 provides descriptions of the subfields in the VHT format of the HT Control field.

TABLE 1

| Subfield | Meaning | Definition |
| --- | --- | --- |
| MRQ | MCS request | Set to 1 when the MCS feedback (solicited MFB) is requested. Otherwise, set to 0. |
| MSI | MRQ sequence identifier | When the MRQ subfield is set to 1, the MSI subfield includes a sequence number for identifying a specific request between 0 and 6. If the MRQ subfield is set to 0, the MSI subfield is reserved. |

TABLE 1-continued

| Subfield | Meaning | Definition |
| --- | --- | --- |
| MFSI/GID-L | MFB sequence identifier/LSB of Group ID | If the unsolicited MFB subfield is set to 0, the MFSI/GID-L subfield includes a received value of the MSI included in a frame indicated by the MFB information. If the unsolicited MFB subfield is set to 1, the MFSI/GID-L subfield includes three least significant bits of Group ID of the PPDU indicated by the unsolicited MFB. |
| MFB | VHT N_STS, MCS, BW, SNR feedback | The MFB subfield includes a recommended MFB. If MCS = 15 and VHT N_STS = 7, this indicates that feedback is not present. |
| GID-H | MSB of Group ID | If the unsolicited MFB subfield is set to 1, the GID-H subfield includes three most significant bits of Group ID of the PPDU indicated by the unsolicited MFB. |
| Coding Type | Coding type of MFB response | If the unsolicited MFB subfield is set to 1, the Coding Type subfield contains coding information (1 for a binary convolutional code (BCC) and 0 for a low-density parity check (LDPC)) indicated by the unsolicited MFB. Otherwise, it is reserved. |
| FB Tx Type | Transmission type of MFB response | If the unsolicited MFB subfield is set to 1, and the FB Tx Type subfield is set to 0, the unsolicited MFB indicates one of transmission diversities using an unbeamformed VHT PPDU or an STBC (space-time block coding) VHT PPDU. If unsolicited MFB subfield is set to 1, and the FB Tx Type subfield is set to 1, the unsolicited MFB indicates the beamformed SU-MIMO (Single User MIMO) VHT PPDU. Otherwise, it is reserved. |
| Unsolicited MFB | Unsolicited MCS feedback indicator | If the MFB is not a response to the MRQ, this subfield is set to 1. If the MFB is a response to the MRQ, this subfield is set to 0. |
| AC Constraint | | If a response to the RDG includes a data frame from a certain traffic identifier (TID), this subfield is set to 0. If the response to the RDG includes only a frame from the same AC as that of the last data frame received from the same reverse direction (RD) initiator, this subfield is set to 1. |
| RDG/More PPDU | | The RDG/More PPDU subfield set to 0 indicates that there is no RDG if the RD initiator is transmitted, and indicates that the PPDU transmitting the MAC frame is the final transmission if an RD responder is transmitted. The RDG/More PPDU subfield set to 1 indicates that there is an RDG if the RD initiator is transmitted, and indicates that another PPDU follows the PPDU transmitting the MAC frame, if the responder is transmitted. |

Each of the aforementioned subfields, which are examples of subfields that can be included in the HT Control field, may be replaced with another subfield or include an additional subfield.

Meanwhile, the MAC sublayer transfers a MAC protocol data unit (MPDU) to a physical layer (PHY) as a PHY service data unit (PSDU). The PLCP entity adds a PHY header and a preamble to the received PSDU to create a PLCP protocol data unit (PPDU).

Figure 10:
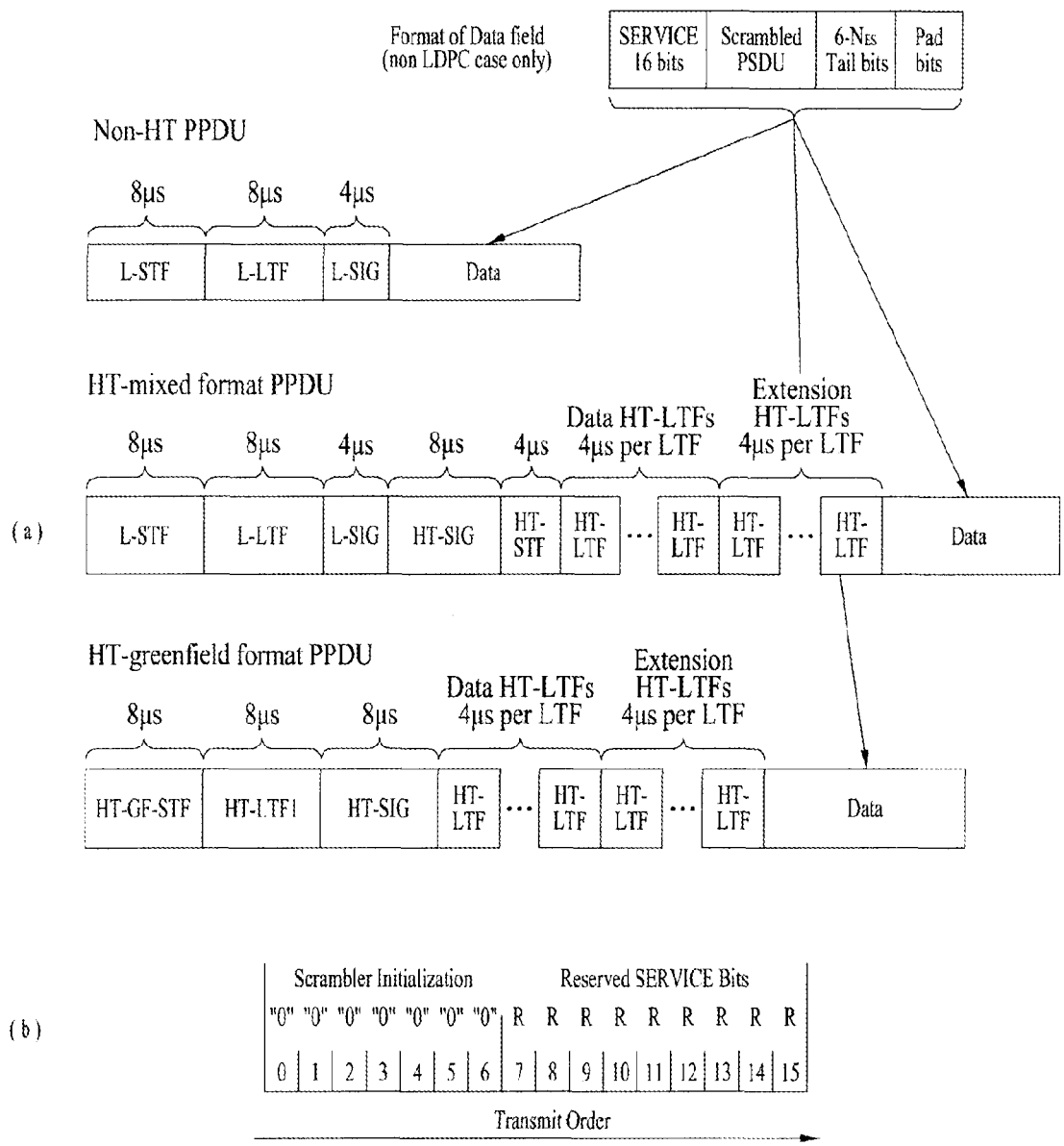
FIGS. 10a and b show exemplary PPDU frame formats of an IEEE 802.11n system to which the present invention is applicable.

FIG. 10 exemplarily shows PPDU frame formats of an IEEE 802.11n system to which the present invention is applicable.

FIG. 10(a) exemplarily shows PPDU frames according to a Non-HT format, an HT-mixed format, and an HT-greenfield format.

The Non-HT format represents a frame format for STAs of a conventional legacy system (IEEE 802.11a/g). A Non-HT format PPDU includes a legacy format preamble configured with an L-STF (Legacy-Short Training field), an L-LTF (Legacy-Long Training field), and an L-SIG (Legacy-Signal) field.

The HT-mixed format allows STAs of a conventional legacy system to perform communication, and at the same time represents a frame format for STAs of IEEE 802.11n. An HT-mixed format PPDU includes a legacy format preamble including an L-STF, an L-LTF and an L-SIG, and an HT format preamble including an HT-short training field (HT-STF), an HT-long training field (HT-LTF) and an HT-signal (HT-SIG) field. Since the L-STF, L-LTF and L-SIG represent legacy fields for backward compatibility, the L-STF, L-LTF and L-SIG are identical to those of the Non-HT format, and an STA may recognize the mixed format PPDU based on the HT-SIG field following these fields.

The HT-Greenfield format, which is not compatible with the conventional legacy system, represents a frame format for STAs of IEEE 802.11n. The HT-greenfield format PPDU includes a Greenfield preamble configured with an HT-GF-STF (HT-Greenfield-STF), an HT-LTF1, an HT-SIG, and at least one HT-LTF.

The Data field includes a SERVICE field, a PSDU, tail bits, and pad bits. All the bits of the Data field are scrambled.

FIG. 10(b) shows the SERVICE field included in the Data field. The Service field has 16 bits. Numbers from 0 to 15 are assigned to the bits respectively, and the bits are sequentially transmitted from bit #0. The bits from bit #0 to bit #6 are set to 0 and used to synchronize the descrambler in the receiver.

Figure 11:
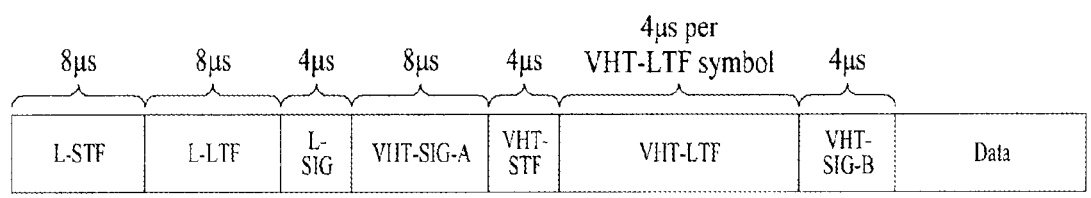
FIG. 11 exemplarily shows a VHT PPDU frame format of an IEEE 802.11ac system to which the present invention is applicable.

FIG. 11 exemplarily shows a VHT PPDU frame format of an IEEE 802.11ac system to which the present invention is applicable.

Referring to FIG. 11, a VHT format PPDU includes a legacy format preamble, which is ahead of the Data field and includes an L-STF, an L-LTF, and L-SIG, and a VHT format preamble, which includes a VHT-SIG-A, an HT-STF and an HT-LTF. Since the L-STF, L-LTF and L-SIG represent legacy fields for backward compatibility, the fields from the L-STF to the L-SIG are identical to those of the Non-HT format, and an STA may identify the VHT format PPDU using the VHT-SIG field subsequent to these fields.

The L-STF is a field for frame detection, auto gain control (AGC), diversity detection, coarse frequency/time synchronization, and the like. The L-LTF is a field for fine frequency/time synchronization, channel estimation, and the like. The L-SIG is a field for transmission of legacy control information. The VHT-SIG-A is a VHT field for transmission of control information shared by the VHT STAs. The VHT-STF is a field for AGC for MIMO and beamformed streams. The VHT-LTF is a field for channel estimation for MIMO and beamformed streams. The VHT-SIG-B is a field for transmission of STA-specified control information.

Medium Access Mechanism

In the IEEE 802.11-based WLAN system, a basic access mechanism of medium access control (MAC) is a Carrier Sense Multiple Access with Collision Avoidance (CSMA/CA) mechanism. The CSMA/CA mechanism, which is also called a Distributed Coordination Function (DCF) of IEEE 802.11 MAC, basically employs a "listen before talk" access mechanism. In accordance with this access mechanism, the AP and/or STA may perform Clear Channel Assessment (CCA) of sensing a radio frequency channel or medium in a predetermined time interval (e.g., DCF Inter-Frame Space (DIFS), prior to data transmission. When it is determined in the sensing that the medium is in the idle state, frame transmission begins through the medium. On the other hand, when it is sensed that the medium is in the occupied state, the AP and/or STA does not start transmission, but establishes a delay time (e.g., a random backoff period) for medium access, and attempts to perform frame transmission after waiting during the period. Through application of a random backoff period, it is expected that multiple STAs will attempt to start frame transmission after waiting for different times, resulting in minimized collision.

In addition, the IEEE 802.11 MAC protocol provides a hybrid coordination function (HCF). HCF is based on the DCF and the point coordination function (PCF). PCF refers to a polling-based synchronous access scheme in which polling is periodically executed to allow all reception APs and/or STAs to receive a data frame. In addition, the HCF includes enhanced distributed channel access (EDCA) and HCF controlled channel access (HCCA). EDCA is achieved when the access scheme provided to multiple users by a provider is based on contention. HCCA is achieved in the contention-free channel access scheme which employs the polling mechanism. In addition, the HCF includes a medium access mechanism for improving Quality of Service (QoS) of the WLAN, and may transmit QoS data during both the contention period (CP) and the contention free period (CFP).

Figure 12:
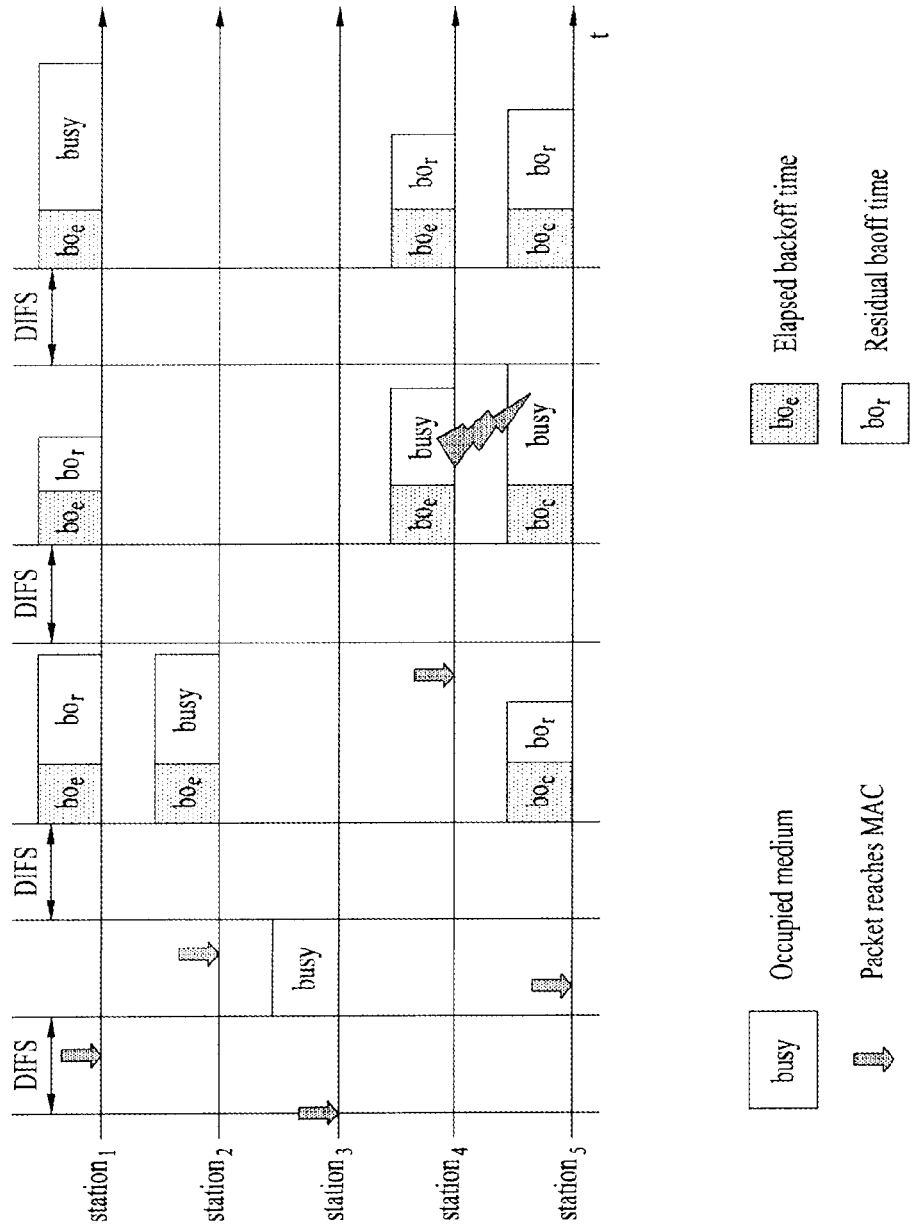
FIG. 12 illustrates a backoff process in a WLAN system to which the present invention is applicable.

FIG. 12 illustrates a backoff process in a WLAN system to which the present invention is applicable.

Operations based on a random backoff period will be described below with reference to FIG. 12.

If the medium is switched from the occupied or busy state to the idle state, several STAs may attempt to transmit data (or frames). In a method to minimize collisions, each STA selects a random backoff count, waits for a slot time corresponding to the selected backoff count, and then attempts to start transmission. The random backoff count has a value of a pseudo-random integer, and may be set to a value in a range between 0 and CW. Herein, CW is a contention window parameter value. Although the CW parameter is given CWmin as the initial value, the initial value may be doubled if transmission fails (for example, if ACK of the transmission frame is not received). If the CW parameter value is CWmax, CWmax is maintained until data transmission is successful, and at the same time data transmission may be attempted. If data transmission is successful, the CW parameter value is reset to CWmin. Preferably, the values of CW, CWmin, and CWmax are set to $2n-1$ (where $n=0, 1, 2, \ldots$).

Once the random backoff process begins, the STA continuously monitors the medium while counting down the backoff slot according to a determined backoff count value. If the medium is monitored as being in the occupied state, the STA stops the countdown and waits for a predetermined time. If the medium is in the idle state, the remaining countdown restarts.

In the example shown in FIG. 12, if a packet for STA3 to transmit reaches MAC of STA3, the STA3 may confirm that the medium is in the idle state in the DIFS and immediately transmit a frame. In the meantime, the remaining STAs monitor the busy state of the medium, and operate in the standby mode. During operation of STA3, each of STA1, STA2, and STA5 may have data to be transmitted. If the idle state of the medium is monitored, each of STA1, STA2, and STA5 waits for the DIFS time and then performs countdown of the backoff slot according to a random backoff count value which they have selected. In the example shown in FIG. 12, STA2 selects the least backoff count value and STA1 selects the greatest backoff count value. That is, when the STA2 starts data transmission after completing backoff counting, the residual backoff time of STA5 is shorter than the residual backoff time of STA1. Each of STA1 and STA5 temporarily stops countdown and waits while STA2 occupies the medium. When occupancy by the STA2 is terminated and the medium returns to the idle state, each of STA1 and STA5 waits for a predetermined DIFS time, and restarts backoff counting. That is, after the residual backoff slot as long as the residual backoff time is counted down, frame transmission may start. Since the residual backoff time of STA5 is shorter than that of STA1, STA5 starts frame transmission. Meanwhile, STA4 may be given data to be transmitted while STA2 occupies the medium. In this case, when the medium is in the idle state, STA4 may wait for the DIFS time, perform countdown according to the random backoff count value selected by the STA4, and then start frame transmission. FIG. 12 exemplarily illustrates a case in which the residual backoff time of STA5 is equal to the random backoff count value of STA4 by chance. In this case, collision may occur between STA4 and STA5. If collision occurs between STA4 and STA5, none of STA4 and STA5 receives ACK, and accordingly data transmission fails. In this case, each of STA4 and STA5 may double the CW value, select a random backoff count value and then perform countdown. Meanwhile, STA1 waits while the medium is in the occupied state due to transmission operation by STA4 and STA5. In this case, when the medium returns to the idle state, STA1 may wait for the DIFS time, and then start frame transmission after lapse of the residual backoff time.

Sensing Operation of STA

As described above, the CSMA/CA mechanism includes not only a physical carrier sensing through which the AP and/or STA directly sense the medium, but also virtual carrier sensing. The virtual carrier sensing is performed to address some problems (such as a hidden node problem) encountered in the medium access. In the virtual carrier sensing, MAC of the WLAN system may use a network allocation vector (NAV). By means of the NAV value, the AP and/or STA which is using the medium or has authority to use the medium indicates, for another AP and/or another STA, the remaining time until the medium becomes available. Accordingly, the NAV value may correspond to a reserved period during which the medium is used by the AP and/or STA to transmit a frame. An STA having received the NAV value may be prohibited from medium access during the corresponding period. For example, NAV may be set according to the value of the duration field in the MAC header of a frame.

A robust collision detection mechanism has been introduced to reduce the probability of such collision. Hereinafter, this mechanism will be described with reference to FIGS. 13 and 14. The actual carrier sensing range may not be identical to the transmission range, but for simplicity of description, it will be assumed that the actual carrier sensing range is identical to the transmission range.

FIG. 13 illustrates a hidden node and an exposed node.

FIG. 13(a) exemplarily shows a hidden node. In FIG. 13(a), STA A communicates with STA B, and STA C has information to be transmitted. Specifically, STA C may determine that the medium is in the idle state in performing carrier sensing prior to transmission of data to STA B, even in a situation in which STA A is transmitting information to STA B. This is because transmission by STA A (i.e., occupied medium) may not be sensed at the location of STA C. In this case, collision may occur since STA B receives information of STA A and information of STA C simultaneously. In this case, STA A may be considered a hidden node of STA C.

FIG. 13(b) exemplarily shows an exposed node. In FIG. 13(b), STA C has information to be transmitted to STA D in a situation in which STA B is transmitting data to STA A. In this case, STA C may perform carrier sensing and determine that the medium is occupied due to transmission of STA B. Therefore, although STA C has information to be transmitted to STA D, STA C should wait until the medium returns to the idle state since the occupied state of the medium is sensed. However, since STA A is actually located out of the transmission range of STA C, transmission from STA C may not collide with transmission from STA B in view of STA A, and STA C is unnecessarily waiting until STA B stops transmission. In this case, STA C may be viewed as an exposed node of STA B.

FIG. 14 illustrates RTS and CTS.

In order to efficiently utilize the collision avoidance mechanism in an exemplary situation as shown in FIG. 13, short signaling packets such as RTS (request to send) and CTS (clear to send) may be used. RTS/CTS between two STAs may be overheard by nearby STA(s), such that the nearby STA(s) may consider whether information is communicated between the two STAs. For example, if an STA to transmit data transmits an RTS frame to another STA to receive data, the STA to receive data may transmit the CTS frame to nearby STAs, thereby informing the nearby STAs that the STA is about to receive data.

FIG. 14(a) exemplarily shows a method to solve the hidden node problem. The method assumes a situation in which both STA A and STA C attempt to transmit data to STA B. If STA A transmits RTS to STA B, STA B transmits CTS to both STA A and STA C located around STA B. As a result, STA C waits until STA A and STA B stop data transmission, and thus collision is avoided.

FIG. 14(b) exemplarily shows a method to solve the exposed node problem. STA C may overhear RTS/CTS transmission between STA A and STA B, thereby determining that no collision will occur when it transmits data to another STA (e.g., STA D). That is, STA B may transmit RTS to all the nearby STAs, and transmits CTS only to STA A which actually has data to transmit. Since STA C receives only the RTS, but fails to receive the CTS of STA A, STA C may recognize that STA A is located out of the carrier sensing range of STA C.

Inter-Frame Space (IFS)

A time gap between two frames is defined as an inter-frame space (IFS). The ST determines, through carrier sensing, whether a channel is used in the IFS. The DCF MAC layer defines four IFSs. Thereby, priorities for occupancy of a WM are determined.

Each of the IFSs is set to a specific value according to a PHY, regardless of the bit rates of the STAs. The IFSs include a short IFS (SIFS), a PCF IFS (PIFS), a DCF IFS (DIFS), and an extended IFS (EIFS). The short IFS (SIFS) is used in transmitting RTS/CTS and an ACK frame, and has the highest priority. The PCF IFS (PIFS) is used in transmitting the PCF frame, and the DCF IFS (DIFS) is used in transmitting the DCF frame. The extended IFS (EIFS) is used only when an error occurs in frame transmission and the length thereof is not fixed.

Figure 15:
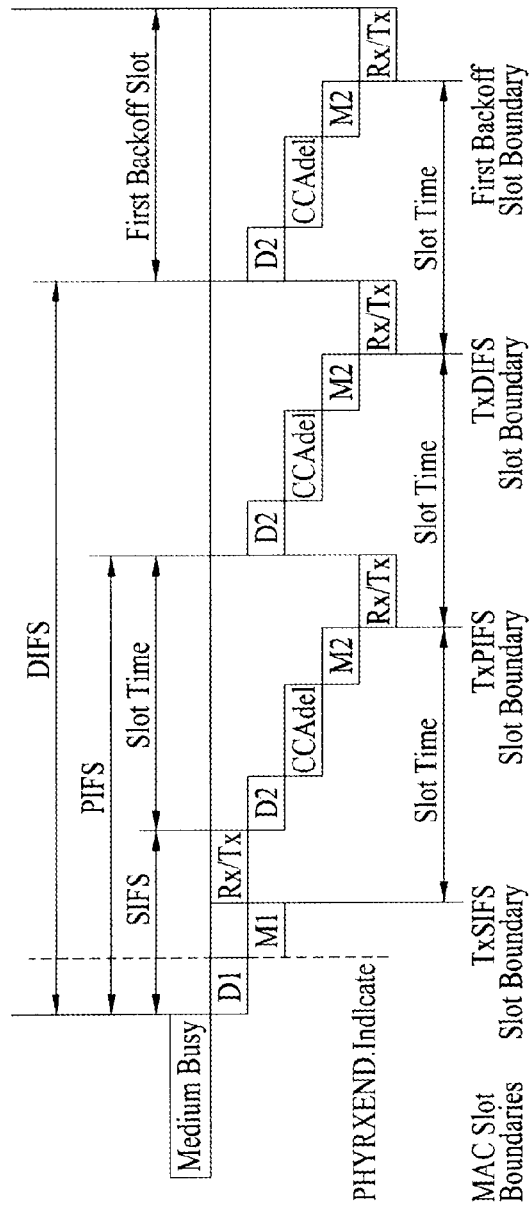
FIG. 15 illustrates an exemplary relationship between IFSs.

The relationship between IFSs is defined by a time gap therebetween on the medium, and relevant attributes are provided by physical layers as shown in FIG. 15.

FIG. 15 illustrates an exemplary relationship between IFSs.

In the entire medium timing, the termination time point of the last symbol of a PPDU indicates termination of transmission, and the first symbol of the preamble of the next PPDU indicates start of transmission. The entire timing may be set with reference to the PHY-TXEND.confirm primitive, PHYTXSTART.confirm primitive, PHY-RXSTART.indication primitive and PHY-RXEND.indication primitive.

Referring to FIG. 15, the SIFS time (aSIFSTime) and the slot time (aSlotTime) may be determined for the respective PHYs. The SIFS time may have a fixed value, and the slot time may dynamically change according to change of the wireless delay time (aAirPropagationTime). The SIFS time and slot time are respectively defined as Equations 1 and 2 given below.

$$a\text{SIFSTime} = a\text{RxRFDelay} + a\text{RxPLCPDelay} + a\text{MACProcessingDelay} + a\text{RxTxTurnaroundTime} \quad \text{Equation 1}$$

$$a\text{SlotTime} = a\text{CCATime} + a\text{RxTxTurnaroundTime} + a\text{AirPropagationTime} + a\text{MACProcessingDelay} \quad \text{Equation 2}$$

PIFS and SIFS are respectively defined as Equation 3 and 4 given below.

$$\text{PIFS} = a\text{SIFSTime} + a\text{SlotTime} \quad \text{Equation 3}$$

$$\text{DIFS} = a\text{SIFSTime} + 2 * a\text{SlotTime} \quad \text{Equation 4}$$

EIFS is calculated from SIFS, DIFS and ACK transmission time (ACKTxTime) as in Equation 5 below. ACK transmission time (ACKTxTime) is expressed in microseconds and has a value necessary for transmission of an ACK frame containing a preamble, a PLCP header and additional PHY-dependent information at the lowest PHY mandatory rate.

$$\text{EIFS} = a\text{SIFSTime} + \text{DIFS} + \text{ACKTxTime} \quad \text{Equation 5}$$

In the example shown in FIG. 15, SIFS, PIFS and DIFS are measured on different MAC slot boundaries (TxSIFS, TxPIFS, TxDIFS) of the medium. A slot boundary is defined as the time at which the transmitter is turned on by the MAC layer to match different IFS timings on the medium after detection of a CCA result at the previous slot time. The MAC slot boundaries for SIFS, PIFS and DIFS are defined by Equations 6 to 8 given below.

$$TxSIFS = SIFS - aRxTxTurnaroundTime \quad \text{Equation 6}$$

$$TxPIFS = TxSIFS + aSlotTime \quad \text{Equation 7}$$

$$TxDIFS = TxSIFS + 2*aSlotTime \quad \text{Equation 8}$$

Power Management

As described above, STAs in the WLAN system should perform channel sensing before they perform transmission/reception operation. Persistently performing channel sensing causes persistent power consumption of the STA. There is not much difference in power consumption between the reception state and the transmission state, and continuous maintenance of the reception state may cause large load to the STAs provided with limited power (i.e., operated by a battery). Therefore, if an STA maintains the reception standby mode so as to persistently sense the channel, power is inefficiently consumed without special advantages in terms of WLAN throughput. To address this problem, the WLAN system supports a power management (PM) mode of the STA.

The PM mode of the STA is classified into an active mode and a power save (PS) mode. The STA is basically operated in the active mode. The STA operating in the active mode maintains an awake state. When the STA is in the awake state, the STA may normally perform frame transmission/reception, channel scanning, or the like. On the other hand, the STA in the PS mode operates by being switched between the sleep state and the awake state. The STA in the sleep state operates with minimum power and does not perform either frame transmission/reception or channel scanning.

As the time for which the STA operates in the sleep state increases, the amount of power consumption of the STA is reduced, and accordingly the STA operation period increases. However, since transmission or reception of the frame is not allowed in the sleep state, the STA cannot operate unconditionally in the sleep state for a long time. When the STA operating in the sleep state is given a frame to be transmitted to the AP, it may be switched to the awake state to transmit/receive the frame. On the other hand, when the AP has a frame to transmit to the STA which is in sleep-state, the STA cannot receive the frame. Nor can the STA recognize presence of the frame. Accordingly, in order to recognize presence or absence of a frame to be transmitted to the STA (or in order to receive the frame if the frame is present), the STA may need to be switched to the awake state according to a specific period.

Figure 16:
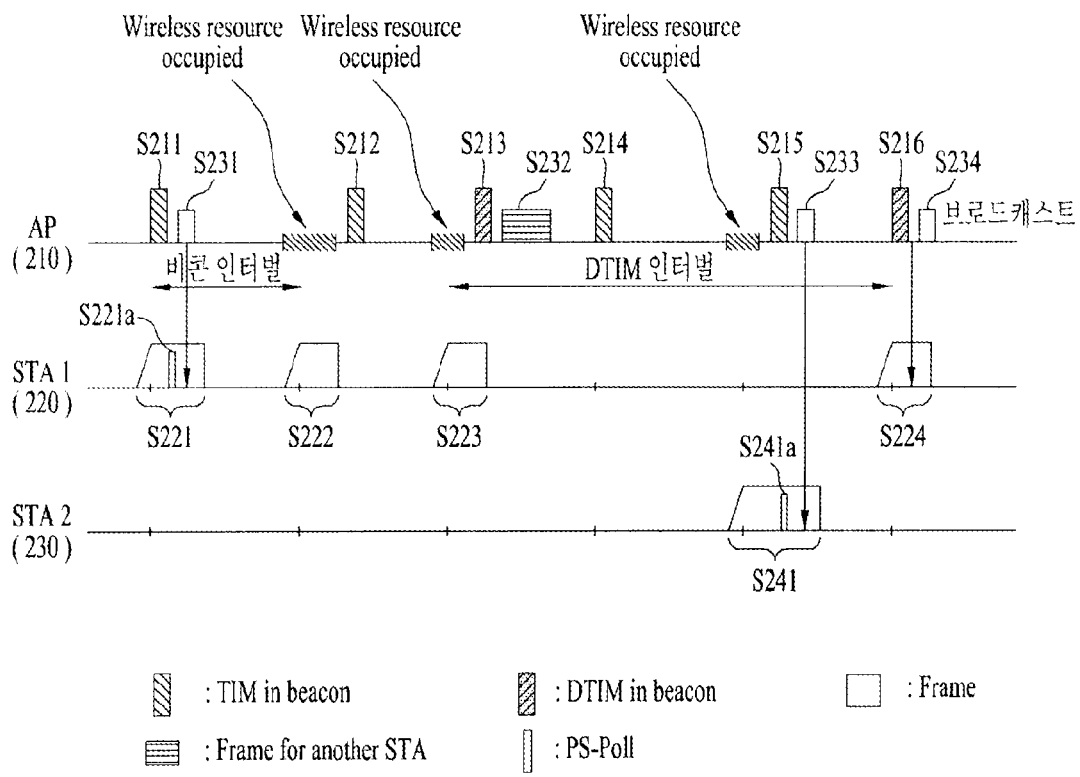
FIG. 16 illustrates a power management operation.

FIG. 16 illustrates a power management operation.

Referring to FIG. 16, AP 210 transmits a beacon frame to STAs present in the BSS at predetermined time intervals (S211, S212, S213, S214, S215 and S216). The beacon frame includes a traffic indication map (TIM) information element. The TIM information element contains information indicating that the AP 210 has buffered traffic for the STAs associated with the AP 210 and that a frame will be transmitted. The TIM element includes a TIM used to inform of a unicast frame and a delivery traffic indication map (DTIM) used to inform of a multicast or broadcast frame.

AP 210 may transmit a DTIM once per three transmissions of the beacon frame.

STA1 220 and STA2 222 are operating in the PS mode. Each of STA1 220 and STA2 222 may be set to be switched from the sleep state to the awake state at every wakeup interval of a predetermined period to receive the TIM element transmitted by the AP 210. Each STA may calculate a switching time to switch to the awake state, based on its own local clock. In the example shown in FIG. 15, it is assumed that the clock of the STA coincides with that of the AP.

For example, the predetermined wakeup interval may be set in such a manner that STA1 220 can switch to the awake state at every beacon interval to receive the TIM element. Accordingly, when AP 210 transmits the beacon frame for the first time (S211), STA1 220 may switch to the awake state (S221). Thereby, STA1 220 may receive the beacon frame and acquire the TIM element. If the acquired TIM element indicates that there is a frame to be transmitted to STA1 220, STA1 220 may transmit a power save-Poll (PS-Poll) frame, which requests transmission of the frame, to the AP 210 (S221*a*). In response to the PS-Poll frame, the AP 210 may transmit the frame to STA 1 220 (S231). After completing reception of the frame, STA1 220 is switched back to the sleep state to operate in the sleep state.

When the AP 210 transmits the beacon frame for the second time, the medium is in the busy state in which the medium is accessed by another device, and accordingly the AP 210 may not transmit the beacon frame at the correct beacon interval, but may transmit the beacon frame at a delayed time (S212). In this case, STA1 220 is switched to the awake state in accordance with the beacon interval, but does not receive the beacon frame whose transmission is delayed, and is thus switched back to the sleep state (S222).

When the AP 210 thirdly transmits the beacon frame, the beacon frame may include a TIM element set to a DTIM. However, since the medium is in the busy state, the AP 210 transmits the beacon frame at a delayed time (S213). STA1 220 is switched to the awake state in accordance with the beacon interval, and may acquire the DTIM through the beacon frame transmitted by the AP 210. It is assumed that the DTIM acquired by STA1 220 indicates that there is no frame to be transmitted to STA1 220, but there is a frame for another STA. In this case, STA1 220 may confirm that there is no frame to receive and be switched back to the sleep state to operate in the sleep state. After transmission of the beacon frame, the AP 210 transmits the frame to the corresponding STA (S232).

The AP 210 fourthly transmits the beacon frame (S214). STA1 220 may adjust the wakeup interval for reception of the TIM element since it did not acquire information indicating presence of buffered traffic for STA1 220 through the two previous operations of reception of the TIM element. Alternatively, provided that signaling information for adjustment of the value of the wakeup interval of STA1 220 is contained in the beacon frame transmitted by the AP 210, the wakeup interval value of the STA1 220 may be adjusted. In this example, STA1 220 may be set to be switched to the awake state once at every three beacon intervals to receive a TIM element rather than being set to be switched between the operating states at every beacon interval. Therefore, when the AP 210 fifthly transmits the beacon frame (S215) after the fourth transmission of the beacon frame (S214), STA1 220 maintains the sleep state, and thus cannot acquire the corresponding TIM element.

When AP 210 sixthly transmits the beacon frame (S216), STA1 220 may be switched to the awake state and acquire the TIM element contained in the beacon frame (S224). Since the TIM element is a DTIM indicating presence of a broadcast frame, STA1 220 may receive the broadcast frame transmitted by the AP 210 without transmitting a PS-Poll frame to the AP 210 (S234). In the meantime, the wakeup interval set by STA2 230 may have a greater length than the wakeup interval of STA1 220. Accordingly, STA2 230 is switched to the awake state at a time point (S215) when the AP 210 fifthly transmits the beacon frame, such that the STA2 230 may receive the TIM element (S241). STA2 230 may recognize presence of a frame to be transmitted thereto through the TIM element and transmit the PS-Poll frame to the AP 210 in order to request frame transmission (S241a). The AP 210 may transmit the frame to STA2 230 in response to the PS-Poll frame (S233).

In order to operate/manage the PS mode as shown in FIG. 16, the TIM element includes a TIM indicating presence or absence of a frame to be transmitted to the STA or a DTIM indicating presence or absence of a broadcast/multicast frame. The DTIM may be implemented through field setting for the TIM element.

Figure 17:
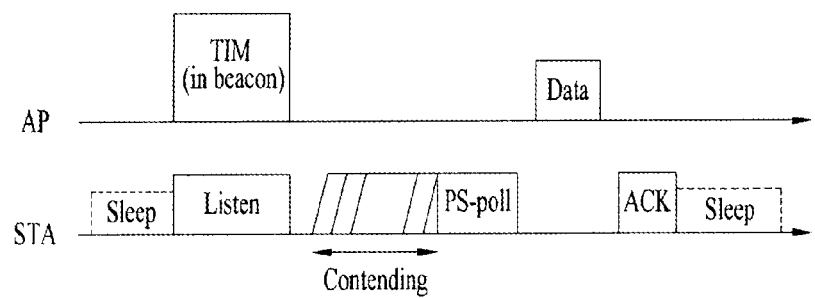

FIGS. 17 to 19 illustrate operations of an STA having received a TIM in detail.

Referring to FIG. 17, an STA is switched from the sleep state to the awake state to receive the beacon frame including a TIM from the AP. The STA interprets the received TIM element such that it can recognize presence of buffered traffic to be transmitted thereto. After the STA contends with other STAs to access the medium for PS-Poll frame transmission, the STA may transmit a PS-Poll frame to the AP to request data frame transmission. The AP, upon receiving the PS-Poll frame transmitted from the STA, may transmit the frame to the STA. The STA may receive the data frame and transmit an ACK frame to the AP in response to the received data frame. Thereafter, the STA may be switched back to the sleep state.

As shown in FIG. 17, the AP may operate in a manner of immediate response in which the AP transmits the data frame when a predetermined time (e.g., a short inter-frame space (SIFS)) elapses after the AP receives the PS-Poll frame from the STA. However, the AP may operate in a manner of deferred response if the AP fails to prepare a data frame to be transmitted to the STA for the SIFS time after receiving the PS-Poll frame, which will be described in detail with reference to FIG. 18.

In the example of FIG. 18, the operations of the STA of switching from the sleep state to the awake state, receiving a TIM from the AP, and transmitting the PS-Poll frame to the AP through contention are identical to those in the example of FIG. 16. If the AP having received the PS-Poll frame fails to prepare a data frame for the SIFS time, the AP may transmit an ACK frame to the STA instead of transmitting the data frame. If the data frame is prepared after transmission of the ACK frame, the AP may perform contention and transmit the data frame to the STA. The STA may transmit the ACK frame indicating successful reception of the data frame to the AP, and then be switched to the sleep state.

FIG. 19 shows an exemplary case in which AP transmits DTIM. STAs may be switched from the sleep state to the awake state so as to receive the beacon frame including a DTIM element from the AP. The STAs may recognize, through the received DTIM, that a multicast/broadcast frame will be transmitted. After transmitting the beacon frame including the DTIM, the AP may immediately transmit data (i.e., a multicast/broadcast frame) without transmitting/receiving the PS-Poll frame. While the STAs continue to maintain the awake state even after receiving the beacon frame including the DTIM, the STAs may receive data and then switch back to the sleep state after data reception is completed.

In the operation and management method of the power save (PS) mode based on the TIM (or DTIM) protocol described above with reference to FIGS. 17 to 19, STAs may determine presence or absence of a data frame to be transmitted therefor through STA identification information contained in the TIM element. STA identification information may be specific information associated with an association identifier (AID) to be allocated when an STA is associated with an AP.

The AID is used as a unique ID of each STA within a BSS. For example, in the current WLAN system, an AID may be assigned a value between 1 and 2007. In the currently defined WLAN system, 14 bits for the AID may be allocated to a frame transmitted by an AP and/or an STA. Although the AID may be assigned any value up to 16383, the values from 2008 to 16383 are set as reserved values.

FIG. 20 illustrates an exemplary format of a TIM element.

Referring to FIG. 20, the TIM element format includes an Element ID field, a Length field, a DTIM Count field, a DTIM Period field, a Bitmap Control field, and a Partial Virtual Bitmap field. The Length field indicates the length of the information field. The DTIM Count field indicates how many beacon frames remain until the next DTIM is transmitted. The DTIM Period field indicates the number of beacon intervals between consecutive DTIMs. If all the TIMs are DTIMs, the DTIM period field is set to 1. A value of the DTIM Period field consists of one octet with the value of 0 reserved. The Bitmap Control field consists of one octet. Bit 0 of the Bitmap Control field is a Traffic Indicator bit for AID 0. If one or more group-addressed MSDUs (MAC service data units)/MMPDUs (MAC management protocol data units) have data to be transmitted to an AP or a mesh STA, the DTIM Count field is set to 0, and Bit 0 of the Bitmap Control field is set to 1. The remaining 7 bits of the first octet indicate a bitmap offset. The traffic-indication virtual bitmap in the AP or the mesh STA that produces TIM consists of 2008 bits (=251 octets). In the bitmap, the bit number N ($0<=N<=2007$) may be indicated by an octet number N/8 and a bit number (N mod 8). Each bit in the traffic-indication virtual bitmap indicates presence or absence of data to be transmitted by the AP. If there is data to be transmitted by the AP for the individually addressed MSDU/MMPDU (AID=N), the bit number N is set to 1. If there is no data to be transmitted, the bit number N is set to 0.

Each of the aforementioned fields, which are examples of fields that can be included in the TIM element, may be replaced with another field or include an additional field.

Power Management Using Automatic Power Saving Delivery

The IEEE 802.11e system provides an automatic power saving delivery (APSD) method as well as the aforementioned PS method which is based on PS-Poll. The APSD method is broadly classified into scheduled-APSD (S-APSD) and unscheduled-APSD (U-APSD). U-APSD represents a mechanism by which an AP (QoS AP) supporting APSD operates in the power save mode in which the AP (QoS AP) is switched between the awake state and the doze state, and at the same time transmits a downlink frame to an STA (QoS STA) which supports APSD.

The Quality of Service (QoS) AP capable of supporting APSD may signal the capability to the STA using a beacon, a probe response, and an APSD subfield of the Capability Information field in the (re)association response management frame.

An STA may use U-APSD to receive part or the entirety of the bufferable units (BUs) of the STA transmitted from the AP during the unscheduled-service period (hereinafter, referred to as "u-SP"). If the period is not the u-SP, the STA transmits QoS data or a QoS Null frame belonging to an access category (AC) set to "trigger-enabled" to the AP, thereby starting the u-SP. An uplink frame transmitted at this time is referred to as a trigger frame. An aggregate MPDU (A-MPDU) includes one or more trigger frames. The u-SP is terminated after the AP attempts transmission of a transmissible AC and at least one BU reserved for a corresponding STA. However, if the Max SP Length field of the QoS capability element in a (re)association request frame of the STA is set to a value other than 0, the u-SP length is limited by the value indicated in this field.

In order to receive a BU from the AP during the u-SP, the STA designates one or more delivery-enabled and trigger-enabled ACs thereof. In the IEEE 802.11e system, eight different priorities and four ACs which are based on the priorities are defined to provide QoS. The STA may perform the setting operation using two methods to allow the AP to use the U-APSD. First, the STA may set individual U-APSD flag bits in the QoS information (QoS Info) subfield of the QoS Capability element transmitted in the (re)association request frame. If the U-APSD flag bit is 1, this indicates that the corresponding AC is transmissible and trigger-enabled. When all four U-APSD flag subfields in the (re)association request frame are set to 1, all the ACs related to the STA are transmissible and trigger-enabled during (re)association. When all four U-APSD flag subfields in the (re)association request frame are set to 0, none of the ACs related to the STA are transmissible and triggerable during the (re)association. Alternatively, the STA may designate one or more trigger-enabled and transmissible ACs by transmitting, to the AP, an add traffic stream (ADDTS) request frame (ADDTS Request frame) having an APSD subfield set to 1 for each AC and the Schedule subfield set to 0 in the traffic stream information field (TS Info field) of the traffic specification element (TSPEC element). Setting APSD in the TSPEC request may have higher priority than setting static U-APSD transmitted in the QoS Capability element. In other words, the TSPEC request may be overwritten in certain previous U-APSD setting of AC. This request may be transmitted for an AC having an ACM subfield set to 0.

The STA may set the AC to be trigger-enabled or transmissible by configuring a TSPEC having APSD subfield set to 1 and the Schedule subfield set to 0 in uplink or downlink transmission. For the uplink TSPEC, downlink TSPEC or bidirectional TSPEC which has APSD subfield set to 1 and the Schedule subfield set to 0, the AC may be set to be trigger-enabled and transmissible. For the uplink TSPEC, downlink TSPEC or bidirectional TSPEC which has both APSD subfield and the Schedule field set to 0, the AC may be set to be trigger-disabled and non-transmittable.

The scheduled-service period (hereinafter, referred to as "s-SP") begins with a specific fixed time interval in the Service Interval field. When the access policy controls channel access, the STA may transmit, to the AP, an ADDTS Request frame having APSD subfield of TS Info field set to 1 in the TSPEC element, in order to use the s-SP for a TS. On the other hand, when the access policy supports contention-based channel access, the STA may transmit, to the AP, the ADDTS Request frame having APSD subfield and the Schedule field set to 1 in the TS Info field of the TSPEC element, in order to use the s-SP for the TS. If the APSD mechanism is supported by the AP and the AP accepts the corresponding ADDTS Request frame from the STA, the AP may respond with an ADDTS Response frame including the Schedule element which indicates that the requested service can be provided by the AP. If the lower four octets of a timing synchronization function (TSF) timer are equal to a specific value of the Service Start Time field, the initial s-SP begins. The STA using the s-SP may wake up for the first time to receive a buffered and/or polled BU individually addressed to the STA by an AP or a hybrid coordinator (HC). Thereafter, the STA may wake up at certain time intervals identical to the service intervals (SIs). The AP may adjust the service start time through the successful ADDTS Response frame (a response to the ADDTS Request frame) and the Schedule element in a schedule frame (transmitted at a different time).

The s-SP begins at the service start time indicated in the Schedule element transmitted in response to the TSPEC and at the scheduled wake-up time corresponding to the SI. Thereafter, the STA wakes up at a time point defined by Equation 9 given below.

$$(TSF - \text{service start time}) \bmod \text{minimum SI} = 0 \qquad \text{Equation 9}$$

When the s-SP period is supported in a BSS, the STA may use both U-APSD and S-APSD for different ACs at the same time. When scheduled transmission for an AC is configured for the STA, the AP neither transmits a BU which uses the AC during the SP initiated by a trigger frame, nor processes the BU which uses the AC and is received from the STA through the trigger frame. The AP does not reject a certain ADDTS Request frame indicating use of both S-APSD and U-APSD that is to be used for the same AC at the same time. APSD may be used only for transmission of an individually addressed BU. Transmission of a group-addressed BU may comply with a frame transmission rule for group-addressed BUs.

A non-AP STA using U-APSD may not receive all the frames transmitted from the AP during the service period due to interference observed by the non-AP STA. In this case, the AP may determine that a frame has not been correctly received by the non-AP STA even if the same interference is not observed. The U-APSD coexistence capability allows the non-AP STA to indicate, for the AP, a requested transmission duration to be used during a u-SP. By using the transmission duration, the AP may transmit a frame during the SP, and the probability that the non-AP STA receives the frame even given interference may be increased. The U-APSD coexistence capability reduces the chance of the AP failing to successfully receive the frame from the AP.

FIG. 21 illustrates an exemplary format of a U-APSD coexistence element.

Referring to FIG. 21, the Element ID field has a value equal to the U-APSD coexistence value. The Length field has a value obtained by adding the length of the additional subelements to 12. A TSF 0 Offset field set to a value other than 0 indicates time in microseconds after the time (TSF time 0) at which the non-AP STA recognizes start of interference. The AP uses the TSF 0 Offset field and the Interval/Duration field for transmission to the non-AP STA.

An STA for which "dot11MgmtOptionUAPSDCoexistenceActivated" has the "true" value is defined as an STA configured to support U-APSD coexistence. Herein, if "dot11MgmtOptionUAPSDCoexistenceActivated" has the value of "true" for the STA, the U-APSD Coexistence field of the Extended Capabilities element is set to 1. Otherwise, the U-APSD Coexistence field is set to 0. The non-AP STA associated with the AP (in a case in which both the non-AP STA and the AP have previously notified support of the U-APSD coexistence capability) may transmit the ADDTS Request frame including the U-APSD Coexistence element to the AP.

Hereinafter, content of an ADDTS Request frame that does not include the U-APSD Coexistence element will be referred to as a Base ADDTS Request. Upon successfully receiving the ADDTS Request frame, the AP processes the content of the Base ADDTS Request frame. If the AP determines that the Base ADDTS Request is not approvable, it does not process the U-APSD Coexistence element. On the other hand, if the AP determines that the Base ADDTS Request is approvable, it processes the U-APSD Coexistence element. If the AP supports transmission of a frame for a specific duration value of the Interval/Duration field in the U-APSD Coexistence element during the U-APSD service period, the AP may accept the ADDTS request. Otherwise, the AP may reject the ADDTS request.

If the AP has previously accepted the ADDTS request having the U-APSD coexistence element, a non-AP STA to continue to use a QoS service provided through the ADDTS Request frame which does not include the U-APSD Coexistence element may terminate use of U-APSD coexistence by transmitting the ADDTS Request frame which does not include a U-APSD Coexistence element. If the non-AP STA desires to terminate use of all QoS services provided through the ADDTS Request frame including U-APSD Coexistence, the non-AP STA may transmit a delete traffic stream (DELTS) Request frame to the AP.

If the previous ADDTS Request frame is made invalid by the last ADDTS Request frame that has been successfully received, the non-AP STA may transmit multiple ADDTS Request frames to the AP. The AP supporting the U-APSD coexistence and accepting the ADDTS request may limit the duration of the U-APSD coexistence service according to a parameter specified in the U-APSD Coexistence element of the ADDTS frame. In addition, the AP transmits a frame to the non-AP STA according to the following rule to make a request.

First, if the non-AP STA sets TSF 0 Offset to a value other than 0 in the U-APSD Coexistence element, the AP does not transmit a frame to the non-AP STA for the time out of the U-APSD coexistence service period. The U-APSD coexistence service period begins when the AP receives the U-APSD trigger frame, and then ends after a transmission period specified by Equation 10 given below.

$$\text{End of transmission period} = T + (\text{Interval} - ((T - \text{TSF 0 Offset}) \bmod \text{Interval})) \qquad \text{Equation 10}$$

In Equation 10, T denotes time at which a U-APSD trigger frame is received by the AP. In addition, Interval indicates the earliest one of the value of the Duration/Interval field of the U-APSD Coexistence element and the time at which transmission having the EOSP (end of service period) bit set to 1 is successful.

On the other hand, if the non-AP STA specifies 0 as the TSF 0 Offset value in the U-APSD Coexistence element, the AP does not transmit a frame to the non-AP STA at a time out of the U-APSD coexistence service period. The U-APSD coexistence service period starts when the AP receives the U-APSD trigger frame, and ends after a transmission period specified by Equation 11 given below.

$$\text{End of transmission period} = T + \text{Duration} \qquad \text{Equation 11}$$

In Equation 11, T denotes time at which the U-APSD trigger frame is received by the AP. In addition, Duration indicates one of the value of the Duration/Interval field of the U-APSD Coexistence element and the time of successful transmission with the EOSP bit set to 1, whichever is earlier.

If the AP determines during the U-APSD coexistence service period that the AP has another frame to be transmitted and that this frame will be successfully transmitted before the end of the service period, the AP may set the More bit to 1.

If the AP expects that a frame is the last frame to be transmitted to the non-AP STA during the U-APSD coexistence service period, the AP may set the EOSP bit to 1 in the corresponding frame. If the last frame is not successfully transmitted to the non-AP STA before the U-APSD coexistence service period ends, the AP transmits a QoS null frame with the EOSP bit set to 1. The non-AP STA may enter the doze state when the U-APSD coexistence service period ends.

Hidden Node Problem in the PS-Poll

Figure 22:
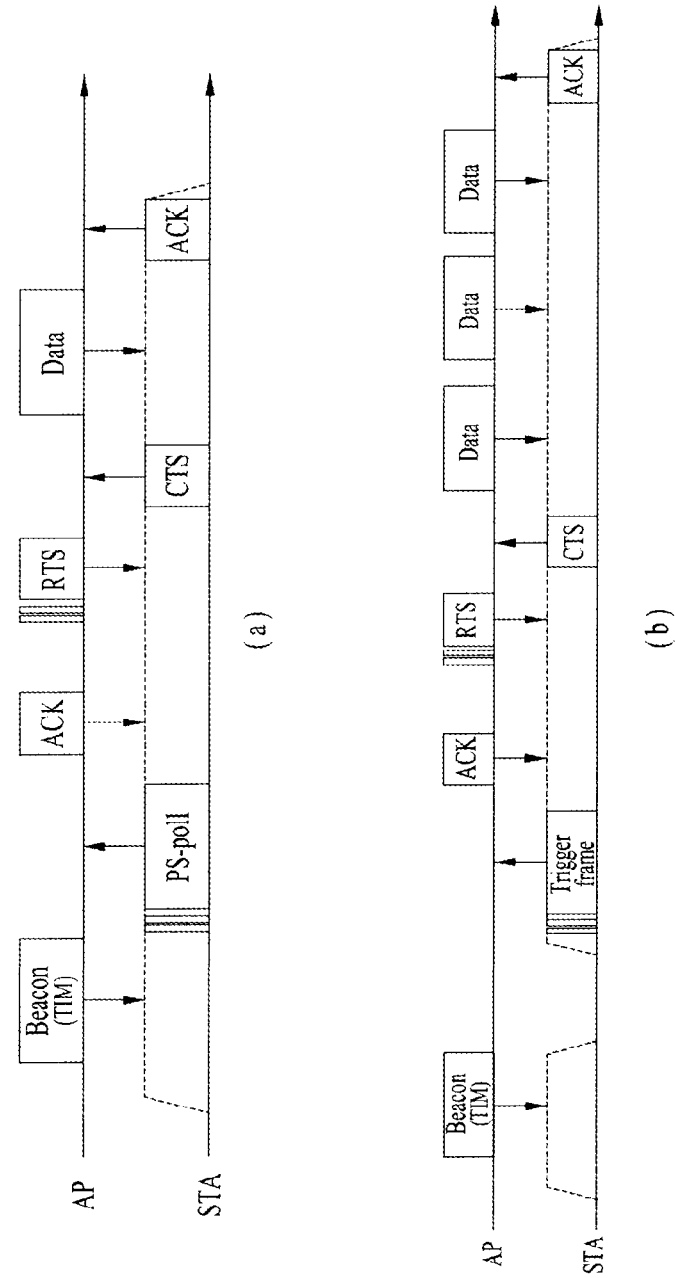
FIGS. 22 a and b illustrate the operation of an SAT according to a PS-Poll mechanism and a U-APSD mechanism.

FIG. 22 illustrates operation of an SAT according to a PS-Poll mechanism and a U-APSD mechanism.

FIG. 22(a) illustrates an exemplary PS-Poll mechanism, and FIG. 22(b) illustrates an exemplary U-APSD mechanism.

Referring to FIG. 22(a), the STA may recognize, through the TIM element of the beacon, presence or absence of a buffered traffic to be transmitted thereto by the AP. If a buffered traffic to be transmitted to the STA is present, the STA contends with other STAs according to the PS-Poll mechanism, and then makes a request for transmission of a data frame to the AP by transmitting a PS-Poll frame. If the AP fails to prepare a data frame to be transmitted to the STA for the SIFS time after receiving the PS-Poll frame, the AP may transmit an ACK frame to the STA instead of transmitting the data frame. If the data frame is prepared after transmission of the ACK frame, the AP exchanges an RTS/CTS frame with the STA and transmits the data frame to the STA after performing contention with the other STAs. Herein, the step of exchanging the RTS/CTS frame may be omitted. If reception of the data frame is successful, the STA transmits an ACK frame and then switches to the sleep state. However, in the case in which data transmission is performed according to the PS-Poll mechanism, only one PSDU is allowed to be transmitted to the STA at a time. Accordingly, if the AP has a large amount of data to be transmitted to the STA, transmission may be inefficiently performed.

To address this problem, the STA may receive several PSDUs from the AP at a time using the aforementioned U-APSD mechanism during its own service period (SP).

Referring to FIG. 22(b), the STA first recognizes, through the TIM element of the beacon, that the AP has data to be transmitted to the STA. Thereafter, when the STA desires to receive data, it contends with the other STAs, transmits a trigger frame to the AP to announce that the service period (SP) of the STA has started, and then requests that the AP transmit the data. The AP transmits an ACK frame to the STA in response to the trigger frame. Thereafter, the AP performs contention with the other STAs, exchanges an RTS/CTS frame with the STA, and then transmits the data to the STA. At this time, the data may include several data frames. Herein, the step of exchanging the RTS/CTS frame may be omitted. If the AP transmits the last data frame with the EOSP field of the data frame set to 1, the STA may recognize this, transmit the ACK frame to the AP, end the SP, and then switches to the sleep state. Using the U-APSD mechanism as described above may allow the STA to start its own SP and receive data when the STA desires and to receive several data frames during one SP, thereby enabling efficient data reception.

However, exchange of the RTS/CTS frame required in data transmission to prevent the hidden node problem leads to a large amount of overhead in data transmission. In addition, a considerable amount of time is taken from the time when the STA to makes a request for data transmission to the AP by transmitting the trigger frame to the time when the AP prepares data to be transmitted to the STA and performs contention for transmission of the data. Accordingly the STA unnecessarily consumes energy.

Meanwhile, in the hidden node environment, some stations fail to overhear PS-Poll frames transmitted by other stations, and thus occurrence of collision is highly possible since the PS-Poll frames are transmitted simultaneously. In order to address this problem, an NDP (Null Data Packet) PS-Poll frame and an extended slot time which is based on the NDS PS-Poll frame may be used to allow an STA operating in the PS mode to receive data from the AP in the hidden node environment.

Figure 23:
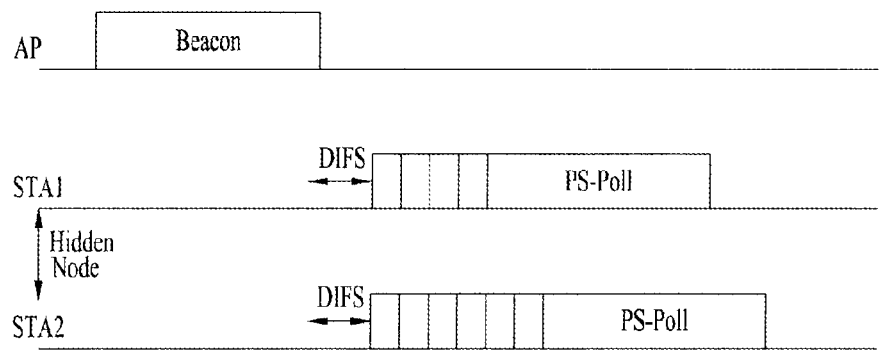
FIG. 23 illustrates an exemplary case of collision between PS-Poll frames in a hidden node environment.

FIG. 23 illustrates an exemplary case of collision between PS-Poll frames in a hidden node environment.

In FIG. 23, it is assumed that the AP has a data frame for STA 1 and STA 2 and that STA 1 and STA 2 have been informed of this fact through the TIM element of a beacon frame. In addition, it is assumed that STA 1 and STA 2 correspond to hidden nodes.

Each of STA 1 and STA 2 attempts channel access through contention. If the backoff count value of STA 1 is 4 and the backoff count value of STA 2 is 6 as shown in FIG. 23, STA 1 transmits the PS-Poll frame to the AP first. If the PS-Poll frame of STA 1 is successfully transmitted to the AP, the AP transmits a buffered data frame for STA 1 or an ACK frame to STA 1. Since STA 2 is a hidden node of STA 1, STA 2 fails to monitor the PS-Poll frame transmitted by STA 1. Accordingly, STA 2 may determine that the channel is idle and perform countdown of its own backoff slot even at the time when the PS-Poll frame of STA 1 is transmitted. As a result, STA 2 may transmit a PS-Poll frame to the AP when the countdown value of the backoff slot expires. That is, although STA 1 has first succeeded in performing channel access and thus transmitted the PS-Poll frame, STA 2 transmits the PS-Poll frame due to the hidden node problem, resulting in collision between the PS-Poll frames.

To address this problem, it is necessary to make the slot time of a backoff timer used in the contention process longer than the transmission time of a PS-Poll frame. Herein, the slot time corresponds to a channel idle time unit that is necessary for reduction of the backoff timer in the contention process. Accordingly, when the slot time is set to be longer than the PS-Poll frame transmission time, the AP may successfully receive the PS-Poll frame and transmit a response frame in response to the PS-Poll frame. Since STAs corresponding to the hidden nodes can receive the response frame with which the AP has responded, they recognize that the channel is in use and thus do not reduce the backoff timer. Accordingly, the hidden node problem with STAs placed in a hidden node environment in which the STAs cannot overhear a PS-Poll frame may be addressed by setting the slot time, i.e., the channel sensing time, to be longer than the PS-Poll frame transmission time.

Figure 24:
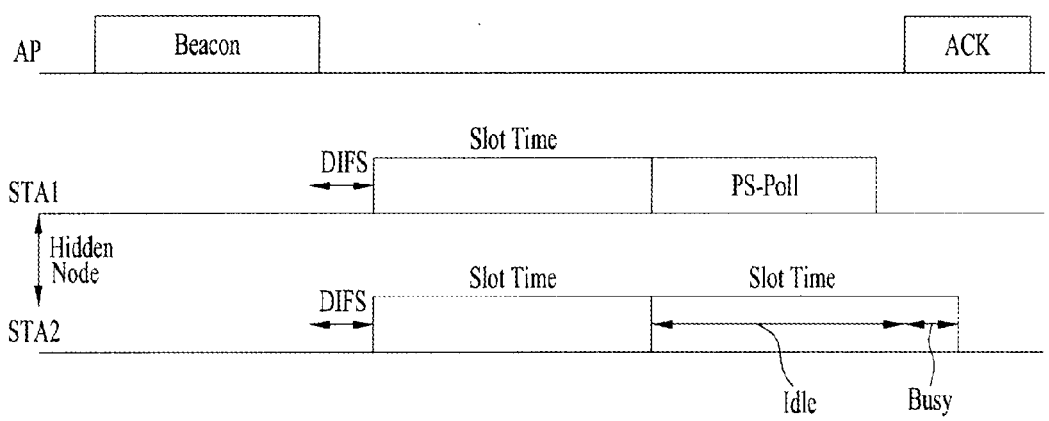
FIG. 24 illustrates an exemplary PS-Poll contention mechanism in a hidden node environment.

FIG. 24 illustrates an exemplary PS-Poll contention mechanism in a hidden node environment.

In FIG. 24, it is assumed that the AP has a data frame for STA 1 and STA 2 and that STA 1 and STA 2 have been informed of this fact through the TIM element of a beacon frame. In addition, it is assumed that STA 1 and STA 2 correspond to hidden nodes.

Each of STA 1 and STA 2 attempts channel access through contention. If the backoff count value of STA 1 is 4 and the backoff count value of STA 2 is 6, as shown in FIG. 23, STA 1 transmits a PS-Poll frame to the AP first. If the backoff count value of STA 1 is 1 and the backoff count value of STA 2 is 2, STA 1 first transmits a PS-Poll frame to the AP. If the PS-Poll frame of STA 1 is successfully transmitted to the AP, the AP transmits a buffered data frame for STA 1 or an ACK frame to STA 1. Since STA 2 is a hidden node of STA 1, STA 2 fails to monitor the PS-Poll frame transmitted by STA 1. Accordingly, STA 2 determines that the channel is idle at the time the PS-Poll frame of STA 1 is transmitted. However, STA 2 determines that the channel is busy with respect to a buffered data frame or an ACK frame transmitted after the PS-Poll frame. Accordingly, STA 2 does not perform countdown of its own backoff slot for a time of occupancy of the channel by STA 1, and therefore collision between the PS-Poll frames may be avoided.

The slot time for the PS-Poll contention mechanism can be set according to Equation 12 given below.

$$\text{Slot Time} = \text{PS-Poll Transmission Time} + \text{SIFS} + \text{CCA Time of Response frame} + 2*\text{Air Propagation Delay} \qquad \text{Equation 12}$$

Herein, PS-Poll Transmission Time indicates transmission time of a PS-Poll frame. CCA Time of Response frame indicates CCA detection time of the STA for transmission of a response frame (a data frame or an ACK frame) by the AP in response to the PS-Poll frame.

Figure 25:
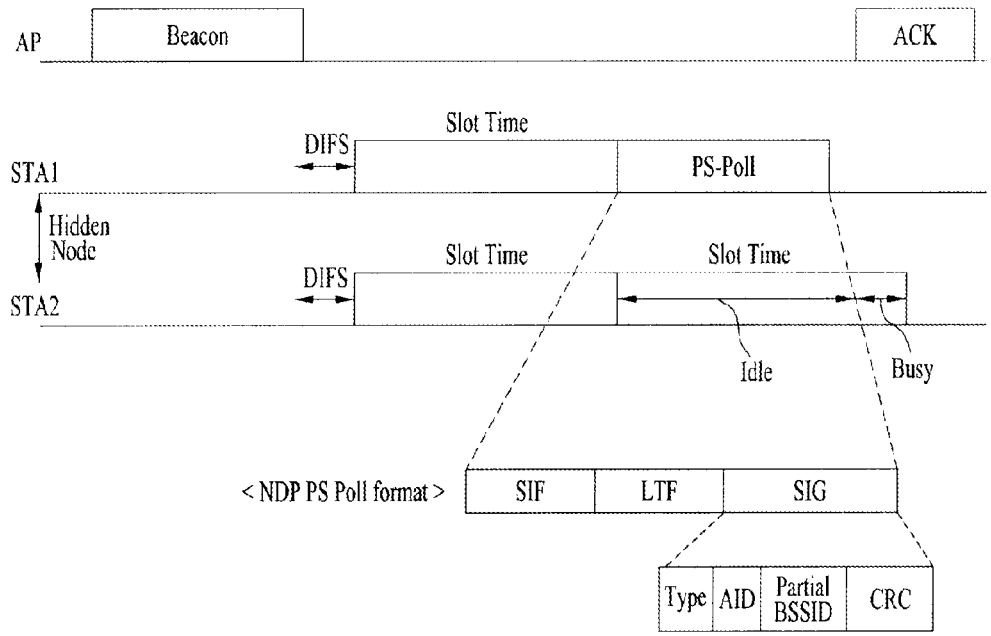
FIG. 25 illustrates an exemplary NDP PS-Poll frame.

According to the PS-Poll contention mechanism as above, the PS-Poll collision problem in the hidden node environment may be solved. However, increase of the slot time may lead to increase of time taken to perform the contention process. To address this problem, an NDP PS-Poll frame may be used as shown in FIG. 25. Unlike the conventional PS-Poll frame which is a MAC Control frame transmitted in a PSDU, the NDP PS-Poll frame is configured only with an NDP (Null Data Packet) having no PSDU.

FIG. 25 illustrates an exemplary NDP PS-Poll frame.

Referring to FIG. 25, the NDP PS-Poll frame consists of an STF, an LTF and an SIG field. Each of the STF and LTF fields are constructed with a channel estimation sequence, which is needed to decode the SIG field. The SIG field may include four sub-fields. The fields illustrated in FIG. 25 are simply an example of sub-fields included in the SIG field of the NDP PS-Poll format. The illustrated fields may be replaced with other sub-fields, or another sub-field may be added thereto. In addition, each of the sub-fields may have a different value.

The Type sub-field is intended for analysis of the SIG of an NPD frame and indicates that the NDP frame has been designed for the PS-Poll frame. The AID sub-field corresponds to the AID of an STA transmitting the NDP PS-Poll frame. This is intended to allow the AP having received the NDP PS-Poll frame to recognize an STA having transmitted the PS-Poll frame. The Partial BSSID sub-field corresponds to a part of the BSSID of an AP to which the STA transmitting the NDP PS-Poll frame belongs. Alternatively, a certain ID value for identifying the AP may be used. It is also possible to define a certain ID for the AP or to use a BSSID through hashing. The SIG field includes a CRC sub-field, which is used for error detection.

Once the AP receives the NDP PS-Poll frame, the AP determines first, through the Partial BSSID sub-field, whether the AP is an AP that should respond to the PS-Poll frame. The AP may transmit an ACK frame to the corresponding STA or transmit a buffered frame directed to the STA, in response to the NDP PS-Poll frame.

Herein, implementation of transmission of the ACK frame corresponds to absence of a buffered frame directed to an STA in the current AP or a case in which it is not possible to transmit the buffered frame to the STA immediately after the SIFS. If the buffered frame directed to the STA is not present in the AP, the More Data Bit sub-field in the Frame Control field of the ACK frame is set to 0. Otherwise, the More Data Bit sub-field in the Frame Control field of the ACK frame is set to 1.

As described above, the NDP PS-Poll frame and a new extended slot time (see Equation 12) may be used to address the problem of PS-Poll collision between existing hidden nodes. However, the terminals that perform PS-Poll using the conventional contention-based PS-Poll scheme should receive a beacon and then continue to perform CCA until their own PS-Poll is normally transmitted, in order to recognize use of the channel by other terminals. This leads to unnecessary power consumption of a terminal in performing PS-Poll, and particularly the power consumption of the last terminal that performs PS-Poll may be relatively large compared to the power consumption of the other terminals.

Figure 26:
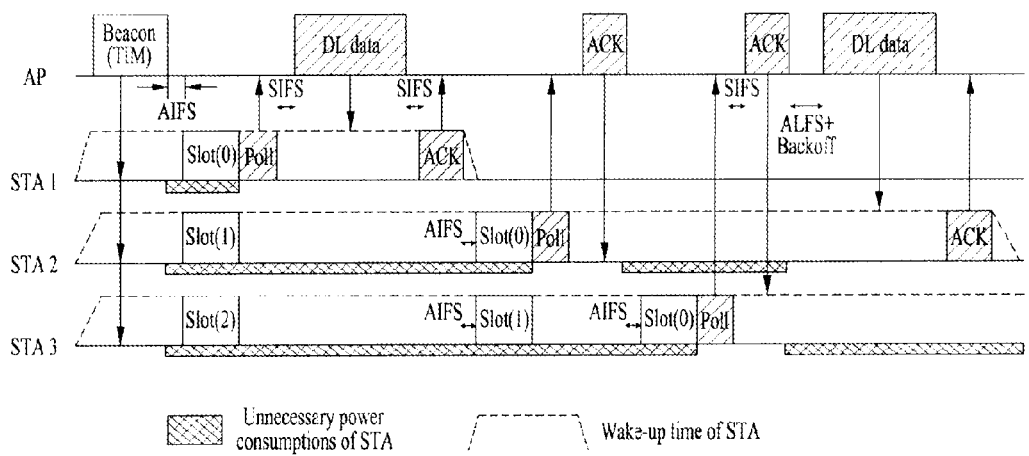
FIG. 26 illustrates an example of the channel access operation of the STA using an extended slot time.

FIG. 26 illustrates an example of the channel access operation of the STA using an extended slot time.

In FIG. 26, it is assumed that the AP has a data frame for STA 1, STA 2, and STA 3 and that STA 1, STA 2, and STA 3 have been informed of this fact through the TIM element of the beacon frame.

Referring to FIG. 26, each of STA 1, STA 2 and STA 3 attempts channel access through contention, and performs random backoff using the new extended slot time. FIG. 26 illustrates a case in which the STAs transmitting the PS-Poll select different backoff count values (e.g., STA 1=1, STA 2=2, and STA 3=3).

Hereinafter, it will be assumed that the STAs sense the busy state of the medium in an AIFS (Arbitration InterFrame Space) prior to PS-Poll frame transmission.

Confirming that the medium is in the idle state in the AIFS, STA 1 counts down the backoff slot (one slot) and then transmits a PS-Poll frame to the AP. At this time, STA 2 and STA 3 monitor the medium in the idle state and wait. The AP receives the PS-Poll frame from STA 1 and then transmits a data frame immediately after the SIFS, and STA 1 in turn transmits an ACK frame in response. As described above, while STA 1 is occupying the medium, STA 2 and STA 3 stop countdown of the backoff slot and wait.

When occupancy of the medium by STA 1 is terminated, STA 2 and STA 3 confirm that the medium is in the idle state in the AIFS, and perform countdown of the residual backoff slot. Since the backoff count value of STA 2 is less than that of STA 3, STA 2 counts down the residual backoff slot (one slot), and then transmits the PS-Poll frame to the AP. At this time, STA 3 monitors the medium in the busy state and then waits. If the AP having received the PS-Poll frame from STA 2 fails to transmit a data frame immediately after the SIFS, the AP transmits an ACK frame after the SIFS. While STA 2 is occupying the medium, STA 3 stops counting down the backoff slot and waits.

When occupancy of the medium by STA 2 and STA 3 ends, STA 3 confirms that the medium is in the idle state in the AIFS, performs countdown of the residual backoff slot (one slot), and then transmits the PS-Poll frame to the AP. If the AP having received the PS-Poll frame from STA 3 fails to transmit the data frame immediately after the SIFS, the AP transmits an ACK frame.

In the meantime, the AP performs contention with the STA (by confirming the idle state of the medium in the AIFS and performing random backoff) and transmits data to STA 2, and STA 2 transmits the ACK frame in response.

In the example described above, collision has not occurred since STA 1, STA 2 and STA 3 have selected different backoff count values. However, the STAs except STA 1 delay PS-Poll transmission during the channel access period thereof and continue to maintain the awake state until the data directed thereto is received, which results in unnecessary power consumption. For example, STA 2 transmits the PS-Poll, and unnecessarily remains in the awake state during the period of occupancy of the medium by STA 1 and during the period of occupancy of the medium by STA 3, in order to receive data directed thereto. In addition, since the slot time has been significantly extended compared to the PS-Poll transmission time in this case, unnecessary power consumption may significantly increase over the conventional cases.

Figure 27:
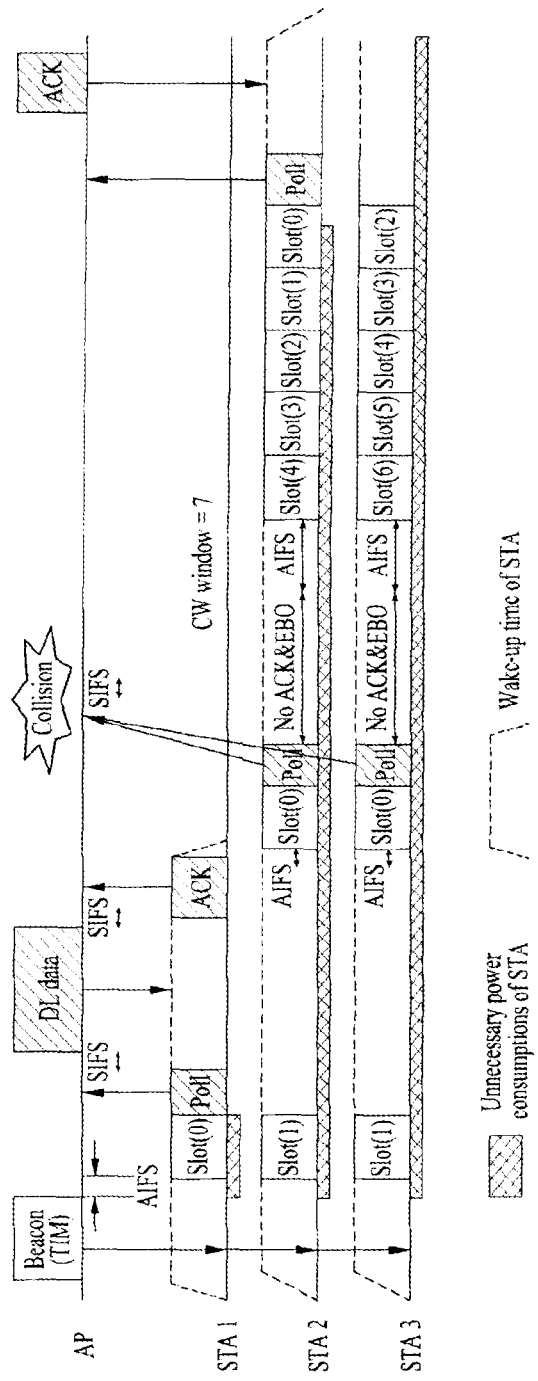
FIG. 27 illustrates another example of the channel access operation of the STA using an extended slot time.

FIG. 27 illustrates another example of the channel access operation of the STA using an extended slot time.

In FIG. 27, it is assumed that the AP has a data frame for STA 1, STA 2, and STA 3 and that STA 1, STA 2, and STA 3 have been informed of this fact through the TIM element of a beacon frame.

Referring to FIG. 27, each of STA 1, STA 2 and STA 3 attempts channel access through contention, and performs random backoff using the new extended slot time. FIG. 26 illustrates a case in which STA 2 and STA 3 select the same backoff count value (e.g., STA 1=1, STA 2=2, and STA 3=2).

As in the case of FIG. 26, when occupancy of the medium by STA 1 is terminated, STA 2 and STA 3 confirm that the medium is in the idle state in the AIFS, and perform countdown of the residual backoff slot. Since STA 2 and STA 3 have the same backoff count value, collision occurs. If collision occurs as in this case, both STA 2 and STA 3 fail to receive an ACK frame or data frame from the AP, and thus data transmission fails. In this case, STA 2 and STA 3 perform exponential backoff. That is, they double the CW value, and then re-select a backoff count value. In the example of FIG. 27, STA 2 and STA 3 select 5 and 7 as the backoff count values. Since STA 2 has a backoff count value less than that of STA 3, it performs countdown of the backoff slot (five slots) and then transmits the PS-Poll to the AP.

As collision occurs due to coincidence of the backoff count values of two STAs, power consumption of the two STAs increases, and transmission delay also increases. In addition, since the slot time has been significantly extended compared to the PS-Poll transmission time, unnecessary power consumption may significantly increase over the conventions cases.

Improved Channel Access Scheme

To solve the aforementioned problem, the present invention proposes a method for reducing unnecessary power consumption that may occur when STAs perform PS-Poll after receiving a beacon including the TIM and recognizing data to be transmitted thereto. To this end, in the improved channel access method, the channel access operation may be performed in the channel access intervals configured for specific STAs. In the following description of the present invention, a PS-Poll operation (an improved scheduled PS-Polling scheme) will be assumed to be performed for channel access. However, embodiments of the present invention are not limited thereto. A frame for new channel access may be applied.

In the present invention, the aforementioned new extended slot time may be used in performing random backoff of an STA. However, embodiments of the present invention are not limited thereto. The conventional slot time may also be used. In the case in which the extended slot time is used, the extended slot time may be determined by Equation 12. In addition, an NDP PS-Poll frame having STF, LTF and SIG fields may be used for PS-Poll, but embodiments of the present invention are not limited thereto. The conventional MAC Control frame may also be used.

In addition, as an ACK frame, the conventional ACK frame or an NDP ACK frame, which is similar to the aforementioned NDP PS-Poll frame, having only STF, LTF, and SIG fields may be used. In the case of the NDP ACK frame, the size of the NDP PS-Poll frame may be equal to that of the NDP ACK frame.

An STA may sense the busy or idle state of the medium during one of SIFS, PIFS, PIFS+additional time, and EDCA time (AIFS+random backoff) prior to PS-Poll frame transmission. That is, the STA senses a channel by selecting one of the SIFS, PIFS, PIFS+additional time, and EDCA time, and then transmits PS-Poll if the channel is idle. Herein, EDCA time refers to the channel sensing time used by a conventional STA in accessing the channel based on EDCA. Hereinafter, for simplicity of description, it will be assumed that the STA uses the PIFS.

Figure 28:
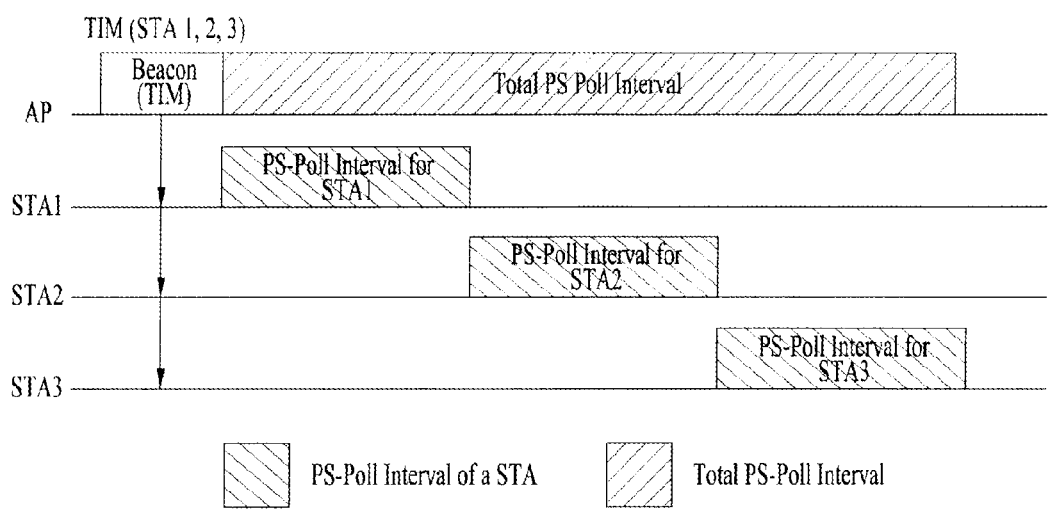
FIG. 28 exemplarily illustrates PS-Poll intervals set for each STA according to one embodiment of the present invention.

FIG. 28 exemplarily illustrates PS-Poll intervals configured for each STA according to one embodiment of the present invention.

In FIG. 28, it is assumed that the AP has a data frame for STA 1, STA 2, and STA 3 and that STA 1, STA 2, and STA 3 have been informed of this fact through the TIM element of the beacon frame.

Referring to FIG. 28, the PS-Poll intervals for the STAs have been specified for the respective STAs based on the TIM information element included in the beacon, and the PS-Poll intervals for the STAs performing PS-Poll are set at different positions. That is, if the AP stores a data frame to be transmitted to STAs, the AP may configure PS-Poll intervals for the STAs (STA 1, STA 2, and STA 3) respectively. In addition, in order to prevent the STAs (STAs other than STA 1, STA 2 and STA 3) which are not indicated by the TIM element from attempting channel access within the total PS-Poll interval, the AP may set the value of the Duration field in the MAC header of the beacon by adding the total PS-Poll interval to the length of the beacon. Since the STAs can confirm the length of the beacon through the Length field and MCS field in the SIG field, the total PS-Poll interval specified for the STAs (STA 1, STA 2, STA 3) indicated by the TIM element may be known through the Duration field, and the other STAs (the STAs other than STA 1, STA 2 and STA 3) which are not indicated by the TIM element may not attempt channel access in the total PS-Poll interval.

The AP may explicitly inform the STAs of the information about the positions of the PS-Poll intervals through an information element (e.g., a TIM information element or a Polling allocation information element) of the beacon frame. That is, the AP may additionally inform each of the STAs indicated by the TIM element of the position information of the PS-Poll interval for a corresponding STA through an information element in the beacon frame. For example, the AP may inform each of the STAs of the offset information about the start time of the PS-Poll interval and the length information about the PS-Poll interval of the corresponding STA. At this time, the length information about the PS-Poll interval of the STAs may be different from each other. If all the STAs use the same PS-Poll interval length, information about only one PS-Poll interval length is contained in the information element of the beacon frame, and each STA acquires its own PS-Poll interval information using the corresponding PS-Poll interval length. If the length of the PS-Poll interval for each of STAs is fixed or implicitly recognizable by the corresponding STA (e.g., the PS-Poll interval length set by the system is PIFS+PS-Poll frame transmission time+SIFS+CCA Time of Response frame (e.g., ACK frame transmission time)+2*Air Propagation Delay), the AP may inform each of the STAs of information about the start time of the total PS-Poll interval and information about the order of PS-Polls of the STAs indicated through the TIM through the TIM element. In this case, each STA may recognize the position of the PS-Poll interval therefor by checking the position of the PS-Poll interval with respect to the start time of the total PS-Poll interval using the PS-Poll order information. If the length of the PS-Poll interval for each STA is fixed or implicitly recognizable by the corresponding STA, and the start time of the total PS-Poll interval is fixed (e.g., if the total PS-Poll interval immediately begins at the specified time after the beacon is received), the AP may only inform the STAs of the corresponding PS-Poll order information indicated by the TIM through the TIM element.

Alternatively, each STA may implicitly recognize the position information of the PS-Poll interval thereof through the TIM element. For example, when it is assumed that STA 1, STA 2 and STA 3 are sequentially indicated by the Partial Virtual Bitmap field of the TIM element and that the PS-Polls has are arranged in the ascending order in the bitmap, STA 1, STA 2 and STA 3 may have their own PS-Poll intervals arranged in this order. The order of PS-Polls of the respective STAs may be preset, by the system, to an ascending order or a descending order according to the order of the bitmaps as described above, or may be calculated by the STAs based on the predetermined specific permutation, using the order of the bitmaps.

As described above, each STA may recognize the position of the PS-Poll interval thereof and the positions of the PS-Poll intervals of the other STAs based on the information contained in the TIM. The STA having checked the position of the PS-Poll interval thereof may perform the PS-Poll operation. In addition, the STA may check, at the start time of the PS-Poll interval thereof, whether the medium is busy in the PIFS, and then transmit PS-Poll to the AP if the medium is in the idle state. If the channel is busy in the PIFS at the start time of the PS-Poll interval, the STA may delay PS-Poll frame transmission within the PS-Poll interval thereof. Thereafter, when it is confirmed that the medium is in the idle state in the PIFS, the STA may transmit the delayed PS-Poll frame to the AP. At this time, the other STAs may operate in the sleep state since this PS-Poll interval is not their own PS-Poll interval.

If the AP receives a PS-Poll frame from the STA in the PS-Poll interval of the STA, the AP transmits an ACK frame to the STA after the SIFS. If the PS-Poll frame is not correctly received from the STA within the PS-Poll interval, the AP may transmit a frame including NACK or an ACK frame to the STA. Herein, the NACK or ACK frame may be configured by an NDP frame.

Hereinafter, for simplicity of description, it will be assumed that the STA is capable of implicitly recognizing the position of the PS-Poll interval thereof through the TIM element.

If the first PS-Poll interval begins immediately after reception of the beacon within a corresponding beacon period, the PS-Poll interval of an STA may be determined by Equation 13 given below.

$$\text{PS-Poll interval} = \text{SIFS (or PIFS)} + \text{PS-Poll transmission time} + \text{SIFS} + \text{ACK transmission time} + 2*\text{Air Propagation Delay} \quad \text{Equation 13}$$

Alternatively, if the first PS-Poll interval begins when SIFS or PIFS elapses after reception of the beacon within the corresponding beacon period, the PS-Poll interval of an STA may be determined by Equation 14 given below.

$$\text{PS-Poll interval} = \text{PS-Poll transmission time} + \text{SIFS} + \text{ACK transmission time} + \text{SIFS (or PIFS)} + 2*\text{Air Propagation Delay} \quad \text{Equation 14}$$

If the NDP PS-Poll frame and the NDP ACK frame are used, the PS-Poll interval of an STA may be determined by Equation 15 given below.

$$2*\text{NDP frame transmission time} + \text{SIFS(or PIFS)} + \text{SIFS} + 2*\text{Air Propagation Delay} \quad \text{Equation 15}$$

The total PS-Poll interval may be determined by Equation 16 given below.

(SIFS (or PIFS)+PS-Poll transmission time+SIFS+ ACK time)*$N$+2*Air Propagation Delay*$N$ or (2*NDP frame transmission time+SIFS (or PIFS)+ SIFS)*$N$+2*Air Propagation Delay*$N$    Equation 16

In Equation 16, N denotes the total number of STAs set to 1 in the TIM bitmap, i.e., the total number of STAs to perform PS-Poll.

Hereinafter, for simplicity of description, it will be assumed that the PS-Poll interval of an STA is determined by Equation 13 as given above.

Each of the STAs having performed PS-Poll in the PS-Poll interval thereof switches to the awake state after the total PS-Poll interval in order to receive data from the AP.

Figure 29:
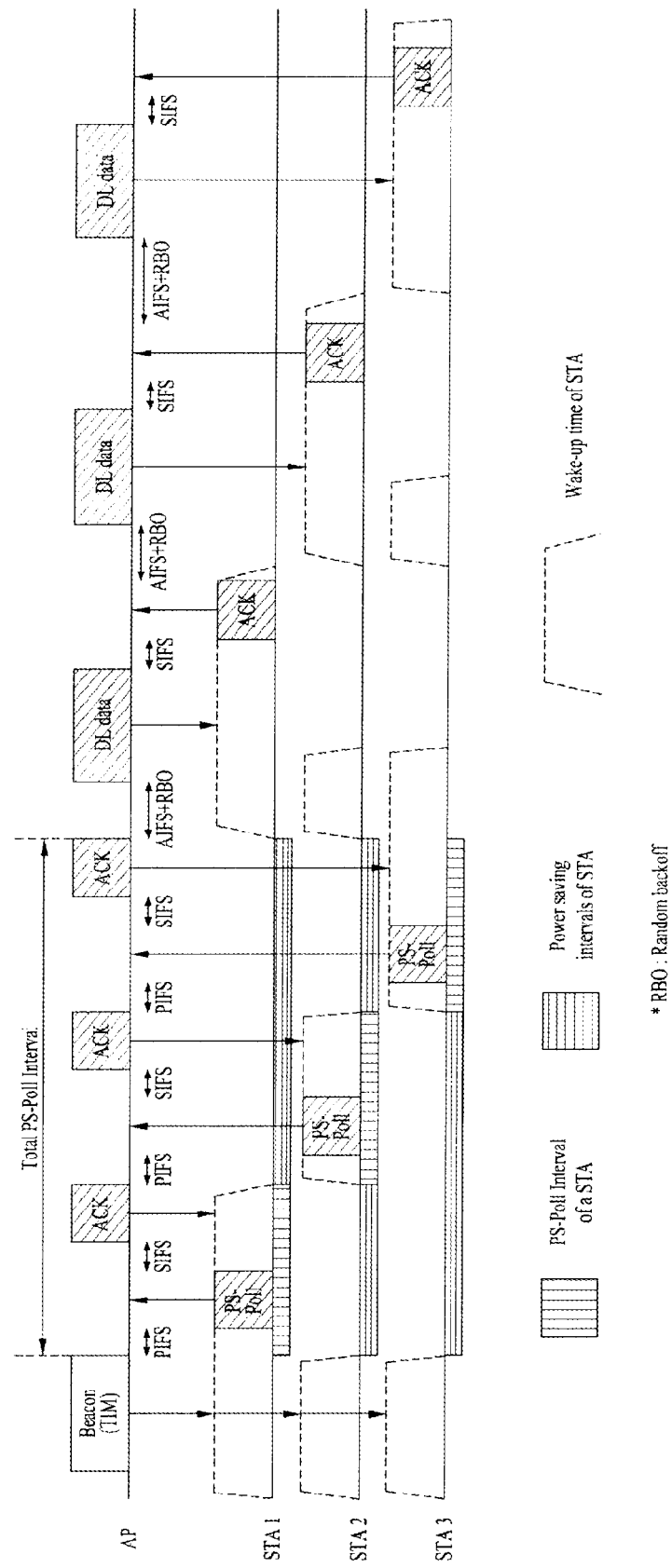
FIGS. 29 to 34 exemplarily illustrate the channel access operation of an STA according to one embodiment of the present invention.

FIG. 29 illustrates the channel access operation of an STA according to one embodiment of the present invention.

In FIG. 29, it is assumed that the AP has a data frame for STA 1, STA 2, and STA 3 and that STA 1, STA 2, and STA 3 have been informed of this fact through the TIM element of the beacon frame.

Referring to FIG. 29, if the three STAs (STA 1, STA 2 and STA 3) are sequentially indicated by the TIM of the beacon, the PS-Poll intervals may be configured for the STAs in the order of STA 1, STA 2 and STA 3, and each of the STAs may recognize the position of the PS-Poll interval thereof based on the information contained in the TIM.

First, the PS-Poll interval of STA 1 begins after reception of the beacon. If STA 1, which is the first STA, confirms that the medium is in the idle state in the PIFS after receiving of the beacon, STA 1 transmits a PS-Poll frame to the AP. Since each STA is capable of recognizing the PS-Poll interval thereof, the STAs other than the STA performing the first PS-Poll may switch to the sleep state after receiving the beacon and remain in the sleep state until the PS-Poll intervals thereof arrive. In FIG. 29, STA 2 and STA 3 switch to the sleep state after receiving the beacon, and remain in the sleep state until the PS-Poll intervals thereof arrive. The AP receives the PS-Poll frame from STA 1 and transmits the ACK frame after SIFS, and then the PS-Poll interval of STA 1 ends. Each of the STAs other than the STA (STA 3) performing the last PS-Poll may switch to the sleep state at the end of the PS-Poll interval thereof and remain in the sleep state until the total PS-Poll interval ends. In FIG. 29, STA 1 switches to the sleep state at the end of the PS-Poll interval thereof and remains in the sleep state until the end of the total PS-Poll interval.

The PS-Poll interval of STA 2 begins after the PS-Poll interval of STA 1 (after the ACK frame transmission time for STA 1). Once STA 2 switches to the awake state and confirms that the medium is in the idle state in the PIFS, STA 2 transmits the PS-Poll frame to the AP. The AP receives the PS-Poll frame from STA 2 and transmits an ACK frame after the SIFS, and then the PS-Poll interval ends. As in the case of STA 1, STA 2 switches to the sleep state when the PS-Poll interval thereof ends and remains in the sleep state until the total PS-Poll interval ends.

The PS-Poll interval of STA 3 begins after the PS-Poll interval of STA 2 (after the ACK frame transmission time for STA 2). When STA 3 switches to the awake state and confirms that the medium is in the idle state in the PIFS, STA 3 transmits a PS-Poll frame to the AP. The AP receives the PS-Poll frame from STA 2 and transmits an ACK frame after the SIFS. Since STA 3 is the last STA (i.e., the end time of the PS-Poll interval of STA 3 coincides with the time at which the total PS-Poll interval ends), STA 3 does not switch to the sleep state, but remains in the awake state.

After the total PS-Poll interval ends, the AP transmits data to each of the STAs, and the STAs (except the last STA) switch to the awake state at the time the total PS-Poll interval ends and performs CCA to receive data from the AP. The last STA (STA 3) is maintained in the awake state from the PS-Poll interval thereof and performs CCA. The AP may perform contention based on the random backoff period and then transmit data to the STAs. In other words, the AP may select a backoff count value for each of the STAs, and transmits data to the STAs in order from the STA having the smallest backoff count value to the STA having the greatest backoff count value. In the example shown in FIG. 29, STA 1 has the smallest backoff count value, and STA 2 has the next smallest backoff count value, and STA 3 has the greatest backoff count value. The AP confirms that the medium is in the idle state in the AIFS, and transmits a data frame to STA 1 after counting down the backoff slot. Each STA may check, through the preamble (e.g., Partial AID of the SIG field) of the data frame transmitted from the AP, whether the data frame is directed thereto. That is, STA 1 confirms that the data frame is directed thereto and decodes the data frame, while the other STAs (STA 2 and STA 3) confirm that the data frame is not directed thereto and switches to the sleep mode. In addition, the STAs may recognize the length of the MPDU of the data frame through the preamble (e.g., Length of the SIG field) of the data frame transmitted from the AP. That is, an STA having switched to the sleep mode after confirming that a data frame is not directed thereto may switch back to the active state in consideration of the MPDU length of the other STAs.

STA 1, having received the data frame from the AP, transmits an ACK frame to the AP after the SIFS. At the time STA 1 transmits the ACK frame to the AP, i.e., the time when transmission of data to the STA 1 by the AP is terminated, STA 2 and STA 3 switch from the sleep state to the awake state, and receive a data frame from the AP based on contention.

Meanwhile, the AP may transmit data frames to the STAs based on non-contention. For example, the AP may transmit scheduling information to each STA within the PS-Poll interval for the STA. In this case, the STA may receive an ACK frame for the PS-Poll frame from the AP within the PS-Poll interval thereof, wait for scheduling information for downlink data transmission from the AP when the total PS-Poll interval ends, and receive data using the acquired scheduling information. When the STA acquires the scheduling information from the AP as above, the STA may switch to and remain in the sleep state until the start time of downlink data transmission, thereby minimizing power consumption.

In addition, the AP may transmit data to an STA performing the last PS-Poll without transmitting an ACK frame for the PS-Poll, which will be described with reference to FIG. 30.

Figure 30:
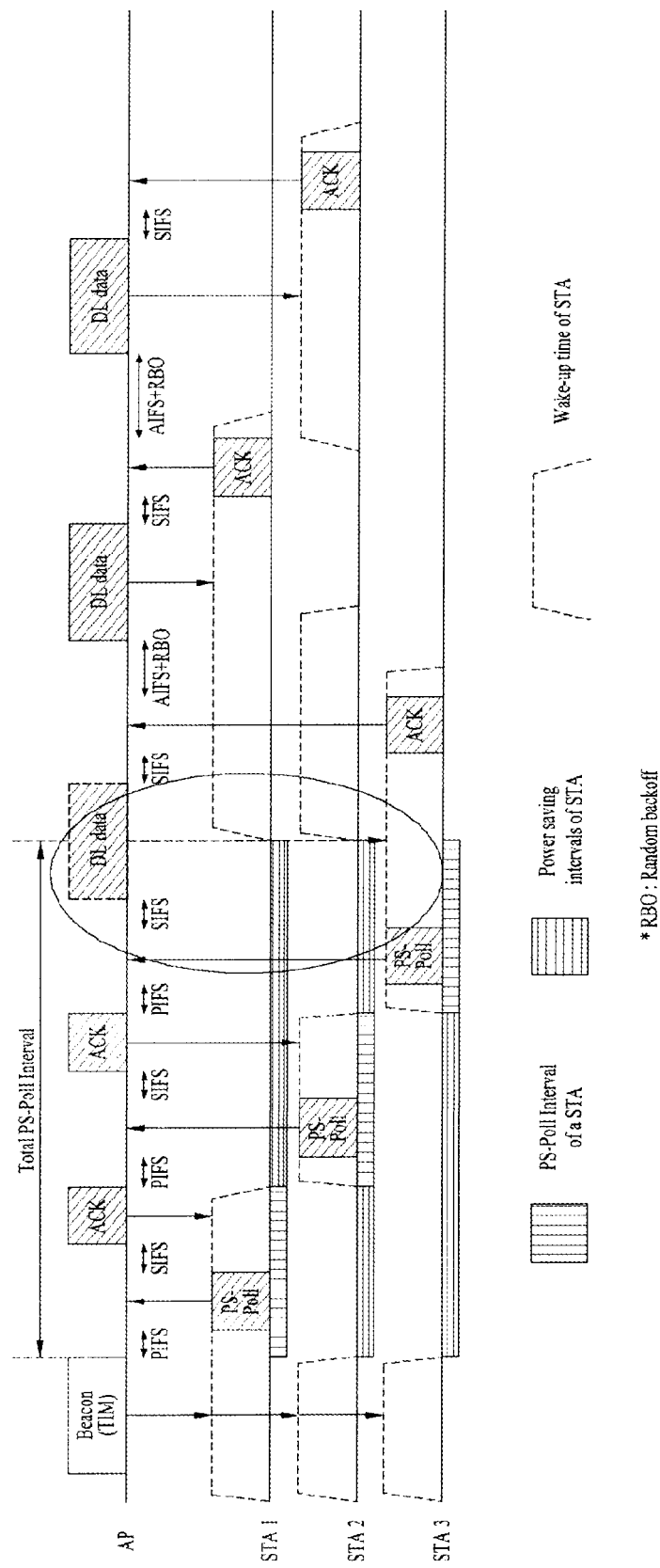

FIG. 30 illustrates the channel access operation of an STA according to one embodiment of the present invention.

In the example of FIG. 30, each of the STAs transmits the PS-Poll frame to the AP in the PS-Poll interval thereof, as in the example of FIG. 29.

Referring to FIG. 30, if the AP having received the PS-Poll frame from STA 3, which is the last STA, confirms that STA 3 is the last STA, the AP does not transmit the ACK frame for the PS-Poll frame, but transmits a data frame to the STA 3 when the SIFS elapses.

After the total PS-Poll interval ends, the AP may transmit data to the STAs other than the last STA (STA 3), and the STAs except the last STA may switch to the awake state at the time the total PS-Poll interval ends. In this case, since STA 1 and STA 2 has switched to awake state during transmission of a data frame to STA 3 (i.e., at the time the total PS-Poll interval ends), STA 1 and STA 2 cannot check the preamble of the data frame transmitted to STA 3. Accordingly, STA 1 and STA 2 remain in the awake state. Thereafter, STA 1 and STA 2 confirm, through the preamble of the data frame transmitted from the AP, that the data frame is directed to STA 1. Then, STA 1 may decode the data frame, and STA 2 may switch back to the sleep state.

In the example of FIG. 30, STA 1 and STA 2 switch to the awake state when the total PS-Poll interval ends, and remain in the awake state until they receive a data frame from the AP. Alternatively, if the STAs other than the last STA confirm that the medium is in the busy state by switching to the awake state when the total PS-Poll interval ends, they may switch to the sleep state. Then, they may switch back to the awake state when occupancy of the medium ends to confirm whether a data frame is transmitted thereto.

The AP may perform contention based on the random backoff period, and then transmit data to the STAs except the last STA. The operation of the AP transmitting data to the STAs other than the last STA is identical to that of the previous example of FIG. 29, and thus will not be described below.

The AP may transmit a data frame to an STA having a delay sensitive packet directed thereto first after the total PS-Poll interval elapses, which will be described with reference to FIG. 31.

Figure 31:
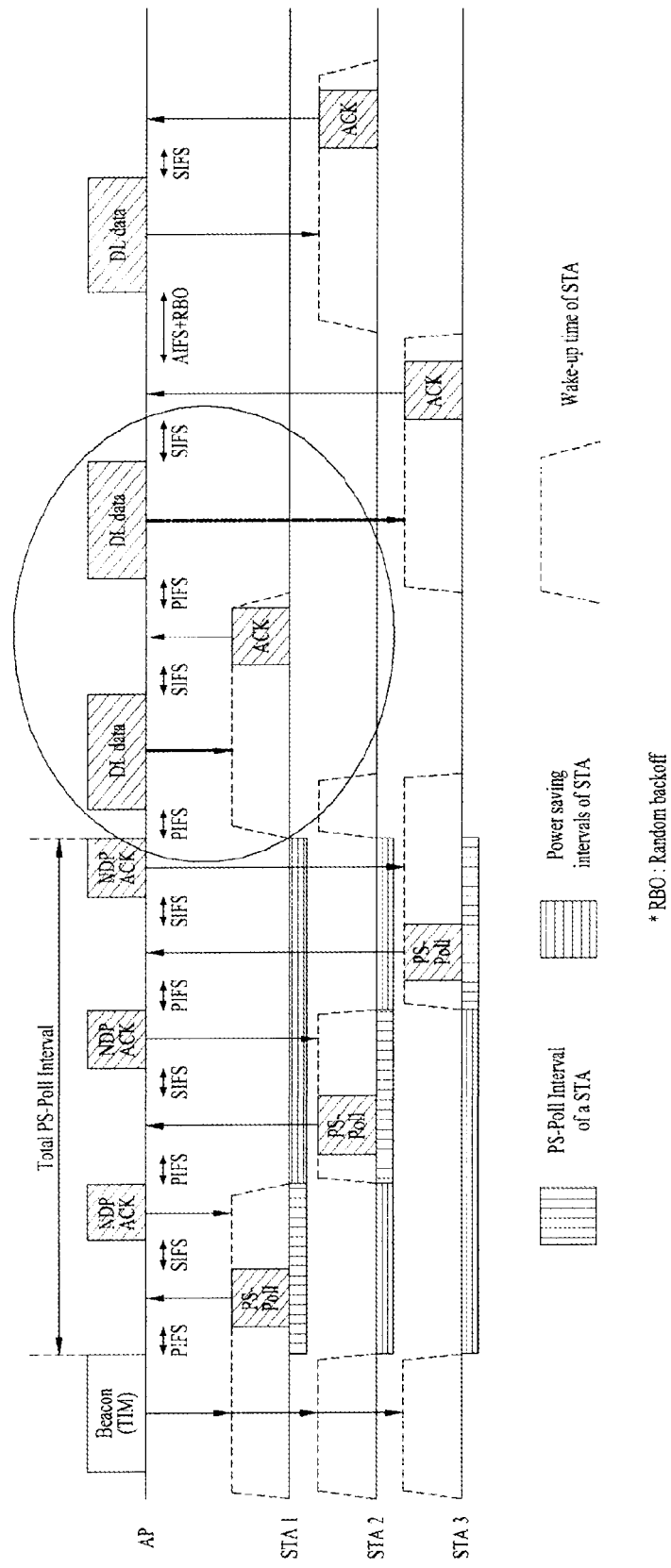

FIG. 31 illustrates the channel access operation of an STA according to one embodiment of the present invention.

In the example of FIG. 31, each of the STAs transmits a PS-Poll frame to the AP in the PS-Poll interval thereof, as in the example of FIG. 29.

Referring to FIG. 31, after the total PS-Poll interval, the AP may wait in the PIFS (or SIFS) and then transmit, without performing the random backoff procedure, a delay sensitive data frame to an STA to which the corresponding data frame is directed among the polled STAs. That is, the AP may transmit data without performing contention. Thereby, delayed transmission of a delay sensitive packet caused by the data transmission operation that has a long slot time and is based on the random backoff may be prevented. In this case, data transmission to the STAs having no delay sensitive packet may be performed based on contention, as in the example of FIG. 29 or 30. Herein, the time at which the total PS-Poll interval ends may be the time at which a response is transmitted to an STA having performed PS-Poll for the last time. For example, in the case of the example of FIG. 29, the end time may indicate the time at which the (NDP) ACK frame is transmitted to the last STA having performed PS-Poll transmission. In the example of FIG. 30, the end time may indicate the time at which the data frame is transmitted to the last STA having performed PS-Poll transmission. In the example of FIG. 31, the end time of the total PS-Poll interval is the time at which an (NDP) ACK frame is transmitted to STA 3 having performed the last PS-Poll, and the AP transmits downlink data frames for STA 1 and STA 3 immediately after the PIFS subsequent to the total PS-Poll interval. Since STA 2 does not have a delay sensitive packet, transmission of data to STA 2 is performed based on contention (AIFS+ random backoff) as in the example of FIG. 29 or 30.

In the meantime, there may be a case in which not all the STAs addressed to the TIM receive the TIM. For example, interference may be caused by an overlapping BSS (OBSS), or an STA may miss the TIM. In this case, the STA having failed to receive the TIM cannot transmit a PS-Poll frame within the PS-Poll interval thereof. In addition, there may be a case in which the STA has normally transmitted the PS-Poll frame, but the AP fails to receive the PS-Poll frame. An operation performed between the AP and the STA in this case will be described with reference to FIG. 32.

Figure 32:
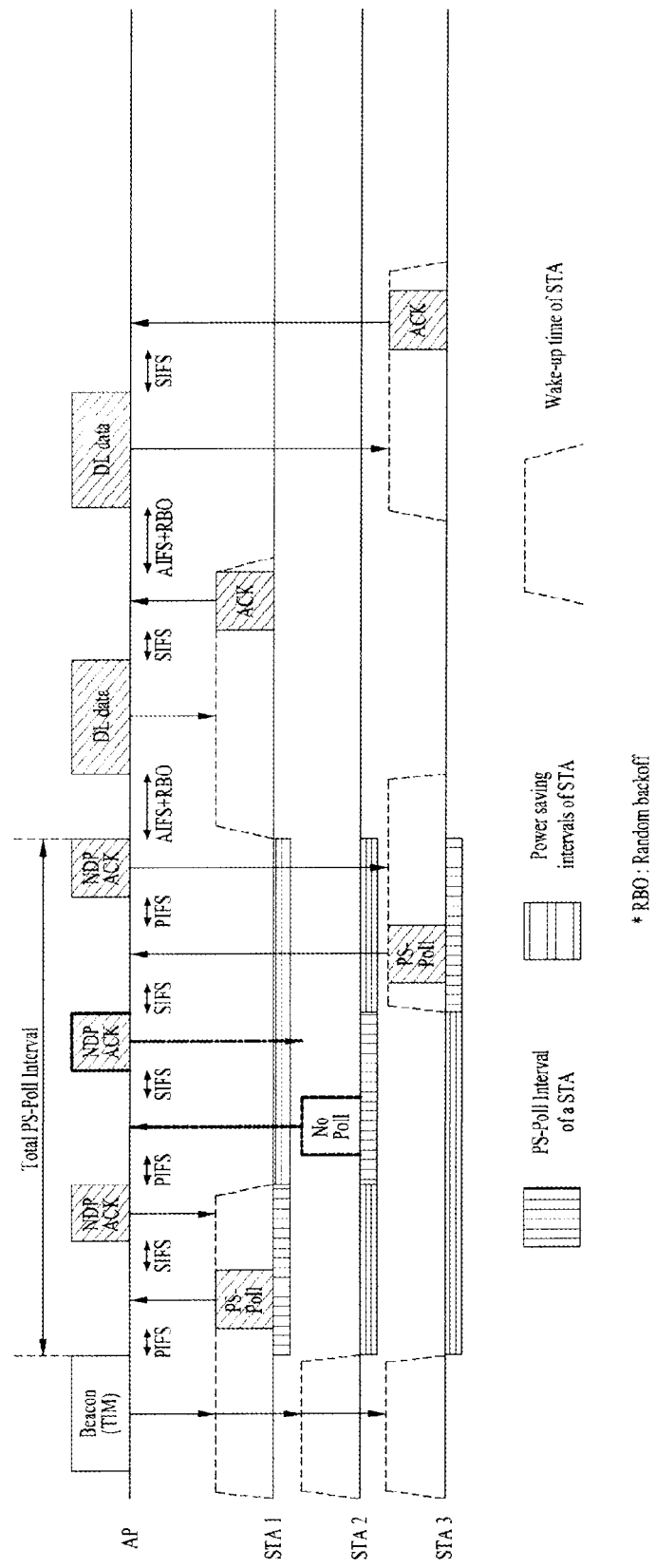

FIG. 32 illustrates the channel access operation of an STA according to one embodiment of the present invention.

In the example of FIG. 32, each of the STAs transmits the PS-Poll frame to the AP in the PS-Poll interval thereof, as in the example of FIG. 29.

FIG. 32 illustrates a case in which the AP fails to receive a PS-Poll frame from STA 2. If the AP does not receive PS-Poll from an STA in the determined PS-Poll interval of the STA for the PS-Poll transmission time, the AP transmits an unsolicited NDP frame to the STA after lapse of SIFS. When it is assumed that the STA has normally transmitted the PS-Poll, the time at which the unsolicited NDP frame is transmitted may be identical to the time (PIFS+PS-Poll transmission time+SIFS) at which an (NDP) ACK frame is transmitted. Herein, the unsolicited NDP frame may take the form of the (NDP) ACK frame which is used in the examples of FIGS. 29 to 31, a new NDP frame, or a new MAC frame. In addition, the unsolicited NDP frame may include ACK, NACK, or a non-Polling indication. By transmitting an NDP frame (or a new frame), intervention of other STAs (e.g., a hidden node) may be prevented in the PS-Poll interval even if the AP fails to receive the PS-Poll frame from a determined STA at the determined time.

An STA having received the NDP frame including ACK, NACK or a non-Polling indication may perform PS-Poll based on contention. In this case, the STA may use an extended slot time. Although not shown in FIG. 32, the medium is occupied by each STA (e.g., STA 1 and STA 3) in the PS-Poll interval assigned thereto. If there is another STA having failed to receive the TIM in the PS-Poll interval thereof, the AP transmits an NDP frame including NACK or a non-Polling indication. Accordingly, the STA having received the NDP frame including NACK or the non-Polling indication may perform PS-Poll based on contention after the total PS-Poll interval.

As such, in the case in which the slot time is set to the extended slot time according to Equation 12 given above, intervention of other STAs in the PS-Poll interval may be prevented by transmitting an NDP frame as in the example of FIG. 32. However, if the slot time does not have the extended slot time, the example of FIG. 32 may not be applicable. For example, if the slot time is identical to the PS-Poll frame time, and intervention of other STAs occurs during a period of time (PIFS+PS-Poll transmission time+SIFS), the intervention may not be prevented through the example of FIG. 32. Even in this case, however, while an STA indicated through the TIM element of the beacon frame performs PS-Poll using the PS-Poll interval thereof, the STAs which are not indicated through the TIM element may recognize the total PS-Poll interval through the bitmap number of the TIM element or the value of the Duration field in the MAC header of the beacon. Accordingly may not attempt channel access in the total PS-Poll interval. Therefore, the aforementioned problem may be prevented.

Meanwhile, when the STA having received the TIM attempts to perform PS-Poll in the assigned PS-Poll interval, the channel may be in the busy state. This case will be described with reference to FIG. 33.

Figure 33:
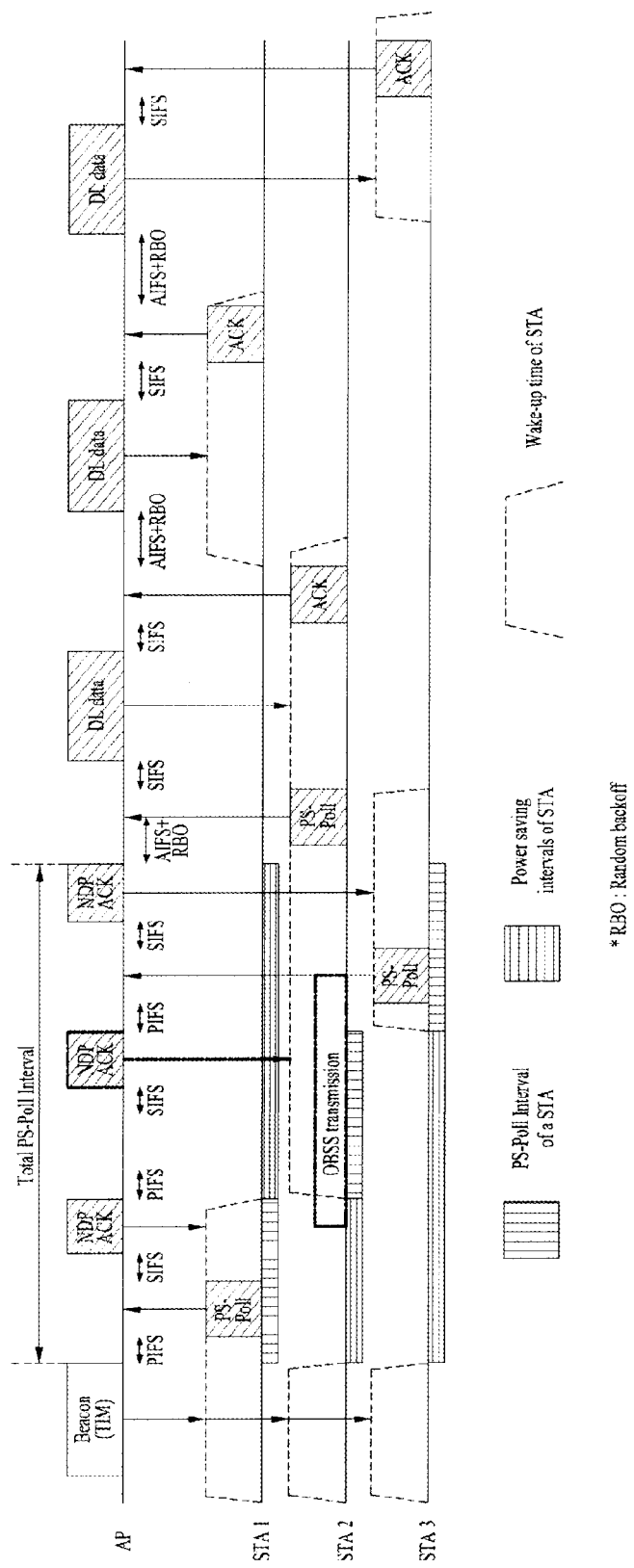

FIG. 33 illustrates the channel access operation of an STA according to one embodiment of the present invention.

In the example of FIG. 33, each of the STAs transmits a PS-Poll frame to the AP in the PS-Poll interval thereof, as in the example of FIG. 29.

Referring to FIG. 33, when the STA having received the TIM attempts to perform PS-Poll in the PS-Poll interval assigned thereto, the channel may be in the busy state. In the case of FIG. 33, when STA 2 attempts PS-Poll transmission, the channel is busy due to transmission of an overlapping BSS (OBSS). In this case, when it is determined that the channel is busy (due to OBSS transmission) at the time STA 2 attempts to perform PS-Poll in the PS-Poll interval thereof, STA 2 delays PS-Poll transmission until the channel is switched to the idle state. If the channel is idle in the AIFS, STA 2 attempts PS-Poll transmission again. That is, the corresponding STA does not transmit the PS-Poll frame in the PS-Poll interval assigned thereto, but uses the extended slot time to attempt PS-Poll transmission on the conventional contention basis (AIFS+random backoff). That is, since a PS-Poll interval has been assigned to each of the polled STAs within the total PS-Poll interval as in the example of FIG. 32, each STA may perform PS-Poll transmission on the contention basis after lapse of the total PS-Poll interval.

Meanwhile, the AP may transmit an STF in place of the (NDP) ACK frame employed in the examples of FIGS. 29 to 33. Since the STF is used in place of the (NDP) ACK frame, the (NDP) ACK frame may be transmitted after the total PS-Poll interval.

In this case, the PS-Poll interval of each of the STAs may be determined by Equation 17 given below.

PS-Poll interval=PIFS (or SIFS)+PS-Poll transmission+SIFS+STF+2*Air Propagation Delay  Equation 17

The AP transmits an STF in place of an (NDP) ACK frame in the PS-Poll interval of each of the STAs at the determined time (after the time of PIFS/SIFS+PS-Poll transmission time+SIFS). The STF transmitted by the AP may function to inform the other STAs that the channel is occupied by the assigned STA in the assigned PS-Poll interval, thereby prohibiting intervention of a hidden node STA. In addition, the STF has a smaller size than the conventional ACK frame or the NDP frame, and thus the size of the total PS-Poll interval may be reduced when the STF is used. Thereby, power consumption of the STA may be reduced.

The total PS-Poll interval may be determined by Equation 18 given below.

Total PS Poll Interval=(PIFS (or SIFS)+PS-Poll transmission time+SIFS+STF time)*N+2*Air Propagation Delay*N  Equation 18

In Equation 18, N denotes the total number of STAs for which bits are set to 1 in the TIM bitmap, i.e., the total number of STAs to perform PS-Poll.

In the case in which the PS-Poll frame includes an NDP frame, the total PS-Poll interval may be determined by Equation 19 given below.

Total PS Poll Interval=(PIFS (or SIFS)+NDP frame transmission time+SIFS+STF time)*N+2*Air Propagation Delay*N  Equation 19

Figure 34:
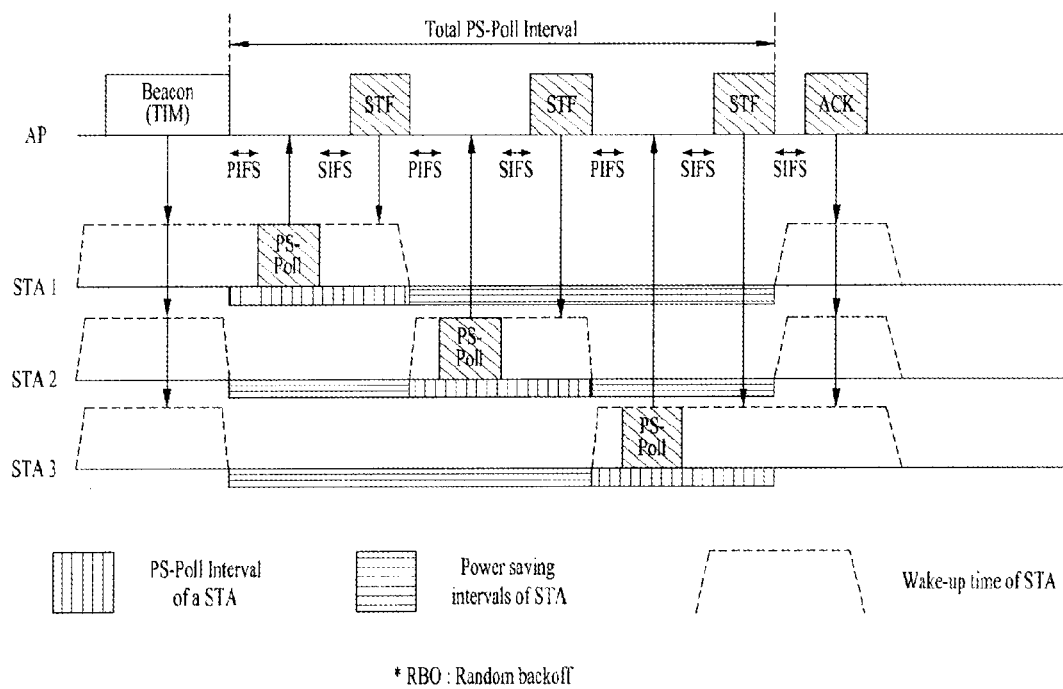

FIG. 34 illustrates the channel access operation of an STA according to one embodiment of the present invention.

In the example of FIG. 34, each STA transmits a PS-Poll frame to the AP in the PS-Poll interval thereof, as in the example of FIG. 29, and the AP transmits an STF in place of an (NDP) ACK frame, in response to the PS-Poll frame.

Referring to FIG. 34, the AP transmits the ACK frame to all STAs after the total PS-Poll interval, and each of the STAs (except the last STA) switches to the awake state at the time at which the total PS-Poll interval ends, and performs CCA to receive the ACK frame from the AP. The last STA (STA 3) remains in the awake state from the PS-Poll interval thereof and performs CCA. If the AP receives the PS-Poll frame from all the STAs indicated by the TIM, the AP may broadcast one ACK frame. At this time, the ACK frame may be transmitted in the form of the conventional ACK frame or in the form of the NDP ACK frame. However, if the AP does not receive all the PS-Poll frames from the STAs indicated by the TIM, the AP may transmit the ACK to each STA or broadcast a group ACK frame including bitmap information indicating ACK to each STA. Hereinafter, this group ACK frame will be referred to as PS-Poll Group ACK (PPGA) frame.

Although not shown in FIG. 34, after the AP transmits the ACK frame to all the STAs, the AP transmits data to each of the STAs, and each of the STAs performs CCA to receive the data from the AP. The AP may perform contention based on the random backoff period to transmit the data to each of the STAs. The process of receiving the data from the AP may be conducted in the same manner as in the example of FIG. 29.

Hereinafter, the NDP ACK frame and the PPGA frame will be described in detail.

Figure 35:
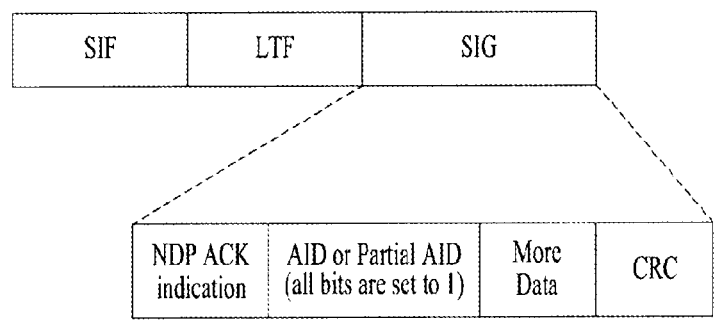
FIG. 35 exemplarily illustrates an NDP ACK frame according to one embodiment of the present invention.

FIG. 35 exemplarily illustrates an NDP ACK frame according to one embodiment of the present invention.

Referring to FIGS. 34 and 35, the NDP ACK frame may include an STF, an LTF, and a SIG field. The SIG field may include an NDP ACK indication sub-field, an AID or Partial AID sub-field, a More Data sub-field, and a CRC sub-field. Herein, the sub-fields, which correspond to examples of sub-fields that may be included in the NDP ACK frame, may be replaced with other sub-fields, or an additional sub-field may be further included.

The NDP ACK indication sub-field indicates that a frame is an NDP ACK frame. Through the NDP ACK indication sub-field, the STA may be informed that the frame is ACK for the PS-Poll. The AID (or Partial AID) sub-field indicates an STA that receives the corresponding NDP ACK frame. The More Data sub-field indicates, toward the AP, presence or absence of a buffered frame directed to the STA that receives the corresponding NDP ACK frame. The CRC sub-field is used for error detection for the SIG field.

If the AP receives the PS-Poll frame from all the STAs indicated by the TIM as in the example of FIG. 34, the AID (or Partial AID) sub-field may be set to a specific value (e.g., all bits set to 1 or 0) indicating multicast/broadcast to allow the STAs having transmitted PS-Poll to receive the NDP ACK frame (i.e., in order to indicate that ACK is broadcast-transmitted). If the STA having received an NDP ACK frame having the AID (or Partial AID) sub-field set to the specific value is an STA that has performed PS-Poll transmission, the STA may check if the frame is the group ACK for the PS-Poll. That is, if the AID in the NDP ACK frame received by the STA indicates all the STAs having performed PS-Poll transmission, the STAs having performed PS-Poll transmission determine that ACK has been transmitted thereto, and read the SIG field. On the other hand, the STAs that have not performed PS-Poll may ignore the NDP ACK frame.

Unlike the example of FIG. 34, if the AP fails to receive the PS-Poll frames from all the STAs indicated through the TIM, it may transmit the NDP ACK frame to each of the STAs having transmitted the PS-Poll frame. In this case, the AID (or Partial AID) sub-field may be set to AID (or Partial AID) of each STA having received the NDP ACK frame. In addition, the AP may transmit a PS-Poll Group ACK (PPGA) frame to all the STAs.

Figures 36, 37:
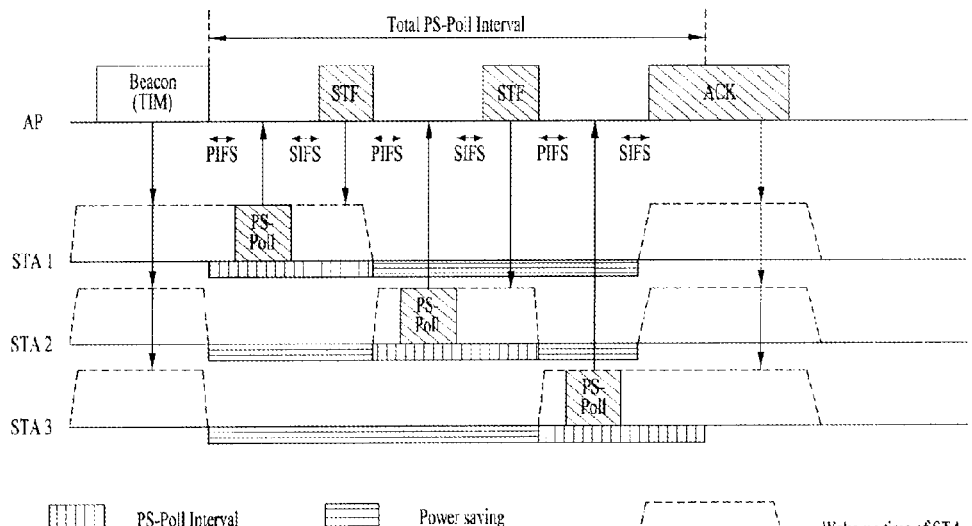
FIGS. 37 to 40 exemplarily illustrate the channel access operation of an STA according to one embodiment of the present invention.

FIG. 36 exemplarily illustrates a PPGA frame according to one embodiment of the present invention.

Referring to FIGS. 34 and 36, the PPGA frame may include a Frame Control field, an AID field (or an RA (receiver address) field), a BSSID field, a Bitmap size, an ACK bitmap, and a Padding field, as shown in FIG. 36(a). If the PPGA frame includes the RA field, the RA field may have the size of 6 octets. Herein, these fields are examples of fields that may be included in the PPGA frame. They may be replaced by other fields or an additional field may be further included.

The Type sub-field and the subtype sub-field in the Frame Control field indicate that the corresponding frame is the group ACK. The AID field indicates an STA that receives the corresponding PPGA frame. To allow all the STAs having performed PS-Poll to receive the PPGA frame, the AID field (or RA field) may be set to the broadcast address (e.g., all bits set to 1 or 0). The Bitmap size field indicates the size of the ACK bitmap field, and is set to the number of 1's set in the TIM (i.e., the total number of STAs having performed PS-Poll transmission). That is, only the STAs having correctly read the TIM and performed the PS-Poll operation may read the ACK bitmap field. The ACK bitmap field is set to 1 for the STA from which the AP has received the PS-Poll frame, and set to 0 for the STA from which the AP has not received the PS-Poll frame. Herein, the ACK bitmap field may be configured in the same order as the bitmap of the TIM element.

In addition, as shown in FIG. 36(b), the PPGA frame may not include the Bitmap size field of FIG. 36(a), but may include an ACK bitmap field. In this case, the STAs having performed PS-Poll may calculate the size of the ACK bitmap in the PPGA frame through TIM information. For example, the size of the ACK bitmap in the PPGA frame may be equal to the size of the bitmap in the TIM element.

In addition, the PPGA frame may include a Compressed MAC header (or New MAC header) as shown in FIG. 36(c), but may not include an AID (or RA field) shown in FIG. 36(b). In this case, the STAs having performed the PS-Poll operation after receiving the TIM may recognize that the corresponding frame is group ACK, through the Type sub-field and the subtype sub-field in the Frame Control field.

The AP may transmit an (NDP) ACK frame or PPGA frame without transmitting STF in response to the last PS-Poll, which will be described with reference to FIG. 37.

FIG. 37 exemplarily illustrates the channel access operation of an STA according to one embodiment of the present invention.

In the example of FIG. 37, each STA transmits a PS-Poll frame to the AP in the PS-Poll interval thereof, as in the example of FIG. 29, and the AP transmits an STF in place of an (NDP) ACK frame, in response to the PS-Poll frame.

Referring to FIG. 37, the AP receives the PS-Poll frame from STA 3, which is the last STA, and then transmits an (NDP) ACK frame or PPGA frame in place of an STF after the SIFS. In this case, the STAs (except the last STA) having performed the PS-Poll operation switch to the awake state for a time (of the total PS-Poll interval—STF-SIFS) and perform CCA to receive ACK from the AP. The last STA (STA 3) begins to be maintained in the awake state from the PS-Poll interval thereof and performs CCA.

All the STAs indicated in the TIM may fail to receive the TIM and thus fail to transmit the PS-Poll frames in the PS-Poll intervals thereof, as described above. In another case the AP may fail to receive the PS-Poll frame although the STAs have normally transmitted the PS-Poll frames. In this case, the AP, which has been described as transmitting the unsolicited NDP frame in the previous example, may transmit an unsolicited STF, which will be described with reference to FIG. 38.

Figure 38:
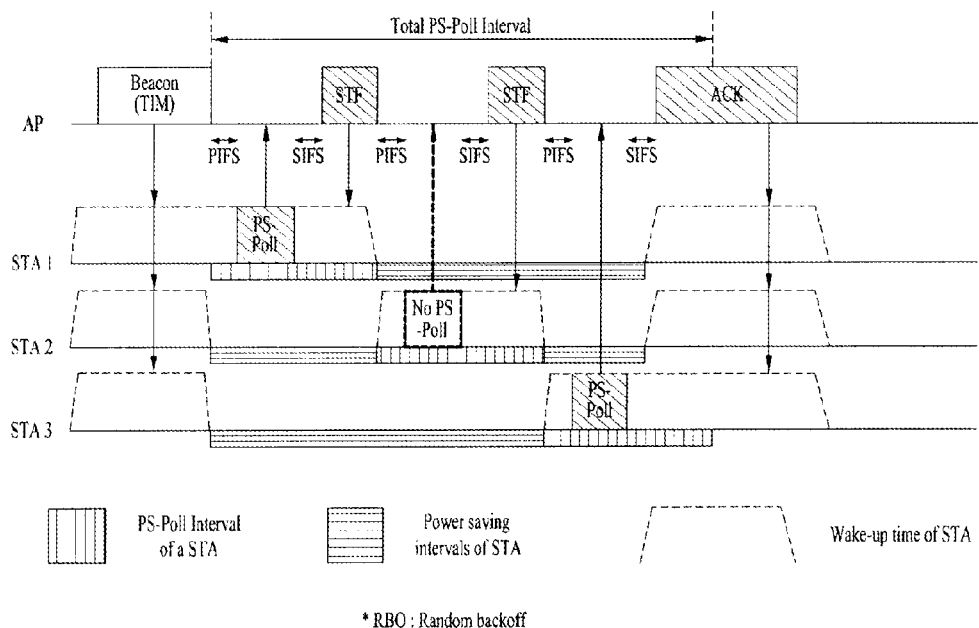

FIG. 38 exemplarily illustrates the channel access operation of an STA according to one embodiment of the present invention.

In the example of FIG. 38, each STA transmits a PS-Poll frame to the AP in the PS-Poll interval thereof, as in the example of FIG. 29, and the AP transmits an STF in place of an (NDP) ACK frame, in response to the PS-Poll frame.

Referring to FIG. 38, the AP fails to receive a PS-Poll frame from STA 2. If the AP fails to receive PS-Poll from an STA at the PS-Poll transmission time in a determined PS-Poll interval of the STA, the AP transmits an unsolicited STF to the STA after the SIFS. When it is assumed that the STA has normally transmitted the PS-Poll, the time at which the unsolicited STF is transmitted may be identical to the time (PIFS+PS-Poll transmission time+SIFS) at which the STF is transmitted. By transmitting the unsolicited STF if the AP does not receive a PS-Poll frame at an assigned time from a designated STA, intervention of other STAs (e.g., a hidden node) in the PS-Poll interval may be prevented.

The unsolicited NDP frame or STF may also be used in other cases different from the aforementioned case by the AP in order to prevent channel access by the other STAs, which will be described with reference to FIG. 39.

Figure 39:
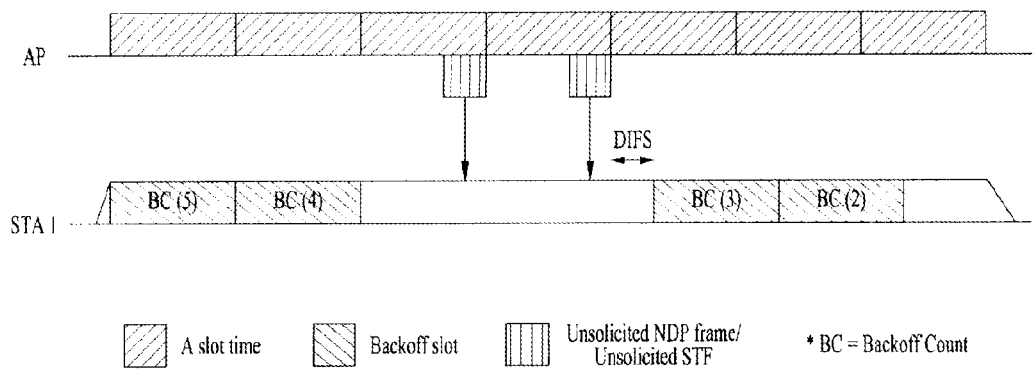

FIG. 39 exemplarily illustrates the channel access operation of an STA according to one embodiment of the present invention.

Referring to FIG. 39, once the random backoff process for channel access begins, STA 1 continues to monitor the medium while counting down the backoff slot according to the determined backoff count value. The AP transmits an unsolicited NDP frame/STF in a specific slot to prevent the other STAs from performing channel access, and the STA stops countdown and waits in the slot in which the unsolicited NDP frame/STF is transmitted from the AP, since the busy state of the medium is monitored. If the medium is switched to the idle state in the DIFS, the STA resumes the remaining countdown. By transmitting the unsolicited NDP frame/STF as described above, the AP may prevent channel access by undetermined STAs in a specific slot.

In the meantime, only the total PS-Poll interval may be configured without configuring PS-Poll intervals for the respective STAs indicated by the TIM element, and the PS-Poll operation may be performed based on contention, which will be described with reference to FIG. 40.

Figure 40:
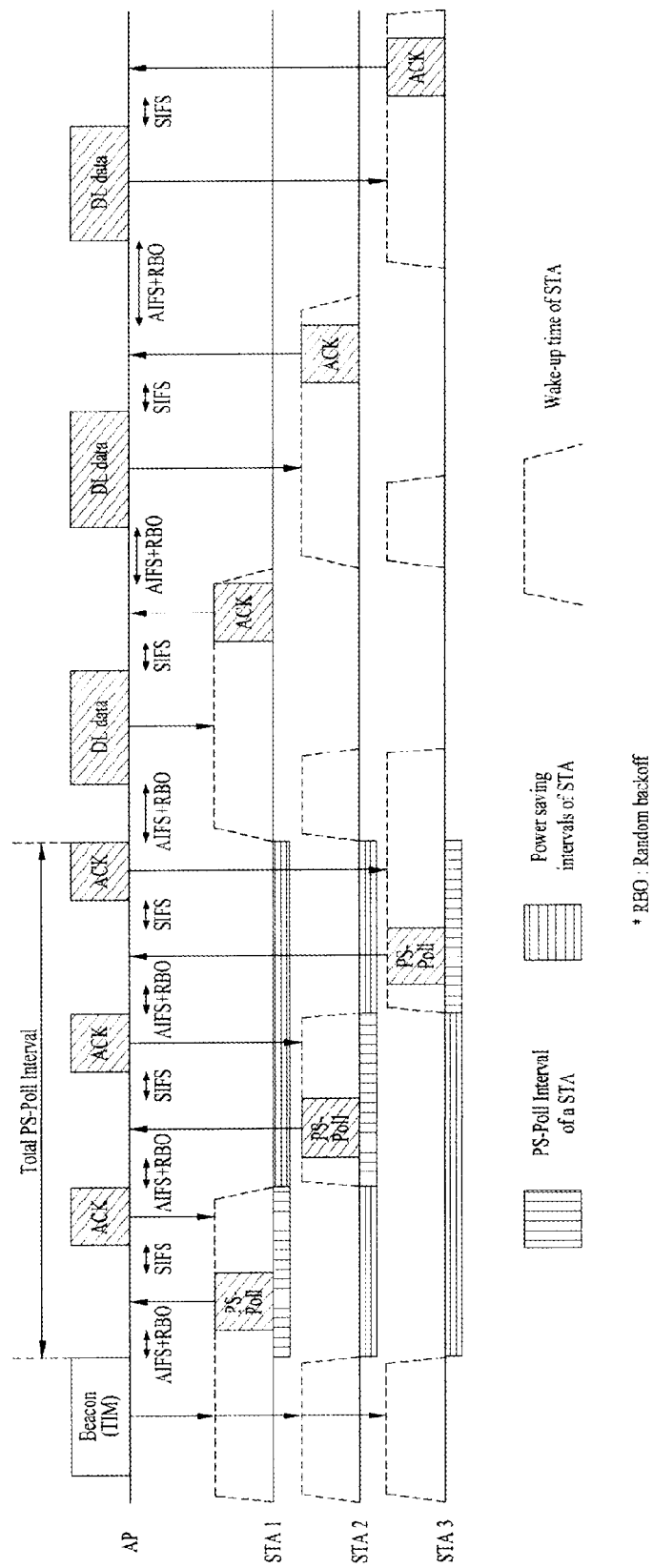

FIG. 40 exemplarily illustrates the channel access operation of an STA according to one embodiment of the present invention.

Referring to FIG. 40, only the STAs (STA 1, STA 2 and STA 3) having confirmed, through the TIM element, that the AP stores data directed thereto may perform the PS-Poll operation on the contention basis within the total PS-Poll interval. At this time, the AP may inform the STAs of information about the length and position of the total PS-Poll interval, through TIM information. Otherwise, the STA may confirm the length and position of the total PS-Poll interval through the Duration field of the beacon.

In the case illustrated in FIG. 40, STA 1 selects the smallest backoff count value, STA 2 selects the second smallest backoff count value, and STA 3 selects the greatest backoff count value. When STA 1 having received the beacon confirms that the medium is in the idle state in the AIFS, STA 1 counts down the backoff slot, and then transmits the PS-Poll frame to the AP. Upon receiving the PS-Poll frame, the AP transmits an ACK frame to STA 1 after the SIFS. Thereafter, STA 2 and STA 3 transmit the PS-Poll frame to the AP in the same manner.

Figure 41:
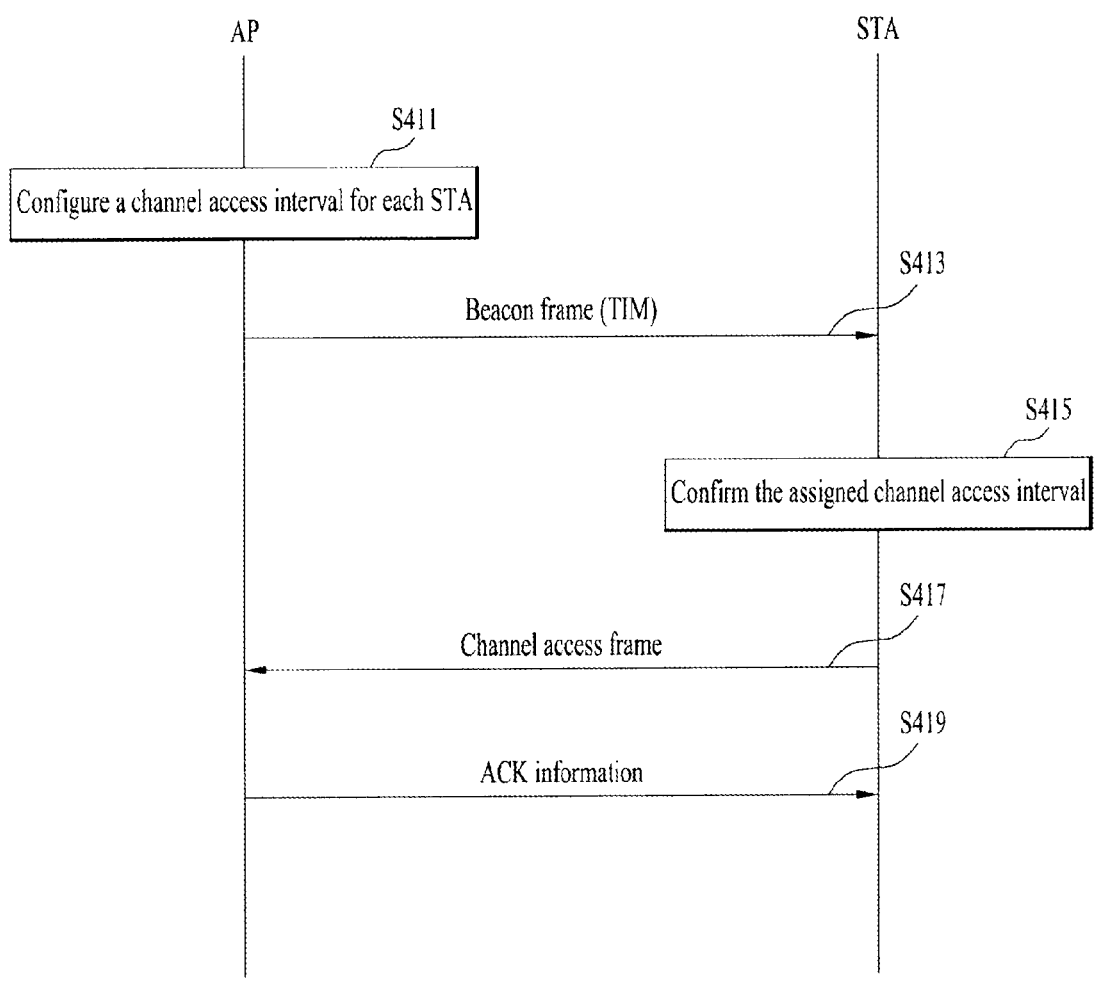
FIG. 41 exemplarily illustrates a channel access method according to one embodiment of the present invention.

FIG. 41 exemplarily illustrates a channel access method according to one embodiment of the present invention.

Referring to FIG. 41, the AP configures channel access intervals (e.g., PS-Poll intervals) of STAs for which downlink data is specified (S411).

The AP transmits, to the STAs, a TIM element including information indicating presence or absence of downlink data to be transmitted to the respective STAs according to the beacon period, through a beacon frame (S413). Herein, the TIM element may additionally include information about the positions of channel access intervals of the STAs for which downlink data is specified by the TIM element, information about the start time of the total channel access interval, length information about the channel access intervals, and sequence information about the channel access intervals.

The STA receives the beacon frame from the AP by switching to the awake state in accordance with the beacon transmission period, and then confirms, through the TIM element in the received beacon frame, presence or absence of downlink data assigned thereto and a channel access interval assigned (allocated) thereto (S415).

Subsequently, the STA transmits a channel access frame (e.g., a PS-Poll frame) to the AP in the channel access interval assigned thereto (S417). The STA remains in the awake state only in the channel access interval assigned thereto within the total channel access interval to transmit a channel access frame to the AP. Herein, the channel access frame may employ the format of an NDP PS-Poll frame.

The AP transmits an ACK frame to the STA in response to the received channel access frame (S419). The ACK frame may be transmitted to each of the STAs within the PS-Poll interval of each of STAs, or may be transmitted to all the STAs after the channel access interval. Herein, the format of the NDP ACK frame or the group ACK frame (e.g., PPGA frame) may be used for the ACK frame. Thereafter, the AP transmits stored data to each STA.

Hereinafter, a description will be given of a method for informing an STA of a channel access interval (e.g., a PS-Poll interval) configured therefor.

Figure 42:
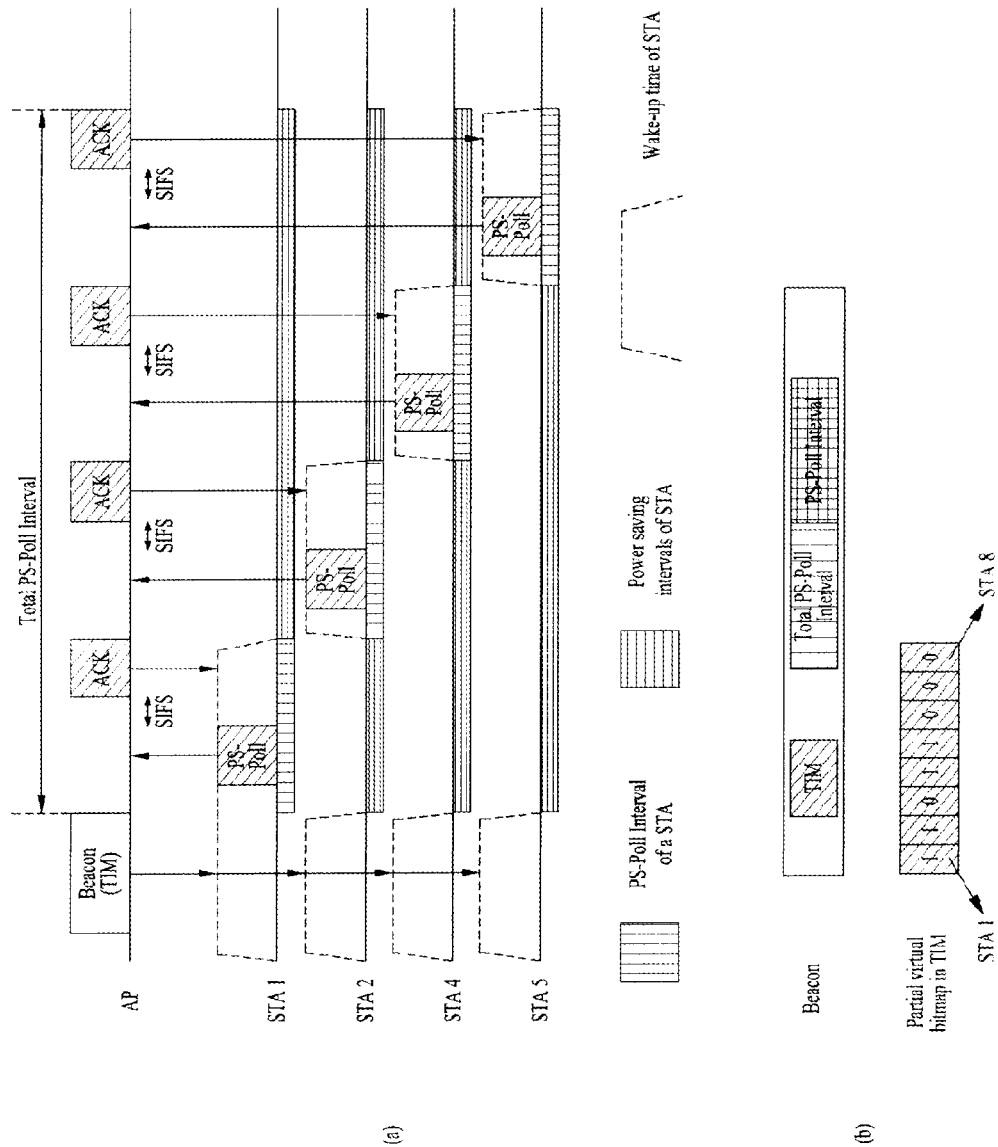
FIGS. 42a and b illustrate an exemplary channel access method according to another embodiment of the present invention.

FIG. 42 illustrates an exemplary method for informing an STA of a channel access interval (e.g., a PS-Poll interval) configured therefor through a beacon frame. FIG. 42(*a*) illustrates a case in which four channel access intervals (e.g., PS-Poll intervals) and a total PS-Poll interval are configured for STAs, and FIG. 42(*b*) illustrates a method for informing the STAs of this information.

More specifically, referring to FIG. 42(*b*), the AP may transmit a beacon frame carrying information about PS-Poll intervals for STAs and a total PS-Poll interval. However, embodiments of the present invention are not limited thereto. The information about PS-Poll intervals for STAs and a total PS-Poll interval may be carried on a TIM. The AP may indicate, through a partial virtual bitmap in the TIM element, the STAs for which the PS-Poll intervals are configured. For example, the AP may indicate, through a partial virtual bitmap of FIG. 42(*b*), that the four PS-Poll intervals shown in FIG. 42(*a*) are configured for STAs 1, 2, 4 and 5, respectively. In other words, STAs 1, 2, 4 and 5 may be paged by the partial virtual bitmap, and the positions of the PS-Poll intervals for the STAs may be determined in an order in which the STAs are paged in the partial virtual bitmap. In the case in which information about the total PS-Poll interval has not been transmitted, the total PS-Poll interval may be determined as PS-Poll interval for STA*the number of STAs paged in the partial virtual bitmap. This method is applied only when the PS-Poll intervals are for only one STA, and cannot be applied when the PS-Poll intervals are for two more more STAs.

As described above, the method for informing STAs of channel access intervals configured therefor is useful in the case that the STAs paged in the TIM only need to perform channel access in their own channel access intervals. For example, this method is suitable for an STA such as a sensor type STA for which power consumption needs to be minimized. However, in the case in which STAs paged in the TIM includes not only a sensor type STA but also an offloading STA, these STAs need to be distinguishably indicated.

Hereinafter, various methods for distinguishably indicating STAs will be described. In the description given below, the conventional channel access method, i.e., the method in which STAs paged in the TIM transmit a PS-Poll frame after performing contention will be referred to as a first type. In addition, a new channel access method, i.e., a method in which a PS-Poll frame is transmitted in a PS-Poll interval configured for each STA will be referred to as a second type.

In another example, when intervals such as PS-Poll intervals which are accessible by STAs are allocated to the STAs, information (i.e., an indicator) about whether allocated channel access intervals are for sensor type STAs or for offloading STAs may also be carried. If the indicator indicates the sensor type, the STAs may perform PS-Poll transmission in the new channel access method. If the indicator indicates the offloading type, the STAs may perform PS-Poll transmission in the conventional contention-based method.

As a first case, the partial virtual bitmap of a TIM may involve sensor type STAs and offloading STAs. In this case, the AP may inform the STAs of which type of method the STAs need to use to perform channel access, through a first bitmap that indicates PS-Poll transmission types individually. More specifically, the AP may indicate, through the first bitmap, whether an STA for which the TIM indicates presence of buffered traffic corresponds to the first type or the second type. In other words, the first bitmap (Individual PS-Poll mode bitmap) for the STAs paged with reference to the partial virtual bitmap of the TIM may be transmitted to the STAs. In the first bitmap, bit 0 may indicate the first type, and bit 1 may indicate the second type. The first bitmap may be transmitted in a beacon or TIM IE of the beacon.

Figure 43:
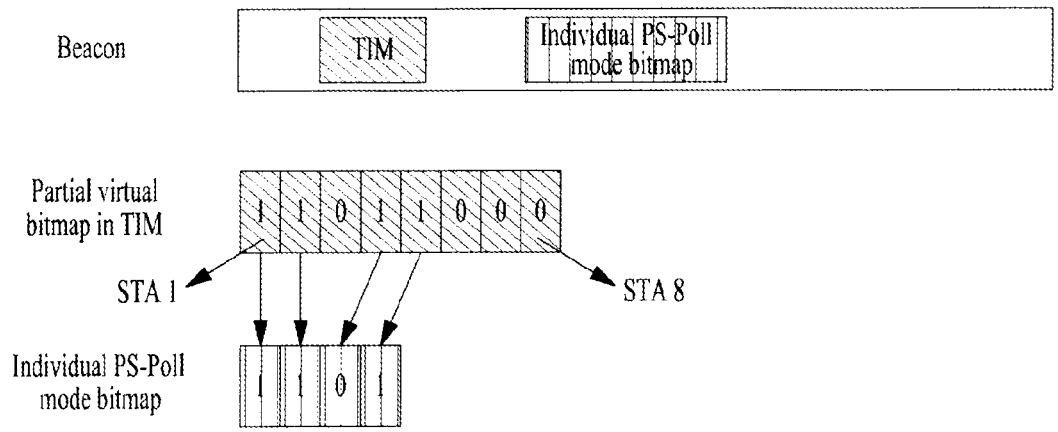
FIGS. 43 to 46 are diagrams illustrating a method for indicating a channel access type according to an embodiment of the present invention.

The first bitmap as above is exemplarily shown FIG. 43. Referring to FIG. 43, the first bitmap (Individual PS-Poll mode bitmap) is transmitted using a beacon frame. STA 1 confirms that there is buffered data therefor through the partial virtual bitmap. STA 1 may check the first bitmap and transmit a PS-Poll frame according to the bit value of 1, i.e., the second type. In FIG. 43, STA 4 transmits a PS-Poll frame according to the first type.

As a second case, a partial virtual bitmap for one or more groups/pages may be present in a beacon or a TIM IE and involve STAs having the same attribute (e.g., sensor type STAs) for each group/page.

In this case, information about the PS-Poll transmission type may be indicated for each group through a second bitmap (Group PS-Poll mode bitmap). More specifically, the second bitmap may indicate whether each of the groups for which the partial virtual bitmap indicates presence of buffered traffic corresponds to the first type or the second type. In the second bitmap, the bit value 0 may indicate the first type, and the bit value 1 may indicate the second type.

Figure 44:
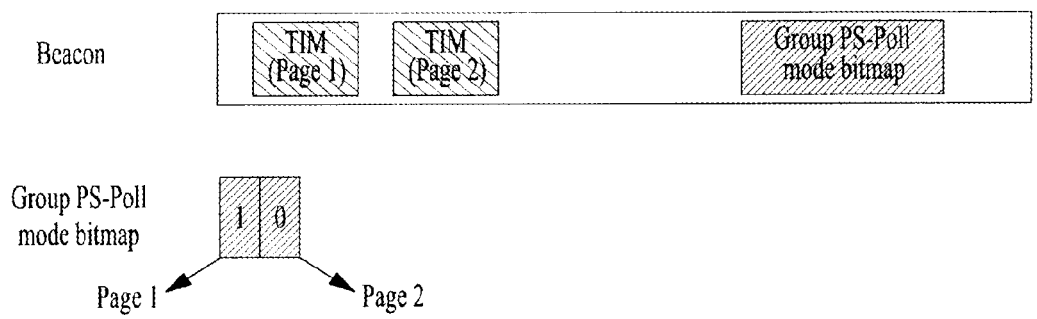

An example of the second bitmap is shown in FIG. 44. Referring to FIG. 44, an STA having received the beacon recognizes that the group to which the STA belongs is being paged (page 1), and checks the second bitmap (Group PS-Poll mode bitmap). Since a bit value corresponding to page 1 is set to 1 in the second bitmap, the STA transmits a PS-Poll frame according to the second type.

The second bitmap described above may be transmitted in the beacon frame as a separate bitmap different from the TIM for groups.

Figure 45:
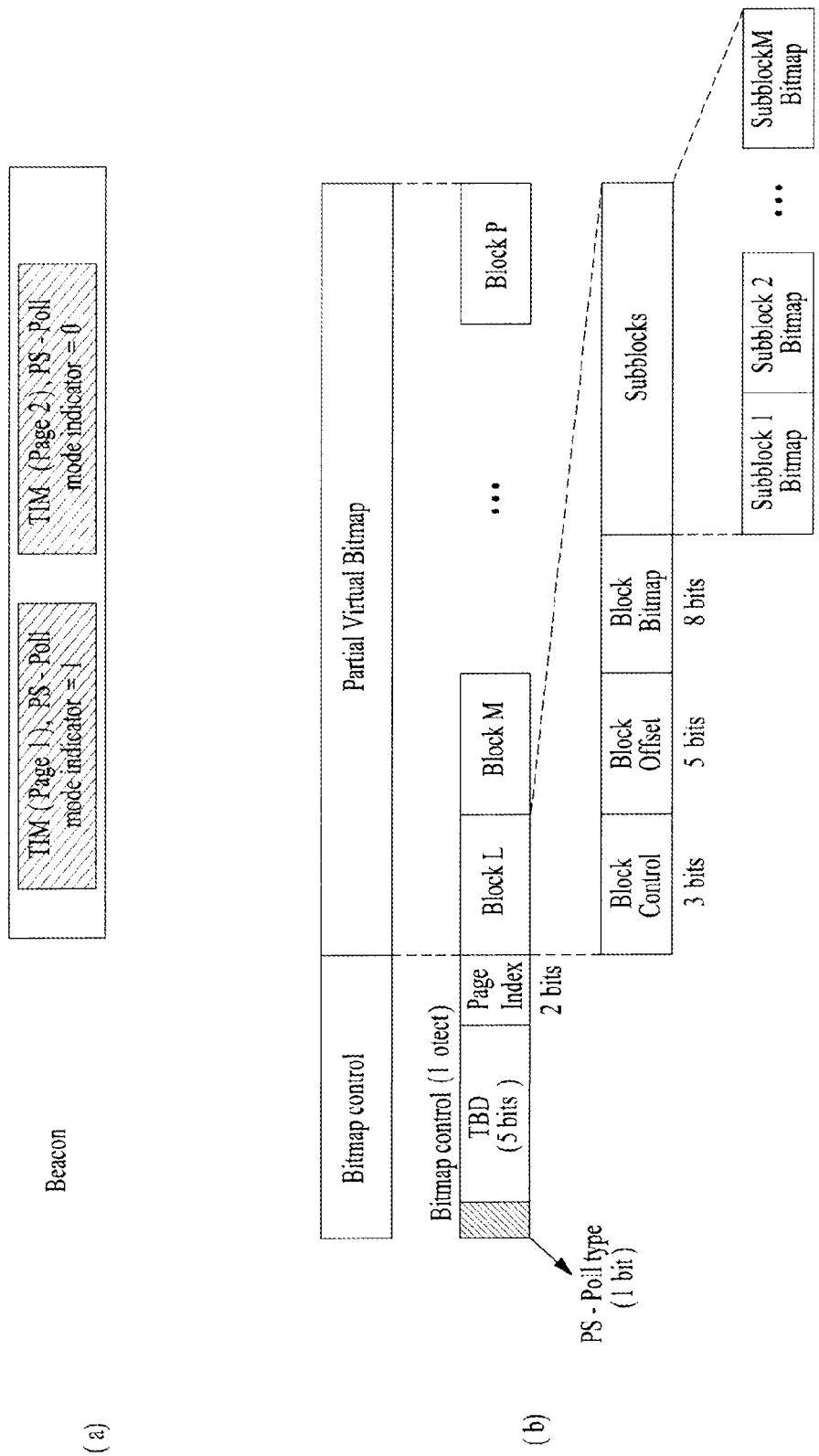

FIG. 45 shows another example of the second case. Referring to FIG. 45(a), the TIM may contain a PS-Poll mode indicator for pages, a group (page 2) for which the indicator is set to 0 may transmit PS-Poll according to the first type, and a group (page 1) for which the indicator is set to 1 may transmit PS-Poll according to the second type. FIG. 45(b) illustrates an example in which PS Poll mode information about pages is contained in the TIM. Referring to FIG. 45(b), the TIM includes a bitmap control field and a partial virtual bitmap field, and the partial virtual bitmap field consists of one or more blocks. The bitmap control field includes a page index (group information) and PS-Poll transmission type information (i.e., a PS-Poll mode indicator) for a corresponding page. If the PS-Poll type field is set to 1, an operation is performed according to the first type. If the PS-Poll type field is set to 0, an operation is performed according to the second type.

In a third case, a TIM for one or more groups may be contained in a beacon, a specific group may include STAs having the same attribute, and another group may include STAs having different attributes.

In this case, information related to the PS-Poll transmission type may include a first bitmap (Individual PS-Poll mode bitmap) which individually indicates the PS-Poll transmission type of each STA included in a group, a second bitmap (Group PS-Poll mode bitmap) which indicates the PS-Poll transmission types of STAs included in a group based on the group, and a third bitmap (Individual PS-Poll Mode Bitmap) indicating which of the first bitmap and the second bitmap a paged group is related to. For example, if the number of pages groups in the TIM IE is 2, the third bitmap may be configured with 2 bits, the bit value 0 may indicates the PS-Poll transmission type is determined by a second bitmap, and the bit value 1 may indicate that the PS-Poll transmission type is determined by the first bitmap. That is, the bit value 1 indicates a group including STAs having different attributes. The size of the second bitmap may be determined based on a value set to 0 in the third bitmap. For example, if only one bit in the third bitmap having the size of 2 bits is set to 0, the second bitmap is configured with 1 bit. In addition, the information includes as many first bitmaps as the number of bits set to 1 in the third bitmap.

Figure 46:
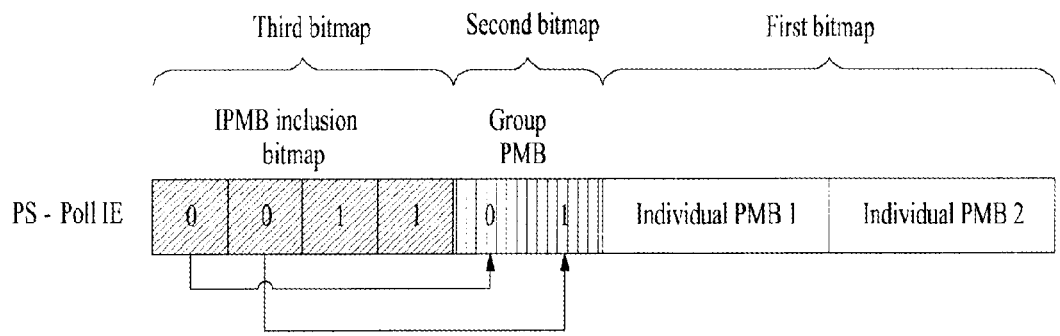

FIG. 46 exemplarily shows a PS-Poll IE including the first to third bitmaps. In FIG. 46, it is assumed that there are four groups paged by the TIM. An STA may check the third bitmap. If the bit value is 0, the PS-Poll transmission type may be determined through the corresponding second bitmap. If the bit value is 1, the PS-Poll transmission type may be determined through the corresponding first bitmap.

While the descriptions given above basically assume that there are two PS-Poll transmission types (the first type and the second type), there may be another PS-Poll transmission type corresponding to the third type. Herein, the third type is a PS-Poll transmission type which is not identical to the first and second types but can be drawn from one of the various methods described above or from the descriptions in this specification. In this case, except the first type used in the legacy system, the second type and the third type may be grouped into an enhanced PS-Poll type, and the first to third bitmaps may be configured to indicate the PS-Poll type rather than the second type. This case will be described with reference to FIGS. 47 and 48.

Figure 47:
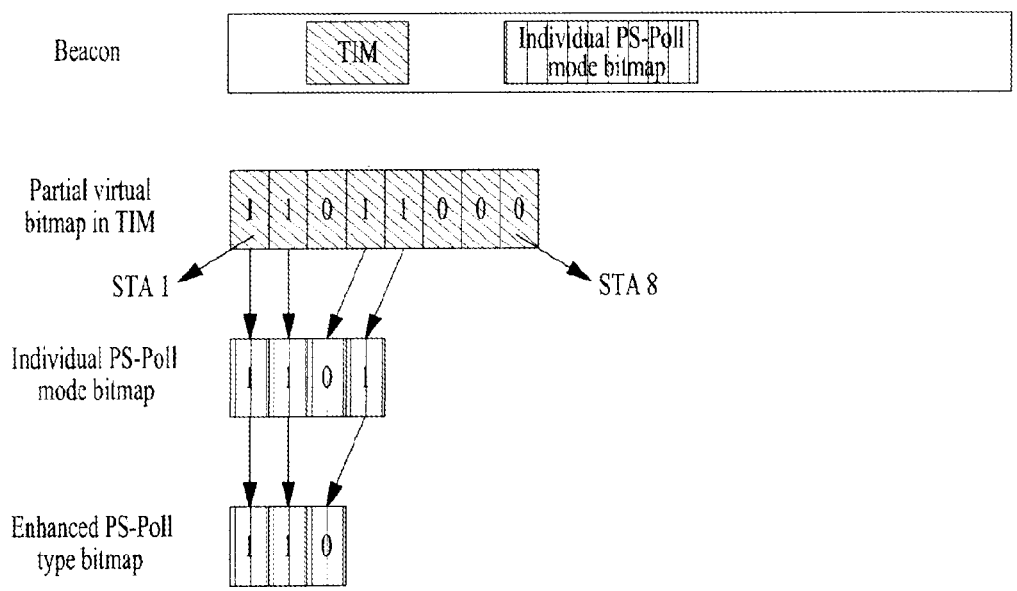
FIGS. 47 to 50 are diagrams illustrating a method for indicating a plurality of enhanced channel access types according to an embodiment of the present invention.

In the example of FIG. 47, the first bitmap described above supports the enhanced PS-Poll type. That is, when the first bitmap (Individual PS-Poll mode bitmap) is set to 1, it may indicate the enhanced PS-Poll type. When the first bitmap (Individual PS-Poll mode bitmap) is set to 0, it may indicate the first type. In the case in which the first bitmap indicates the enhanced PS-Poll type, the enhanced PS-Poll type bitmap may indicate the second type (when the bit value is 0) or the third type (when the bit value is 1).

Figure 48:
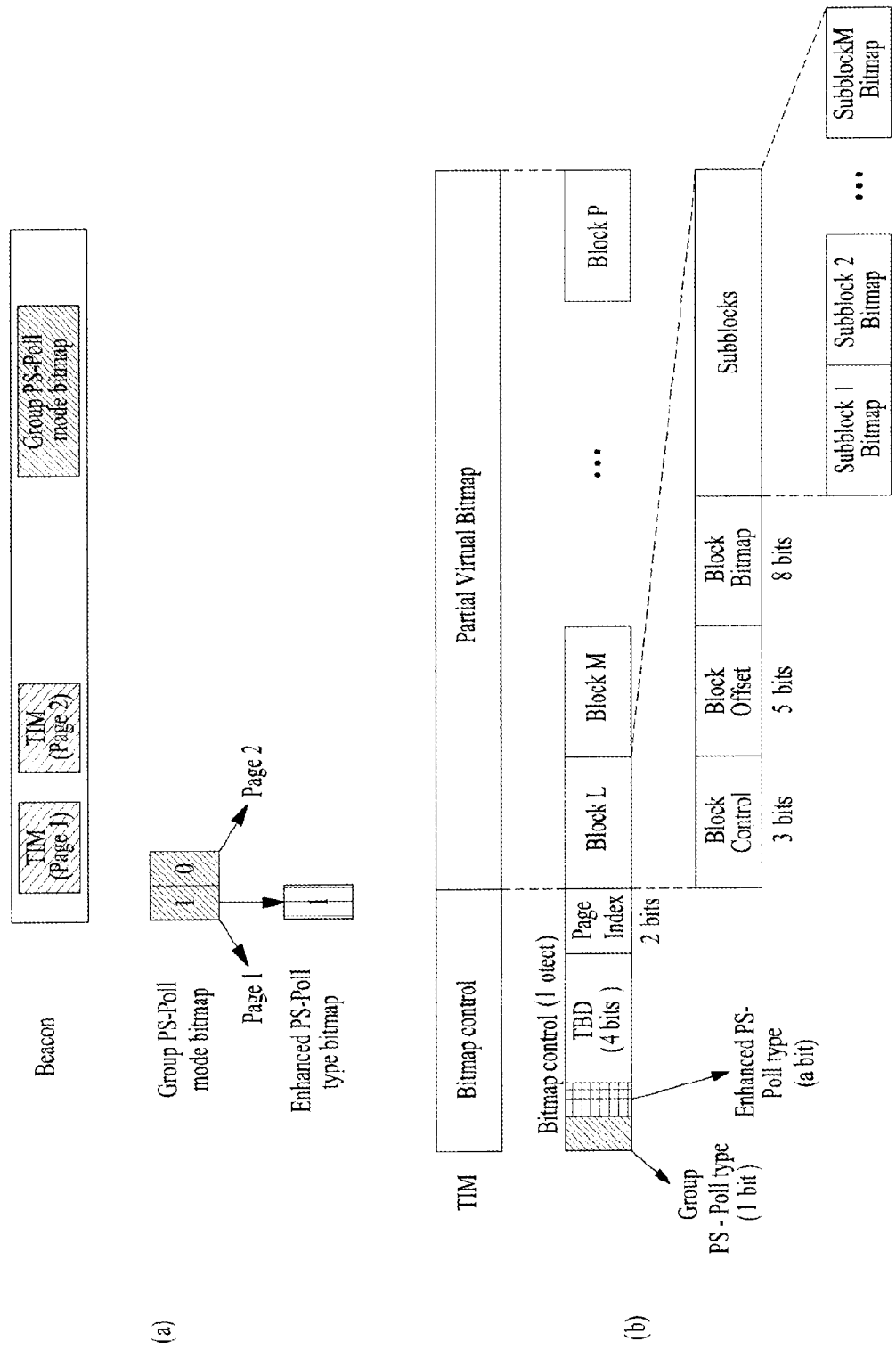

In the example of FIG. 48, the second bitmap described above supports the enhanced PS-Poll type. As shown in FIG. 48(a), when the bit value of the second bitmap (Group PS-Poll mode bitmap) is 1, the second bitmap may indicate the enhanced PS-Poll type, and the enhanced PS-Poll type bitmap may indicate the second type (when the bit value is 0) or the third type (when the bit value is 1). FIG. 48(b) exemplarily shows PS Poll mode information about a page contained in the TIM in the case of FIG. 48(a).

Figure 49:
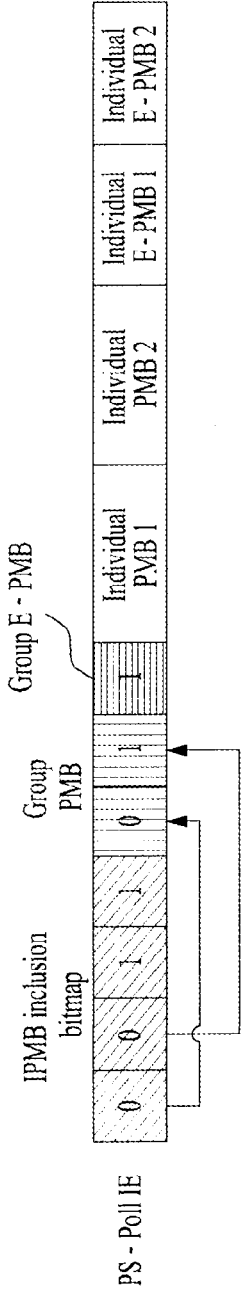

In the example of FIG. 49, the PS-Poll IE described above supports the enhanced PS-Poll type. That is, if the bit value of the second bitmap is 1, a Group E-PMB bitmap may indicate the second type (when the bit value is 0) or the third type (when the bit value is 1). In addition, if the bit value of the first bitmaps (Individual PMB 1 and Individual PMB 2) is 1, Individual E-PMB bitmaps (Individual E-PMB 1 and Individual E-PMB 2) may indicate the second type (when the bit value is 0) or the third type (when the bit value is 1).

Figures 50, 51:
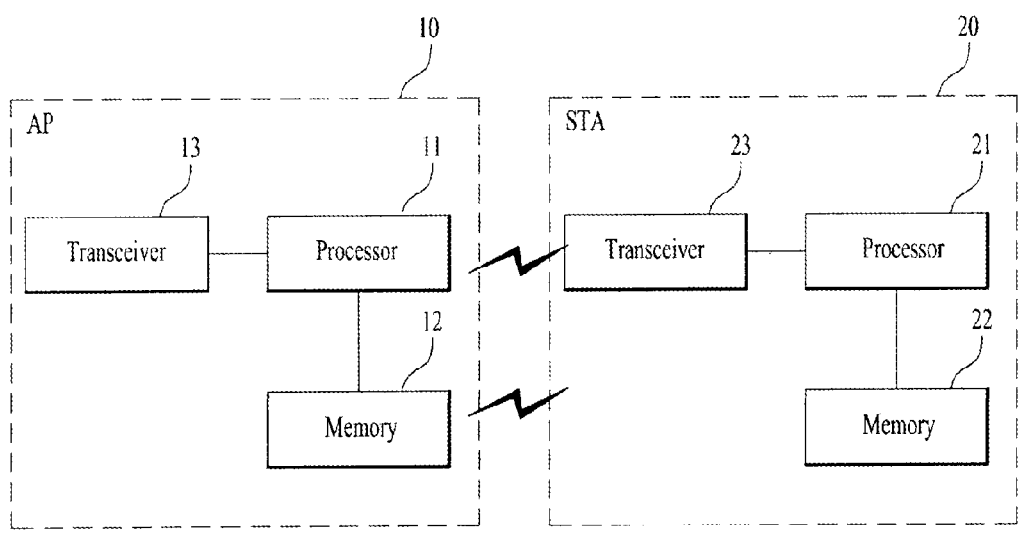
FIG. 51 is a block diagram illustrating a radio frequency device according to one embodiment of the present invention.

Meanwhile, in a specific channel access interval, only STAs belonging to a specific group may be allowed to perform channel access. In this case, when the STAs belonging to the specific group transmit PS-Poll within the channel access interval, the AP may determine whether to use the first type or the second type. That is, when the AP allocates channel access intervals, it may send PS-Poll type information to the STAs. In the example of FIG. 50, when a channel access interval (e.g., a restrict access window (RAW)) is allocated, PS-Poll type information to be used in the RAW is also sent. In FIG. 50, the Poll type field indicates a PS Poll operation type within the RAW. The Poll type field indicates the first type when the value thereof is 0, and the second type when the value thereof is 1. PS-Poll is transmitted according to the indicated type. Alternatively, the Poll type field value of 0 may indicate the first type, and the value of 1 may indicate the enhanced PS-Poll type.

FIG. 51 is a block diagram illustrating a radio frequency device according to one embodiment of the present invention.

An AP 10 may include a processor 11, a memory 12, and a transceiver 13. An STA 20 may include a processor 21, a memory 22, and a transceiver 23. The transceivers 13 and 23 may transmit/receive a radio frequency signal and implement a physical layer according to an IEEE 802 system. The processors 11 and 21 may be connected to the transceivers 13 and 21 to implement a physical layer and/or a MAC layer according to an IEEE 802 system. The processors 11 and 21 may be configured to perform various operations according to the various embodiments of the present invention described above. In addition, modules to perform operations of an AP and an STA according to the various embodiments of the present invention described above may be stored in the memories 12 and 22 and executed by the processors 11 and 21. The memories 12 and 22 may be contained in the processors 11 and 21 or may be installed at the exterior of the processors 11 and 21 and connected to the processors 11 and 21 by a well-known means.

Constituents of the AP and the STA may be provided such that details of the various embodiments of the present invention described above are independently employed or two or more embodiments are simultaneously implemented. For clarity, redundant descriptions are omitted.

The embodiments of the present invention described above may be implemented by various means. For example, the embodiments of the present invention may be implemented by hardware, firmware, software, or a combination thereof.

When implemented by hardware, a method according to embodiments of the present invention may be implemented by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, and the like.

When embodied in firmware or software, a method according to the embodiments of the present invention may be implemented in the form of a module, a procedure, a function, or the like which performs the functions or operations described above. Software code may be stored in a memory unit and executed by the processor. The memory unit may be disposed inside or outside the processor to transceive data with the processor through various well-known means.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention without departing from the spirit and scope of the present invention. Thus, the present invention is not intended to be limited to the embodiments described herein, but is intended to have the widest scope consistent with the principles and novel features disclosed herein.

INDUSTRIAL APPLICABILITY

Various embodiments of the present invention have been described through examples applied to an IEEE 802.11 system, but they may also be applied to various wireless access systems other than the IEEE 802.11 system.

The invention claimed is:

1. A method for performing channel access by at least one station (STA) in a wireless communication system, comprising:
receiving a beacon frame containing a traffic indication map (TIM);
checking, when the TIM indicates that buffered traffic for a STA is present, one or more bitmaps indicating a PS-Poll transmission type for one or more STAs, including the STA, wherein the one or more bitmaps are included in PS-Poll transmission type information; and
transmitting a PS-Poll frame according to one of a first transmission type and a second transmission type indicated by the one or more bitmaps,
wherein the first transmission type represents transmission of the PS-Poll frame after implementation of contention, and the second transmission type represents transmission of the PS-Poll frame in a time interval configured for the STA.

2. The method according to claim 1, wherein the one or more bitmaps comprise a first bitmap indicating a PS-Poll transmission type for each of the one or more STAs individually.

3. The method according to claim 2, wherein the first bitmap indicates whether each of the one or more STAs, in which the TIM indicates that buffered traffic is present, corresponds to the first transmission type or the second transmission type.

4. The method according to claim 2, wherein the first bitmap is contained in one of the beacon frame and a TIM information element.

5. The method according to claim 1, wherein the one or more bitmaps comprise a second bitmap indicating a PS-Poll transmission type for at least one group with which each of the one or more STAs are associated.

6. The method according to claim 5, wherein the second bitmap indicates whether each of the at least one group, in which the beacon frame indicates that buffered traffic is present, corresponds to the first transmission type or the second transmission type.

7. The method according to claim 5, wherein the second bitmap is contained in the beacon frame.

8. The method according to claim 1, wherein the PS-Poll transmission type information comprises a first bitmap indicating a PS-Poll transmission type for one or more STAs belonging to at least one group on an STA-by-STA basis, a second bitmap indicating a PS-Poll transmission type for the one or more STAs belonging to the at least one group on a group-by-group basis, and a third bitmap indicating whether a paged group is related to the first bitmap or the second bitmap.

9. The method according to claim 8, wherein the PS-Poll transmission type of a STA belonging to a group is determined through the second bitmap when a bit corresponding to the group in the third bitmap is set to 0, and is determined through the first bitmap when the bit corresponding to the group in the third bitmap is set to 1.

10. The method according to claim 8, wherein a size of the second bitmap is determined according to the number of bits set to 0 in the third bitmap.

11. The method according to claim 1, wherein, when the STA transmits the PS-Poll frame according to the second transmission type, the STA is maintained in an awake state in the time interval configured for the STA.

12. The method according to claim 11, wherein the beacon frame contains information about the time interval configured for the STA and an entire time interval for the second transmission type.

13. A station (STA) in a wireless communication system comprising:
a transceiver for transmitting and receiving a radio frequency signal; and
a processor,
wherein the processor receives a beacon frame containing a traffic indication map (TIM), checks, when the TIM indicates that buffered traffic for a STA is present, one or more bitmaps indicating a PS-Poll transmission type for one or more STAs, including the STA, wherein the one or more bitmaps are included in PS-Poll transmission type information, and transmits a PS-Poll frame according to one of a first transmission type and a second transmission type indicated by one or more bitmaps, wherein the first transmission type represents transmission of the PS-Poll frame after implementation of contention, and the second transmission type represents transmission of the PS-Poll frame in a time interval configured for the STA.

* * * * *